(12) United States Patent
Cheung et al.

(10) Patent No.: US 11,170,663 B2
(45) Date of Patent: Nov. 9, 2021

(54) TEACHING AND ASSESSMENT OF SPOKEN LANGUAGE SKILLS THROUGH FINE-GRAINED EVALUATION

(71) Applicant: SpeechAce LLC, Seattle, WA (US)

(72) Inventors: Chun Ho Cheung, Bellevue, WA (US); Ahmed El-Shimi, Seattle, WA (US); Abhishek Gupta, Seattle, WA (US)

(73) Assignee: SpeechAce LLC, Seattle, WA (US)

( * ) Notice: Subject to any disclaimer, the term of this patent is extended or adjusted under 35 U.S.C. 154(b) by 660 days.

(21) Appl. No.: 15/708,893

(22) Filed: Sep. 19, 2017

(65) Prior Publication Data

US 2018/0277017 A1   Sep. 27, 2018

Related U.S. Application Data

(63) Continuation-in-part of application No. PCT/US2017/034065, filed on May 23, 2017.

(60) Provisional application No. 62/476,733, filed on Mar. 25, 2017.

(51) Int. Cl.
G09B 19/04    (2006.01)
G09B 5/06     (2006.01)
G09B 19/06    (2006.01)

(52) U.S. Cl.
CPC ............... *G09B 19/04* (2013.01); *G09B 5/06* (2013.01); *G09B 19/06* (2013.01)

(58) Field of Classification Search
CPC ..................................................... G09B 19/04
USPC ............................................................ 434/157
See application file for complete search history.

(56) References Cited

U.S. PATENT DOCUMENTS

| | | | |
|---|---|---|---|
| 9,336,268 B1* | 5/2016 | Moudy | G06F 16/24578 |
| 2012/0322035 A1* | 12/2012 | Julia | G09B 5/06 434/185 |
| 2013/0059276 A1 | 3/2013 | Allen et al. | |
| 2014/0272820 A1* | 9/2014 | Wride | G09B 5/04 434/157 |
| 2015/0248398 A1* | 9/2015 | Weiss | G06F 16/335 434/362 |
| 2016/0055763 A1 | 2/2016 | Nakamura | |
| 2016/0351074 A1 | 12/2016 | Paul et al. | |

OTHER PUBLICATIONS

International Search Report of PCT/US2017/034065, parent application to this application, dated Oct. 12, 2017.

\* cited by examiner

*Primary Examiner* — Kesha Frisby

(57) ABSTRACT

One or more implementations allow for systems, methods, and devices for teaching and/or assessment of one or more spoken language skills through analysis of one or more pronunciation characteristics of one or more individual language components of a teaching string audio sample data that corresponds to the user's speaking of the teaching string.

68 Claims, 28 Drawing Sheets

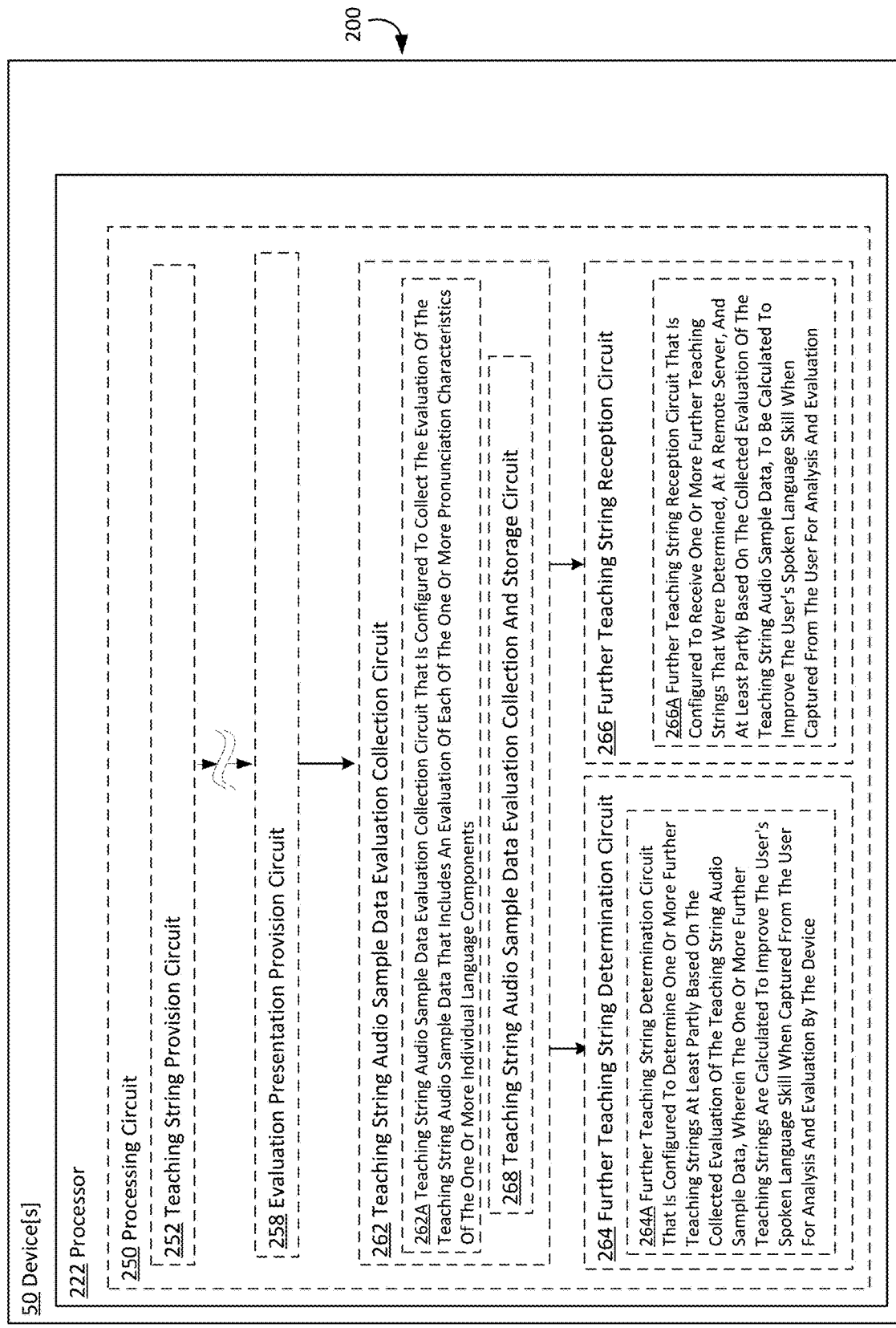

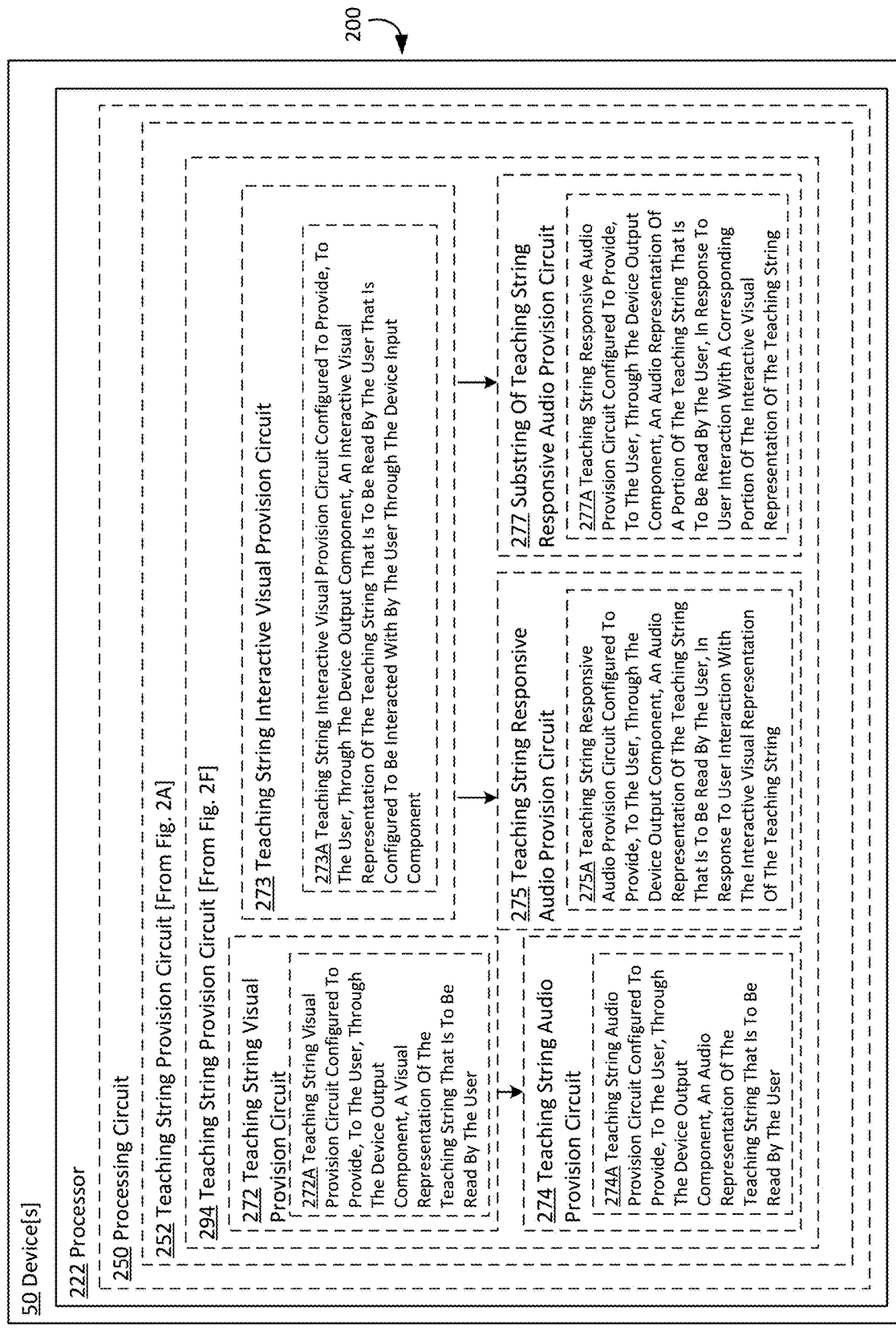

TEACHING AND ASSESSMENT OF SPOKEN LANGUAGE SKILLS THROUGH FINE-GRAINED EVALUATION

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of International Patent Application No. PCT/US17/34065, entitled TEACHING AND ASSESSMENT OF SPOKEN LANGUAGE SKILLS THROUGH FINE-GRAINED EVALUATION, naming Chun Ho Cheung as inventor, filed 23 May 2017, which is currently co-pending or is an application of which a currently co-pending application is entitled to the benefit of the filing date.

For purposes of the USPTO extra-statutory requirements, the present application claims benefit of priority of U.S. Provisional Patent Application No. 62/476,733 titled Teaching and assessment of spoken languages skills through fine-grained evaluation of human speech, naming Chun Ho Cheung as inventor, filed 25 Mar. 2017, which was filed within the twelve months preceding the filing date of the present application or is an application of which a currently co-pending application is entitled to the benefit of the filing date.

RELATED APPLICATIONS

None as of the filing date.

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

The invention is in the technical field of language teaching and learning. More particularly, the invention is in the technical field of language learning through computational linguistics techniques.

SUMMARY

The advent of computational ability to store and process large amounts of data has caused many changes throughout human existence. One area that has seen rapid advancement is speech analysis. Through the use of large training sets of data, computers now can process and analyze speech on levels similar to that of a human. Many modern devices, such as smartphones, can receive commands in the form of speech, and will recognize the speech through a complex set of algorithms and training data. Apple's Siri, Microsoft's Cortana, and Amazon's Echo are just a few of these products that are now available on the market.

There is less advancement, however, in the field of computationally-implemented teaching of language skills, that is, the use of computer training not to recognize someone's existing speech, but to teach them how to speak. Existing speech recognition programs, such as the ones listed above, are trained to recognize speech in a broad format. For example, existing speech recognition programs are trained to recognize speakers who speak incorrectly, speakers who speak with an accent, speakers who are impaired or under duress, and many other variations. The nuance of speech is lost in an attempt to perform pattern matching on a speaker, so that voice commands can be recognized even when a speaker is drunk and slurring their words, speaking rapidly due to stress or illness, speaking differently because the speaker is under duress, or speaking in a loud room with substantial ambient noise.

The foregoing problems and solutions, however, deal with speech detection, not speech education. The following solutions include training someone to speak by precisely analyzing their words, not in the hope of being able to glean their meaning by discarding much of the spoken data, and hoping to hit on a pattern match, but rather to analyze precisely how the speaker's speech differs from the baseline correct, neutral pronunciation of words and phrases demonstrated by a native speaker. Some implementations disclosed herein hope to, among other goals, perform a fine-grained analysis of where a speaker's speech deviates from a native speaker's "perfect" pitch, tone, intonation, frequency, stress, and accent, for example. This precise, fine-grained analysis serves to inform the speaker exactly where he or she is making mistakes, and what he or she can do to correct them. Thus, rather than compensating for a user's poor speech, some of the herein described systems and methods detect and draw attention to the user's poor speech, so that the speech may be corrected.

In addition, precise and fine-grained analysis of the inconsistencies with a user's speech yields further benefits in training, specifically by allowing adaptive training as time goes by. For example, each time a user speaks a sentence, that sentence can be analyzed with a fine-grained analysis, as will be discussed in more detail herein. The analysis of this sentence may be combined with analysis of other words, sentences, and phrases, to develop targeted lessons to the user. The analysis may be used to determine the user's weaker points in the language and target them for improvement, and/or to determine the user's stronger points in the language and spend less time on them. Because of the iterative nature of this process, in some implementations, it is hoped that the overall amount of time required to learn a new language, to whatever level of fluency the user desires, will be substantially decreased compared to conventional language teaching methods that rely on rote lessons and broad-stroke analysis of a user's performance on those lessons.

Thus, the devices, methods, and systems herein constitute an improvement to a computer, to the way a computer works, e.g., by allowing that computer to more carefully and finely analyze a user's speech, give that user better feedback, and allow the user to learn a language more quickly.

In one or more various aspects described herein, a method of teaching and/or assessment of one or more spoken language skills includes, but is not limited to, providing at least one teaching string configured to be read by a user, receiving teaching string audio sample data that corresponds to the user's speaking of the teaching string, analyzing one or more individual language components of the teaching string audio sample data, wherein said analyzing includes measurement of one or more pronunciation characteristics of at least one individual language component against a corresponding one or more pronunciation characteristics of a baseline individual language component, providing an evaluation presentation to the user, wherein the evaluation presentation includes presentation, to the user, of an evaluation of the teaching string audio sample data that is based on the analyzed one or more pronunciation characteristics of the one or more individual language components, and collecting the evaluation of the teaching string audio sample data, wherein the evaluated teaching string audio sample data includes an evaluation of each of the one or more pronunciation characteristics of the one or more individual language components, as set forth in the claims. In addition to the foregoing, other method aspects are described in the claims, drawings, and text forming a part of the disclosure set forth herein.

Similarly, in one or more various aspects described herein, a device configured to teach and/or assess one or more spoken language skills, said device including, but not limited to, a device interface component that includes one or more of a device input component and a device output component, a memory, and a processor operably coupled to the memory and configured to provide data to and from the device interface component, the processor including one or more circuits. In various aspects, the processor may include one or more of a teaching string provision circuit that is configured to implement one or more teaching strings that are read by the user, a teaching string audio sample data reception circuit that is configured to receive, from the user, through the device input component, teaching string audio sample data that corresponds to the user's speech of the teaching string, an individual language component analysis circuit that is configured to analyze the teaching string audio sample data through measurement of one or more pronunciation characteristics of at least one individual language component against a corresponding one or more pronunciation characteristics of baseline individual language component, an evaluation presentation provision circuit that is configured to provide an evaluation presentation on the device output component to the user, wherein the evaluation presentation includes an evaluation of the teaching string audio sample data that is based on the analyzed one or more individual language components of the teaching string audio sample data, for each of the one or more individual language components, and a teaching string audio sample data evaluation collection circuit that is configured to collect the evaluation of the teaching string audio sample data that includes an evaluation of each of the one or more pronunciation characteristics of the one or more individual language components.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise, with the exception of arrows, which may be used to indicate exemplary but non-limiting process flow when appearing in process/method flowcharts, and which may be used to indicate exemplary but non-limiting data flow when appearing in system and device diagrams, as context dictates. The illustrative embodiments described in the detailed description, drawings, and claims are not meant to be limiting. Other embodiments may be utilized, and other changes may be made, without departing from the spirit or scope of the subject matter presented here.

FIG. 2, including FIGS. 2A-2F, shows exemplary implementations of device 50, operating in environment 200, according to various embodiments of the invention.

FIG. 3, including

FIG. 5, including

FIG. 7, including

FIG. 8, including

DETAILED DESCRIPTION

Table of Contents

Figure 1:
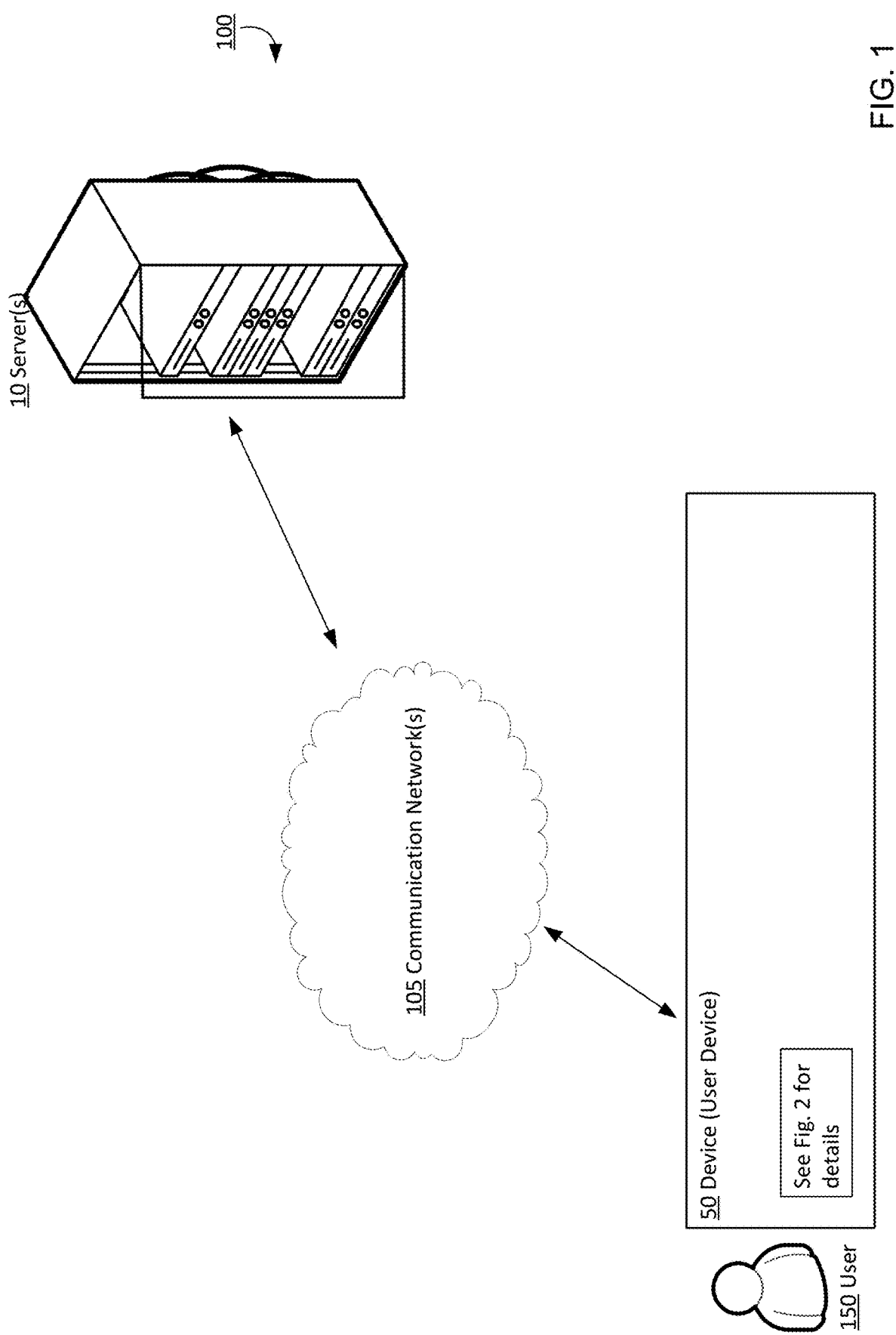
FIG. 1 shows an environment diagram of a device 50, operating in environment 100, according to various embodiments of the invention.

I. Introduction:
II. Advantages of Various Embodiments:
III. The Claims are Directed to Statutory Subject Matter:
IV. Description of Various Embodiments:
V. Various Implementations and Non-Limiting Language:
VI. Preface to the Claimed Subject Matter:

BEGINNING OF DETAILED DESCRIPTION

I. Introduction

The following represents a discussion of the devices, methods, systems, articles of manufacture, and/or compositions of matter that make up the invention. The portions of the detailed description that are not claims should be understood as exemplary only, with the scope of the invention being defined completely and solely by the claims themselves, read in light of the foregoing and the following description.

II. Advantages of Various Embodiments

It is to be understood that the following are just some of the advantages of one or more various embodiments of the invention. The following advantages are not intended to describe every implementation of the invention nor are they intended to outline what is required for the invention. They do not limit the invention in any way. The invention is solely defined by the claims, and recitations or advantages presented herein that are not in the claims should not in any way be read into the claims. This section is provided merely so that later readers may understand and comprehend some of the advantages the instant invention provides over the existing art.

Existing algorithms for speech determination generally attempt to compensate for so-called "flaws" or inconsistencies in speech, e.g., due to accent, diction, localized differences, altered states of the user, and/or environmental conditions such as ambient noise. These existing algorithms do not focus on or capture the exact nature of the inconsistency of the speech, as related to a generalized neutral, in processes that will be disclosed in more detail herein. Thus, though a user may get a broad-stroke indication that their speech is "wrong," even if that speech is assigned a numerical value (e.g., "60% accurate), that is not helpful to the user in learning specifically why their speech is wrong. Accordingly, in various implementations, a finely-grained evaluation of a user's speech is performed, and that fine-grained evaluation is provided to the user, so that they can see precisely why they are pronouncing a particular word incorrectly, down to which phoneme has too low or high of a stress, and the like.

Further, in various implementations, the user may be given immediate or near-immediate visual feedback regarding the fine-grained evaluation of the user's speech. This feedback may use colorful, visual presentation, which may be coupled with auditory feedback, to trigger the user's brain functions so that mistakes may be corrected efficiently. The feedback may be as fine-grained as is necessary or helpful to the user, depending on the user's skill level, the type of exercise, and the specific implementation of the following. For example, feedback regarding the user's performance of a specific pronunciation characteristic may be looped back into further training strings.

III. The Invention, as Claimed, is Directed to Statutory Subject Matter

The claims, description, and drawings of this application may describe one or more of the instant technologies in operational/functional language, for example as a set of operations to be performed by a computer. Such operational/functional description in most instances would be understood by one skilled the art as specifically configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. In order to facilitate human comprehension, in many instances, high-level programming languages resemble or even share symbols with natural languages.

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output.

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

IV. Description of Various Embodiments

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for the environment illustrated in FIG. 1.

Referring now to FIG. 1, FIG. 1 shows a system diagram according to one or more embodiments. Specifically, FIG. 1 shows a system environment 100, which, in various embodiments, includes a user 150, a device 50, and a server 10. In various implementations, server 10 may communicate with device 50 over communications network 105. It is noted that, in various implementations, all of the various circuitry described herein may be performed on device 50. Server 10 may be wholly optional and may, in various implementations, be eliminated. In various implementations, device 50 may carry out all of the functions listed herein without being connected to a network, e.g., to communications network 105. In other various implementations, portions of the operations described herein, and portions of the circuitry described herein, may be partially executed at or on device 50, and partially executed at or on server 10.

In various implementations, device 50 may be a server-type device, or may be a user-level device, e.g., including, but not limited to, a desktop computer, a laptop computer, a cellular phone, a network phone, a smartphone, a tablet, a music player, a walkie-talkie, a radio, an augmented reality device (e.g., augmented reality glasses and/or headphones), wearable electronics, e.g., watches, belts, earphones, or "smart" clothing, earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, a video camera, a personal video recorder, a personal audio recorder, and the like.

In various implementations, communications network 105 may be any form of one or more networks, wired or wireless or some combination thereof, that serve to transmit data and/or information between two endpoints. In various embodiments, the communications network 105 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network (GSM, CDMA, etc.), a microwave network, and so forth. The communications network 105 may be wired, wireless, or a combination of wired and wireless networks. It is noted that "communications network" as it is used in this application refers to one or more communication networks, which may or may not interact with each other.

In various implementations, server 10 may be any piece or set of computer equipment capable of being implemented in the request-response model. For example, a server 10 may provide various services, functionalities, or computational tasks for one or more clients, including, but not limited to, device 50. The term "server" does not imply a specific set or class of hardware, although hardware designed for servers may be preferable in some applications. Additionally, the term "server" does not imply more than one client, or even one client, provided that the server is capable of handling a client. Moreover, server 10 may be part of a set of distributed servers and/or other computing equipment, with variable locations for different parts (e.g., a memory may be in one physical location, and a CPU may be in an entirely different location), and may have various redundancy portions which also may be in various, disparate locations. In other implementations, server 10 may be local to device 50 or internal to device 50 (e.g., in some implementations, portions of device 50 may act as server 10 to one or more processes active on device 50). Additionally, server may refer to the specific computer program or process that gives rise to the server, the device that acts as the server by running the program, or some combination thereof. The use of the term "server" does not exclude or eliminate a peer-to-peer or other network arrangement. The device 50, server 10, and communications network 105 are illustrated as shown in FIG. 1 for ease of understanding, but other arrangements and setups are contemplated and are within the scope of the following disclosure.

Figure 2A:
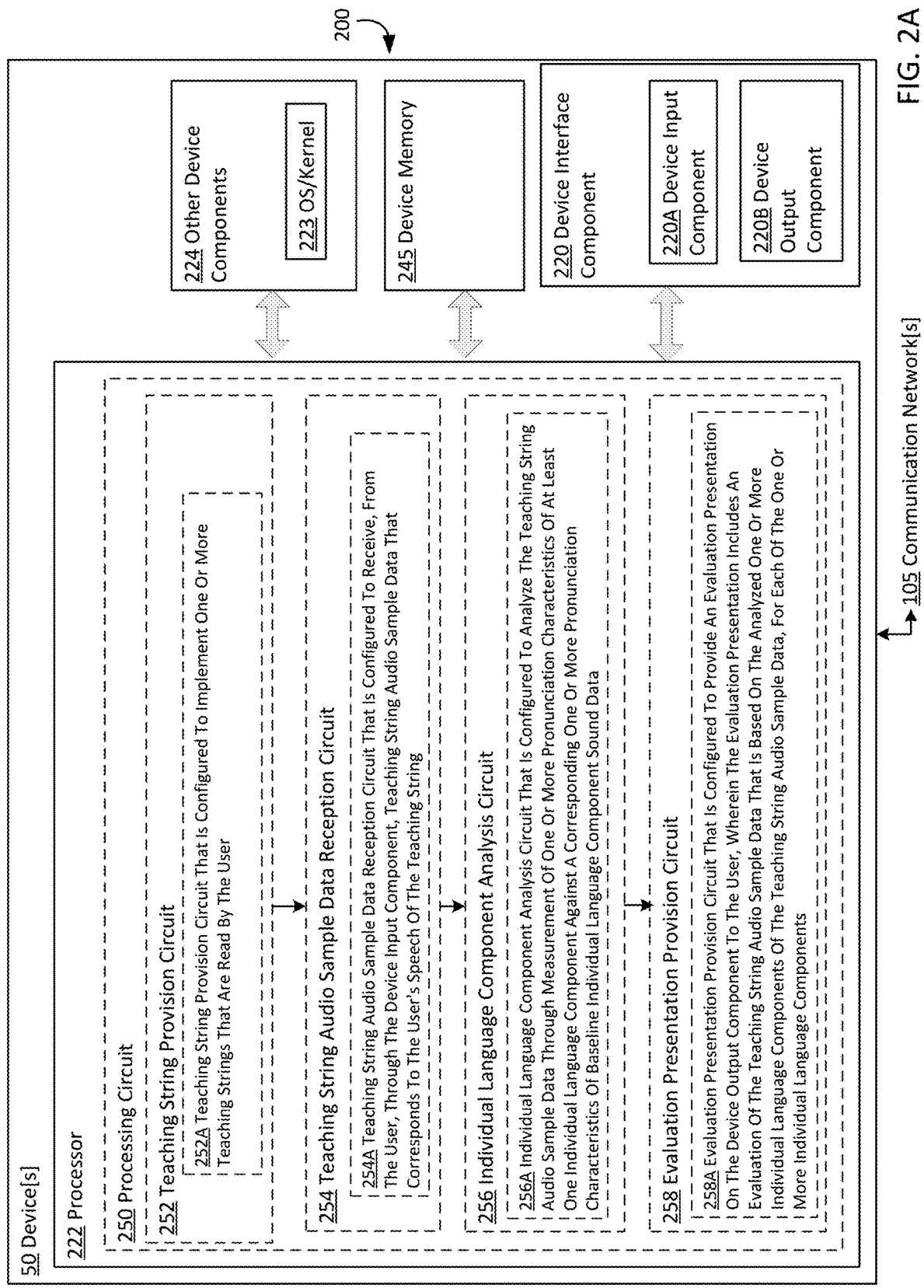

Referring now to FIG. 2A, FIG. 2A shows a device 50 according to one or more implementations. As shown in FIG. 2A, device 50 may include a processor 222, a device memory 245, a device interface component 220, and other device components 224. These components will be discussed in more detail herein. It is noted that this is not a complete list of components of device 50, and some components that are listed may be omitted or performed elsewhere. For example, in a distributed environment, the device memory 245 may be physically separated from device 50, and may be, for example, a shared memory. Similarly, processor 222 may be a distributed processor.

As set forth above, in one or more various implementations, device 50 may include a device memory 245. In an embodiment, device memory 245 may include one or more of random access memory ("RAM"), read only memory ("ROM"), flash memory, hard drives, disk-based media, disc-based media, magnetic storage, optical storage, volatile memory, nonvolatile memory, and any combination thereof. In an embodiment, device memory 245 may be separated from the device, e.g., available on a different device on a network, or over the air. For example, in a networked system, there may be one or more devices 50 whose device memory 245 is located at a central server that may be a few feet away or located across an ocean. In an embodiment, device memory 245 may include one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In an embodiment, device memory 245 may be located at a single network site. In an embodiment, device memory 245 may be located at multiple network sites, including sites that are distant from each other.

As set forth above, in one or more various implementations, device 50 may include a device interface component 220, as shown in FIG. 2A. As described herein, device interface component 220 is intended to represent all of the components that handle input and output of device 50, e.g., the interactions with user 150. For ease of explanation, in various implementations, device interface component 220 may include a device input component 220A and a device output component 220B. Although shown separately in FIG. 2A and as described throughout this application, it is noted that there may be substantial overlap, in both hardware and software/programming, between device input component 220A and device output component 220B. For example, a touchscreen monitor may serve as both part of device input component 220A and device output component 220B. Each of device input component 220A and device output component 220B may include many various components and the associated drivers, programs, and software that allow those components to function. In various implementations, an incomplete, non-limiting list of components that may be included in device input component 220A include a keyboard, a keypad, a gamepad, a touchscreen, a microphone, a headset, a gesture tracker, an optical tracker, a camera, and a webcam, or any combination thereof. In various implementations, an incomplete, non-limiting list of components that may be included in device output component 220B include a display, a touchscreen, a projector, an augmented reality projection, a virtual reality projection, a speaker, a set of headphones, and a haptic feedback.

Additionally, device interface component 220 may include the circuits formed by software programs that allow interaction with device 50, e.g., a computer. For example, in an implementation where device 50 is a computer, device interface component 220 may include the circuitry formed by software programs that make up a web browser. The web browser circuitry, in some implementations, allows interaction with the user to reach the circuitry that is claimed in this invention. This circuitry may alternatively be part of processor 222, and may be integrated into the circuitry that is claimed in this invention, though explicitly not claimed as part of the invention to allow for the contemplation of various interfaces. As another example, in an implementation where device 50 is a smartphone, e.g., an Apple iPhone or a Samsung phone running android, and connected to a various "app store" or "play store," an application that configures the circuitry of processor 222 into the circuits claimed the invention, may interface with the circuitry of processor 222 that allows user 150 to interact with the smartphone device, e.g., through device interface component 220.

As set forth above, in one or more various implementations, device 50 may include other device components 224. Other device components 224 are primarily shown for illustration, e.g., that the list of components set forth here for device 50 is not intended to be an exhaustive or complete list. For example, other device components 224 may include, for example, an operating system (OS) or kernel 223. In other implementations, other device components 224 may include a graphics card, a GPU, processors other than processor 222, persistent storage, and other components known in the art as optionally part of devices 50.

Referring again to FIG. 2A, device 50 may include processor 222, as previously described. In an implementation, processor 222 may be configured by instructions to form processing circuit 250. In another implementation, processing circuit 250 may be a persistent part of processor 222, e.g., in the form of an Application-Specific Integrated Circuit (ASIC) or a Field Programmable Gate Array (FPGA). In an implementation, only portions of processing circuit 250 may exist at any given snapshot in time, as processor 222 executes instructions and then re-purposes its logic gates and transistors in accordance with the instructions that are received. In an implementation, e.g., in an implementation in which processor 222 executes pipelining of instructions, portions of processing circuit 250 may not exist all at the exact same instant in time, but are formed to completion as processor 222 forms itself based on instructions received.

Referring again to FIG. 2A, processing circuit 250 may include, at one or more times, and not necessarily concurrently or in the order shown in FIG. 2A, a teaching string provision circuit 252, a teaching string audio sample data reception circuit 254, an individual language component analysis circuit 256, and an evaluation presentation provision circuit 258.

Figure 9:
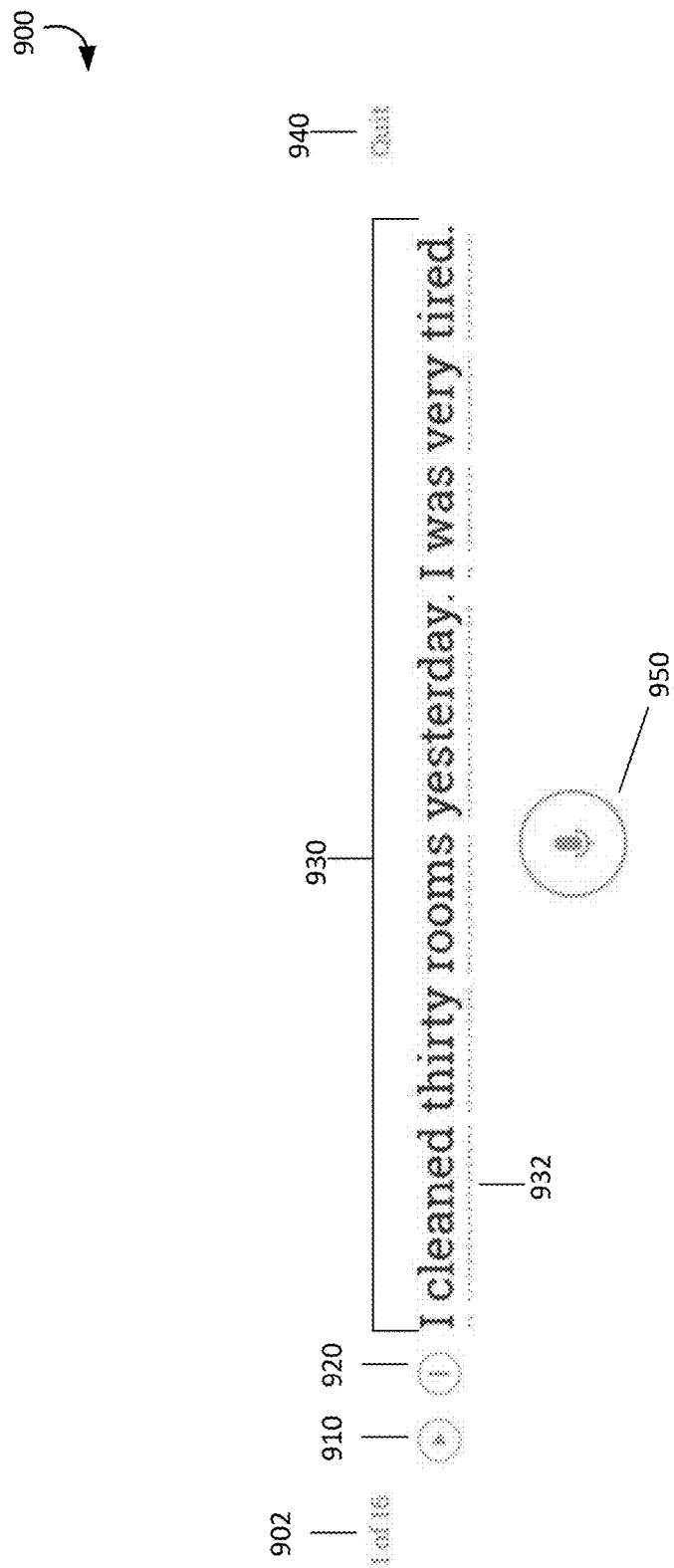
FIG. 9 is an exemplary screen shot/implementation of a presentation of a training string, according to embodiments of the invention.

As shown in FIG. 2A, in one or more implementations, teaching string provision circuit 252 may be configured to provide, to a user, through the device output component of the device interface component, a teaching string that is read by the user 252A. For example, teaching string provision circuit 252 may initially provide, to the user, a visual or audio representation of the teaching string. For example, the teaching string may be "I cleaned thirty rooms yesterday. I was very tired." The visual representation may first show the words to be pronounced to the user. For example, in FIG. 9, FIG. 9 shows a visual representation of the teaching string according to various implementations. As shown in FIG. 9, the teaching string, e.g., teaching string 930, is "I cleaned thirty rooms yesterday. I was very tired."

As shown in FIG. 9, the visual representation may have various components according to different implementations. For example, in an implementation, FIG. 9 represents a first teaching string of a sequence of sixteen teaching strings. This is shown by teaching string identification number 902, which identifies the teaching string as string "1 of 16." In other implementations, this visual representation could have other formats, such as "1/16" or fifteen red dots and one green dot. In an implementation, play button 910 allows the user an interactive button that will present an audio representation of the entire teaching string. As shown in FIG. 9, the teaching string 930 is prominently displayed, with each word, e.g., word 932, being separated and clearly shown. In an implementation, interacting with (e.g., clicking) on the individual word may cause a visual representation of the phonemes of the word to be displayed, or in another implementation, may cause an audio presentation of the pronunciation of that word. In another implementation, interacting with the individual word may bring up a visual representation of one or more pronunciation characteristics of the individual word. Further, as shown in FIG. 9, there is an information icon, e.g., information button 920, which may display the teaching string 930 in a native language of the user, or a default native language (e.g., Spanish), in order to orient the user or remind the user of the meaning of the teaching string 930. When the user is ready to speak the teaching string, the user may interact with speech button 950, which will trigger the device interface component 220 to begin accepting the user's speech of the teaching string 930. Finally, the visual representation 900 may include a quit button 940 to quite the lesson or the program and return to a different screen.

Referring again to FIG. 2A, in an implementation, teaching string provision circuit 252 may carry out operation 502, e.g., providing at least one teaching string configured to be read by a user, which will be discussed in more detail further herein with respect to FIG. 5. In an implementation, teaching string provision circuit 252 interacts with device interface component 220 to provide the visual and audio representations of the teaching string.

Referring again to FIG. 2A, in an implementation, processing circuit 250 may include teaching string audio sample data reception circuit 254 in various implementations. As shown in FIG. 2A, e.g., in sub-operation 254A, teaching string audio sample data reception circuit 254 may be configured to receive, from the user, through the device input component 220A, teaching string audio sample data that corresponds to the user's speech of the teaching string. For example, when the user speaks the example teaching string "I cleaned thirty rooms yesterday. I was very tired," into the device input component 220A, e.g., a microphone, the audio data captured by the device input component 220A may be received by the processing circuit 250, e.g., the teaching string audio sample data reception circuit 254. In an implementation, teaching string audio sample data reception circuit 254 may handle some of the data processing of the audio data, e.g., compression, conversion into a particular format, signal pre-processing (e.g., to reduce background noise, but not normalization, e.g., as in a common speech recognition engine), and the like. In other implementations, those functions are handled by different circuits of processor 222. As will be discussed in more detail with respect to FIG. 5, in an implementation, teaching string audio sample data reception circuit 254 may carry out operation 504, e.g., receiving teaching string audio sample data that corresponds to the user's speaking of the teaching string.

Referring again to FIG. 2A, in an implementation, processing circuit 250 may include individual language component analysis circuit 256. For example, in an implementation, e.g., as shown in sub-operation 256A, the individual language component analysis circuit 256 may be configured to analyze the teaching string audio sample data through measurement of one or more pronunciation characteristics of at least one individual language component against a corresponding one or more pronunciation characteristics of baseline individual language component data. That is, the analysis of the teaching string is carried out primarily by individual language component analysis circuit 256, although in other implementations, other portions of processing circuit 250 may carry out some of the analysis. In an implementation, portions or all of individual language component analysis circuit 256 may be built in a device external to device 50, however, in other implementations, the individual language component analysis circuit 256 is part of processor 222. It is noted that the circuit is named "individual language component analysis circuit," and this is because the primary analysis is carried out on individual language components. Nevertheless, the title of the circuit should not imply that the individual language component analysis circuit 256 cannot or does not carry out analysis on the entire teaching string, e.g., a holistic analysis of the teaching string audio sample data received by the teaching string audio sample data reception circuit 254. For example, in addition to individual language component analysis, the teaching string audio sample data may be analyzed for overall speed, pitch variation, and transition smoothness.

In an implementation, individual language component analysis circuit 256 may include speech evaluation engine 310, as shown in FIG. 3. The details of speech evaluation engine 310 will be discussed in more detail with respect to FIG. 3. In an implementation, however, the individual language component analysis circuit 256 breaks down the teaching string audio sample data into one or more individual language components. In an implementation, the individual language components may be utterances, e.g., phonemes, e.g., units of a phonetic system of a language that correspond to a speech sound and which are perceived as a single distinctive sound in the language by the human ear. In other embodiments, individual language components may be syllables, diphthongs, digraphs, any other phonetic unit, words, clauses, sentences, paragraphs, or sets of paragraphs or groups of text. The individual language component analysis circuit 256 may separate the teaching string audio sample data into the individual language components through one or more known techniques for separating speech audio data into its component parts. In an implementation, individual language component analysis circuit 256 may iteratively search through the teaching string audio sample data to extract individual language components known to be a part of the teaching string audio sample data. In an implementation, the individual language component analysis circuit 256 may use audio pattern matching, among other techniques, to carry out this search. Then, the individual language components are measured against baseline individual language components that are drawn from a database, e.g., as will be discussed in more detail herein.

In an implementation, the individual language components are measured against baseline individual language components using one or more pronunciation characteristics. A pronunciation characteristic is any measurable component of the speech of an individual language component. Some of the exemplary pronunciation characteristics include pitch, intonation, frequency, stress, and accent. Each of the pronunciation characteristics of each individual language component is compared against each pronunciation characteristic of its corresponding baseline individual language component, to generate various scores for each individual language component. Various scoring mechanisms may be used, for example, a binary scoring mechanism may be used, where the pronunciation characteristic of the individual language component is either a match (1) or not a match (0) with the corresponding pronunciation characteristic of the corresponding baseline individual language component. In another implementation, a numeric scoring mechanism may be used, e.g., 1 to 100, with 1 being the least match, and 100 being an exact match between the pronunciation characteristic of the individual language component and the corresponding pronunciation characteristic of the corresponding baseline individual language component. In yet another implementation, a threshold scoring mechanism may be used, e.g., 1 to 5, or word phrases such as "very bad," "bad," "average," "good," and "very good," depending on the closeness of the match and whether the match crosses the necessary threshold line. In this implementation, as will be discussed in more detail herein, the score for the match may be illustrated by color-coding the outputted evaluation, but any known method of illustrating a scoring system may be used. In another implementation, individual language component analysis circuit 256 may use the fine-grained scores outlined above to give the user feedback regarding what individual language component the spoken individual language component actually sounded like, which can be derived from the scores given to the one or more pronunciation characteristics of the individual language component or derived from the individual language component pattern matching performed on the teaching string audio sample data.

Figure 4:
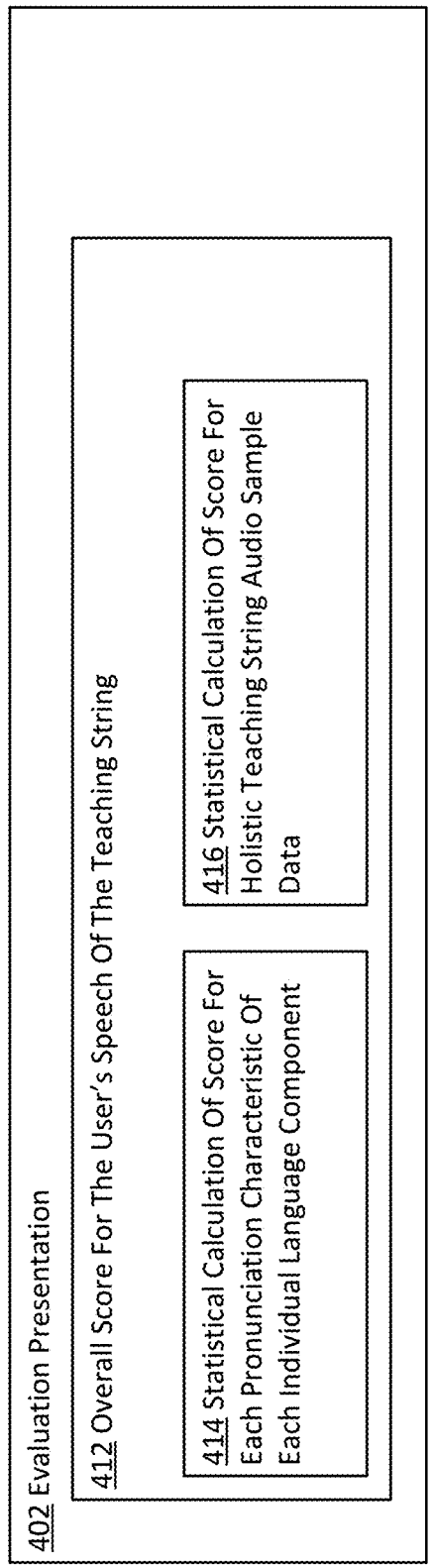
FIG. 4 shows an exemplary implementation of the evaluation presentation 402, according to various embodiments of the invention.

After analysis of the teaching string audio sample data has been completed, individual language component analysis circuit 256 completes its operations and evaluation presentation provision circuit 258 may begin its operations. Referring again to FIG. 2A, in an implementation, processing circuit 250 of processor 222 may include evaluation presentation provision circuit 258. In an implementation, evaluation presentation provision circuit 258 may be configured to provide an evaluation presentation on the device output component 220B, to the user. In an implementation, as shown in sub-operation 258A, the evaluation presentation provision circuit is configured to provide an evaluation presentation on the device output component to the user, wherein the evaluation presentation includes an evaluation of the teaching string audio sample data that is based on the analyzed one or more individual language components of the teaching string audio sample data, for each of the one or more individual language components. The evaluation presentation includes an evaluation of the teaching string audio sample data that is based on the analyzed one or more individual language components of the teaching string audio sample data, for each of the one or more individual language components. In an implementation, each pronunciation characteristic of each individual language component that was measured against its baseline has a score, e.g., a quality score, associated with it, and those quality scores are part of the evaluation presentation. The quality scores may be shown in their individual capacity, or may be summed up, using various techniques, to arrive at an overall score. For example, FIG. 4 shows an evaluation presentation 402 that includes an overall score 412. Overall score 412 for the user's speech of the teaching string may include the statistical calculation 414, as just described, and/or a statistical calculation 416 that also takes into account a score assigned to the teaching string audio sample data as a whole.

Referring again to FIG. 2A, in an implementation, evaluation presentation provision circuit 258 may present the evaluation that is based on the analysis performed by individual language component analysis circuit 256, as previously discussed. In an implementation, evaluation presentation provision circuit 258 may carry out operation 508, e.g., providing an evaluation presentation to the user. An exemplary evaluation presentation will be shown with respect to the screen shot shown in FIG. 10.

Figure 10:
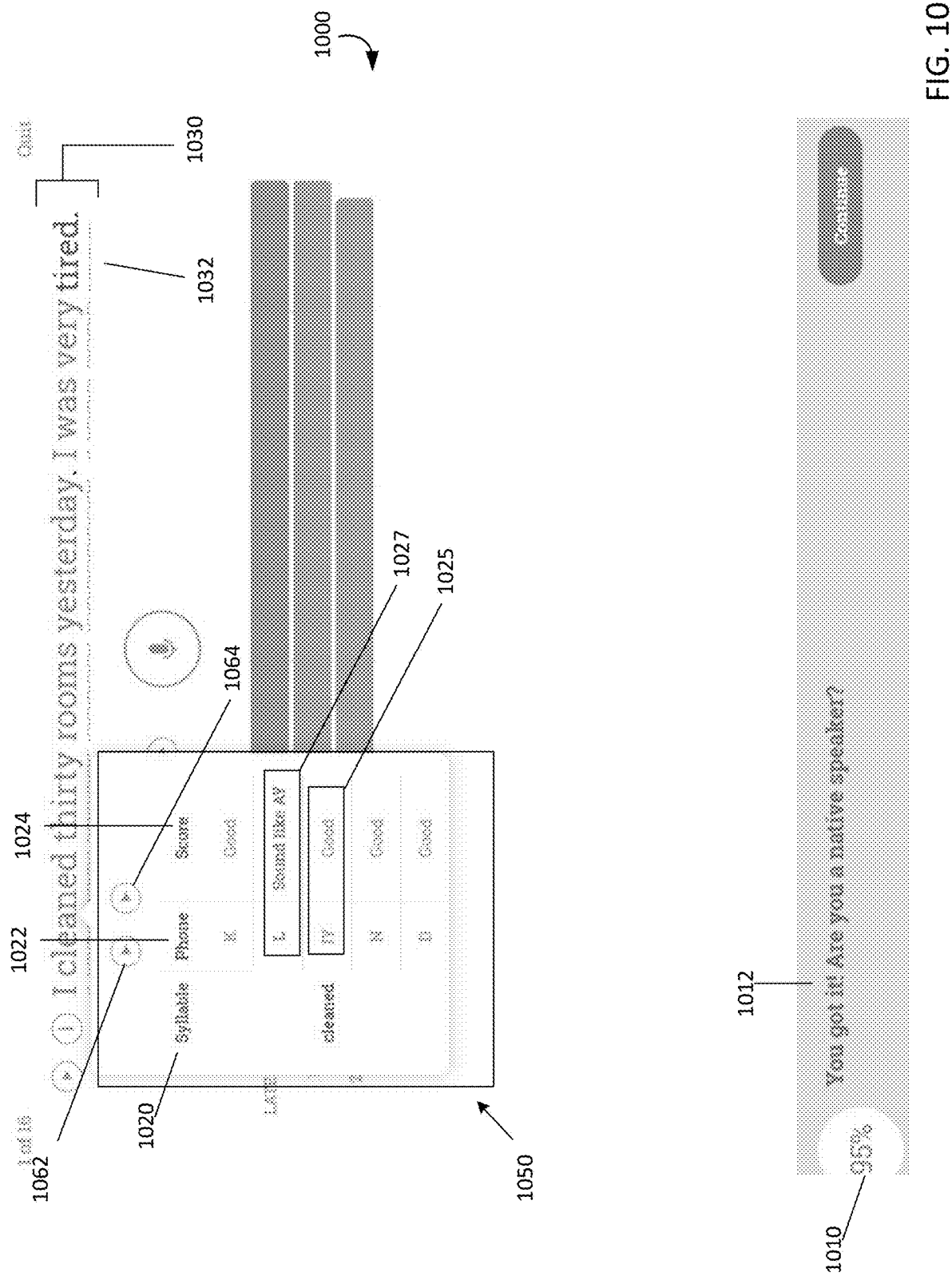
FIG. 10 is an exemplary screen shot/implementation of a presentation of an evaluation of the user's audio sample of the training string, according to embodiments of the invention.

Referring to FIG. 10, FIG. 10 shows an evaluation presentation according to an exemplary embodiment. As shown in FIG. 10, FIG. 10 includes an overall score 1010, which in the illustrated example is 95%, which leads the system to add the sentence 1012, "You got it! Are you a native speaker?" FIG. 10 also shows the entire teaching string 1030, similar to teaching string 930, except now, through use of color, each word in the teaching string that did not meet an overall score for that particular word, is colored in red, for example word 1032, e.g., the word "tired" in FIG. 10, is colored red, indicating that the overall score for that particular word was insufficient to demonstrate correct pronunciation. (It is noted that the scores here are merely exemplary—e.g., missing a word would ordinarily bring a score below 95%, but FIG. 10 is intended to show an example only, not an exact numerical calculation).

Referring again FIG. 10, in an implementation, when the user interacts with a particular word, e.g., the word "cleaned" in FIG. 10, a pop-up appears, e.g., pop-up box 1050. Pop-up box 1050 includes a great amount of additional detail regarding the specific word "cleaned" and its pronunciations. Pop-up box 1050 includes the "syllable" or "whole word" column, in this case shown as column 1020, which indicates that the word is "cleaned." The second column, phoneme column 1022, shows the word "cleaned" broken down into its individual language components, e.g., in the example shown, phonemes or phonetic sounds, e.g., "K", "L", "IY", "N" and "D." In the third column, score column 1024, the score for that particular individual language component is given. In the example shown in FIG. 10, row 1025 shows the individual language component "IY," which received a score of "good," indicated by the textual word and the color in this example. In the example in row 1027, the phoneme "L" did not receive a good score, as indicated by the color, and the textual indication that it "sounded like AY." This is because, in an implementation, as mentioned above, the individual language component analysis circuit 256 scored the pronunciation characteristics of the individual language component, and determined what other individual language component the actual speech sounded like, in this case, the "L" phoneme/sound, sounded like the "AY" phoneme sound, and the red coloring indicates that the score for that individual language component was not high enough for a good score. It is noted, however, that the pronunciation score for the entire word was sufficient to receive a green color for the entire word, since four of the five individual language components of the word determined to be close enough to their baseline individual language components for a "good" score.

Referring again to FIG. 10, in an implementation, pop-up box also includes a baseline play button 1062 and a user sample play button 1064. Pressing the baseline play button 1062 causes the device output component 220B to deliver an audio presentation of the baseline individual language components that make up that word, e.g., "cleaned" in FIG. 10. Pressing the user sample play button 1064 causes the device output component 220B to deliver an audio presentation of the teaching string audio sample data corresponding to that set of individual language components.

Referring now to FIG. 2B, FIG. 2B shows some additional circuits that may be part of processing circuit 250, in various implementations. For example, in an implementation, processing circuit 250 may include a teaching string audio sample data evaluation collection circuit 262. In an implementation, e.g., as shown in sub-operation 262A, teaching string audio sample data evaluation collection circuit 262 may be configured to collect the evaluation of the teaching string audio sample data that includes an evaluation of each of the one or more pronunciation characteristics of the one or more individual language components. For example, in an implementation, the evaluations are collected, e.g., stored in memory, e.g., in device memory 245 or in another memory, which may be remote from device 50. For example, in an implementation, a user may complete multiple lessons, each with their own teaching string audio sample data. The evaluation of the teaching string audio sample data that is generated by individual language component analysis circuit 256 and presented by the individual language component analysis circuit 256 may be collected by teaching string audio sample data evaluation collection circuit 262 for further analysis and use in giving the user feedback. This serves several purposes. First, it allows the user to go back and review their precise mistakes, allowing the user to see, without undue difficulty, the portions with which the user has trouble. Second, it allows a language instructor, tutor, teacher, or other person who is assisting the user in learning or improving their language skills, to see exactly where the user is weak and strong in their language skills. Third, it allows machine learning/intelligence amplification to be applied to the various collected scores, to determine, through automation, the user's strong language skills and the user's weak language skills. The end result is that a user's weak and strong points can be identified more quickly, and targeted in further iterations of teaching strings, thus reducing the overall time required for the user to achieve the desired level of fluency in the target language.

Referring again to FIG. 2B, teaching string audio sample data evaluation collection circuit 262 may include teaching string audio sample data evaluation collection and storage circuit 268, which may be configured to store the collected evaluations of the teaching string audio sample data, and store them in memory, e.g., in device memory 245 or in another memory, which may be remote from device 50. The storage in memory may be temporary, e.g., long enough for processing, or it may be persistent, e.g., stored on physical media, e.g., a hard disk drive, flash memory, a memory card, or other similar storage.

Referring again to FIG. 2B, FIG. 2B shows some additional circuits that may be part of processing circuit 250, in various implementations. For example, as shown in FIG. 2B, processing circuit 250 may include a further teaching string determination circuit 264. In an implementation, e.g., as shown in sub-operation 264A, the further teaching string determination circuit 264 may be configured to determine one or more further teaching strings at least partly based on the collected evaluation of the teaching string audio sample data. The one or more further teaching strings are calculated to improve the user's spoken language skill when captured from the user for analysis and evaluation by the device. For example, if a user repeatedly has low scores on the pronunciation characteristic of "pitch" across multiple individual language components, then future lessons (e.g., sets of teaching strings to be presented to the user), may include teaching strings that focus on situations where correct "pitch" is emphasized. Similarly, if the user repeatedly has low scores of multiple pronunciation characteristics for the individual language component that is the "IY" phoneme, then future lessons may include teaching strings that include the "IY" phoneme in various letter forms and/or in various words and/or in various locations of words, so that the user may more quickly train their weaker spots. Referring again to FIG. 2B, this determination may be done at a remote server, e.g., server 10. An example of this implementation is described in FIG. 2B with respect to further teaching string reception circuit 266, which, in various implementations, may be configured to receive one or more further teaching strings that were determined, at a remote server. The one or more further teaching strings are at least partly based on the collected evaluation of the teaching string audio sample data, to be calculated to improve the user's spoken language skill when captured from the user for analysis and evaluation.

In another implementation, the collected evaluations of teaching string audio sample data may be reviewed by a person or entity that is assisting the user in learning or improving their language skills. That person may be assisting a set of people, and, in various implementations, that person may have access to viewing the collected evaluations of teaching string audio sample data for the entire set of people at once, so that the person may determine which of her users need more help in a particular area, which ones are falling behind, and which ones have not grasped the core concepts of the language yet. These and other implementations will be discussed in more detail herein.

Referring now to FIG. 2C, FIG. 2C shows one or more additional circuits that may be part of processing circuit 250, in various implementations. For example, in an implementation, teaching string provision circuit 252 of processing circuit 250 may include teaching string provision circuit 294 (e.g., as shown in FIG. 2F). Teaching string provision circuit 294 may include a teaching string visual provision circuit 272. In an implementation, e.g., as shown in sub-operation 272A, the teaching string visual provision circuit 272 may be configured to provide, to the user, through the device output component 220B, a visual representation of the teaching string that is to be read by the user. For example, in an implementation, device output component 220B may include a touchscreen of a cellular telephone. On that touchscreen, teaching string visual provision circuit 272 may cause the teaching string to be displayed, e.g., teaching string 930 of FIG. 9. In an implementation, teaching string provision circuit 252 may further include teaching string audio provision circuit 274, which may be configured to provide, e.g., as shown in sub-operation 274A, to the user, through device output component 220B, an audio representation, e.g., a sound coming through speakers or headphones, of the teaching string that is to be read by the user. In the example shown in FIG. 9, the user presses a button to trigger an audio representation, but in other implementations, the audio representation may play automatically, or at a predetermined time, or based on other interactions with the user through the device input component 220A.

Referring again to FIG. 2C, in an implementation, teaching string provision circuit 294 (shown in more detail in FIG. 2F) of teaching string provision circuit 252, which is part of processing circuit 250, may include a teaching string interactive visual provision circuit 273, which may be configured to provide, e.g., as shown in sub-operation 273A, to the user, through the device output component 220B, an interactive visual representation of the teaching string that is to be read by the user. The interactive visual representation may be clicked on, e.g., in the example shown in FIG. 9, the user presses a button to trigger an audio representation. In an implementation, the audio representation that is triggered may be the entire teaching string, which is performed by teaching string responsive audio provision circuit 275, that is configured to provide, e.g., as shown in sub-operation 275A, to the user, through the device output component 220B, an audio representation of the entire teaching string that is to be read by the user, in response to user interaction with at least one portion of the interactive visual representation of the teaching string. It is noted that the "interactive visual representation of the teaching string" does not have to be the teaching string itself, rather, in various implementations, the interactive visual representation may include one or more buttons, and the user may click one or more of those buttons in order to trigger the audio presentation of the entire teaching string.

In another implementation, the audio representation that is triggered may be a portion of the teaching string that is to be read by the user, e.g., which may be performed by a substring of a teaching string responsive audio provision circuit 277, which may be configured to provide, e.g., as shown in sub-operation 277A, to the user, through the device output component 220B, an audio representation of a portion of the teaching string (e.g., a substring) that is to be read by the user, in response to user interaction with at least one portion of the interactive visual representation of the teaching string. For example, in an implementation, clicking on a specific word of the teaching string may result in triggering an audio representation of only that word to be played. In another embodiment, clicking on a specific word of the teaching string may bring up a menu of the individual language components of that word, and clicking through to one of those components may trigger an audio representation of only that individual language component.

Figure 2D:
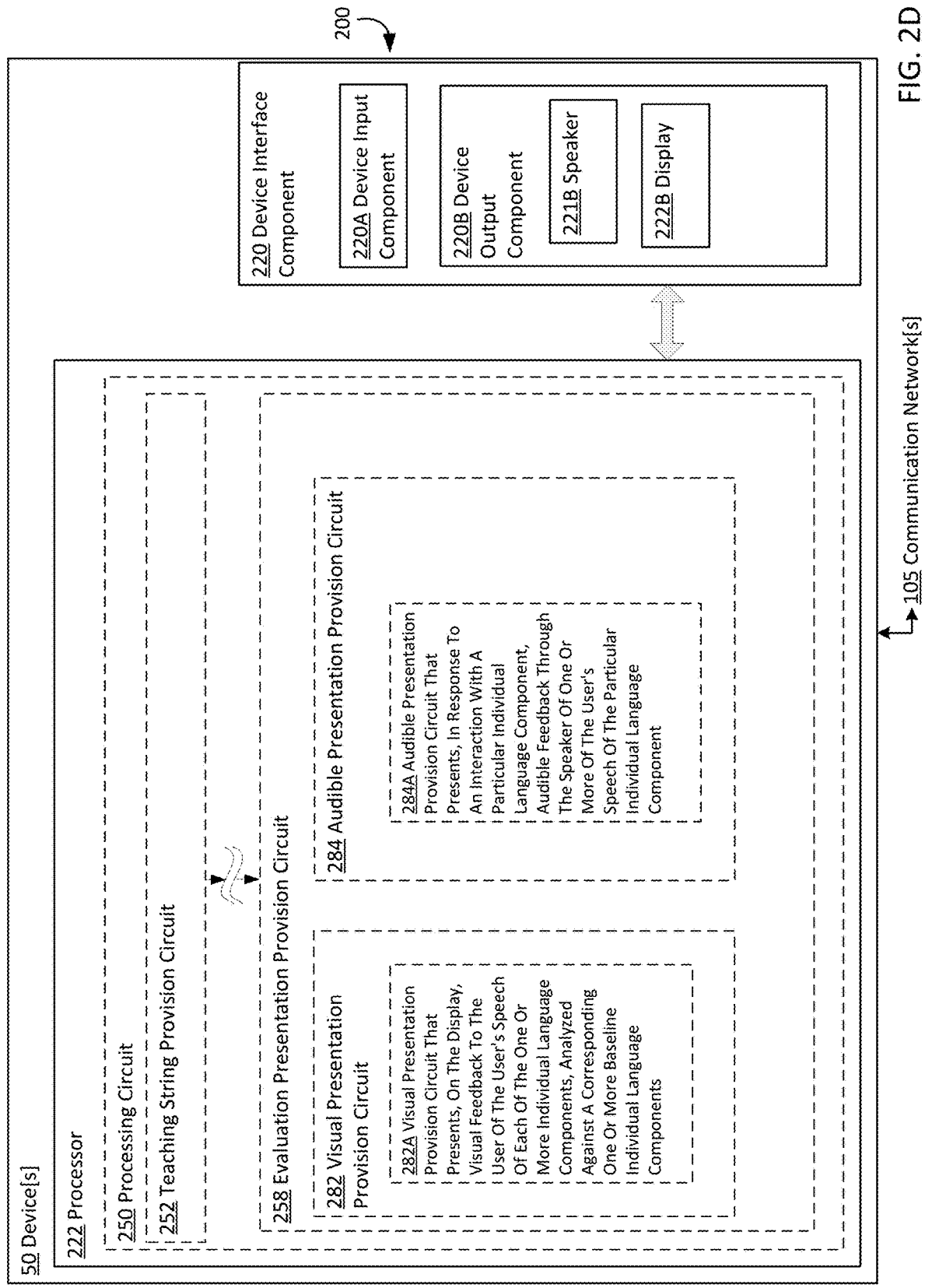

Referring now to FIG. 2D, in an implementation, evaluation presentation provision circuit 258 of processing circuit 250 may include a visual presentation provision circuit 282 that is configured to present, on the display, visual feedback to the user of the user's speech of each of the one or more individual language components, analyzed against a corresponding one or more baseline individual language components. For example, the visual feedback may be a breakdown of what the user's pronunciation of the individual language component actually sounded like. In another implementation, the visual feedback may be a color, indicating a binary or threshold score for the pronunciation of that individual language component, which may be a phoneme, syllable, word, or sentence. Similarly, in an implementation, evaluation presentation provision circuit 258 of processing circuit 250 may include an audible presentation provision circuit 284 that is configured to present, in response to an interaction with a particular individual language component, audible feedback through the speaker of one or more of the user's speech of the particular individual language component. For example, as shown in FIG. 10 and as previously described, if the user clicks on the button 1025 for a particular word or syllable, audible presentation provision circuit 284 will play audible feedback of what that individual language component is supposed to sound like, and if the user clicks on the button 1027 for the particular word or syllable, audible presentation provision circuit 284 will present audible feedback of what the user's pronunciation of the individual language component sounded like.

Figure 2E:
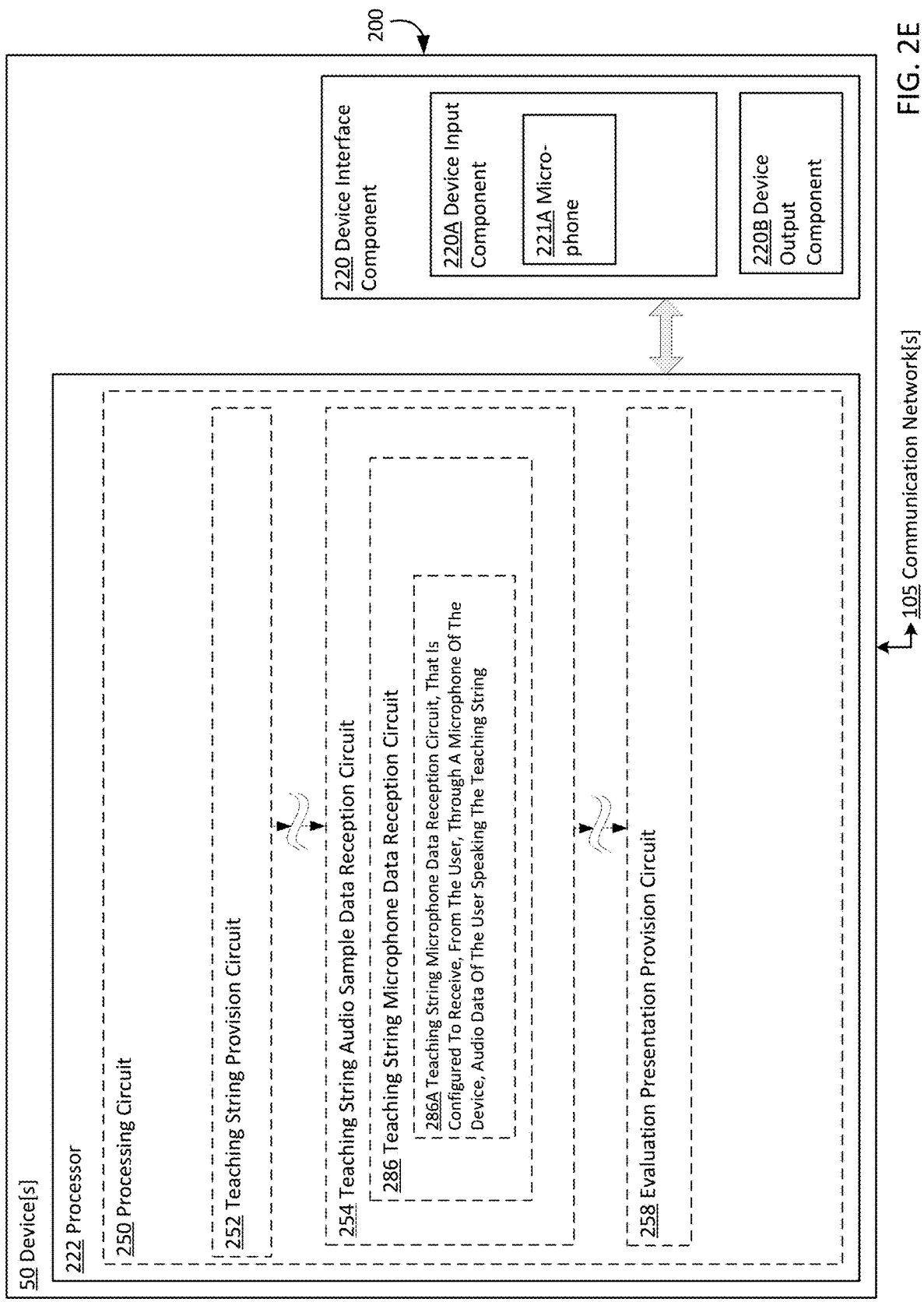
Figure 2F:
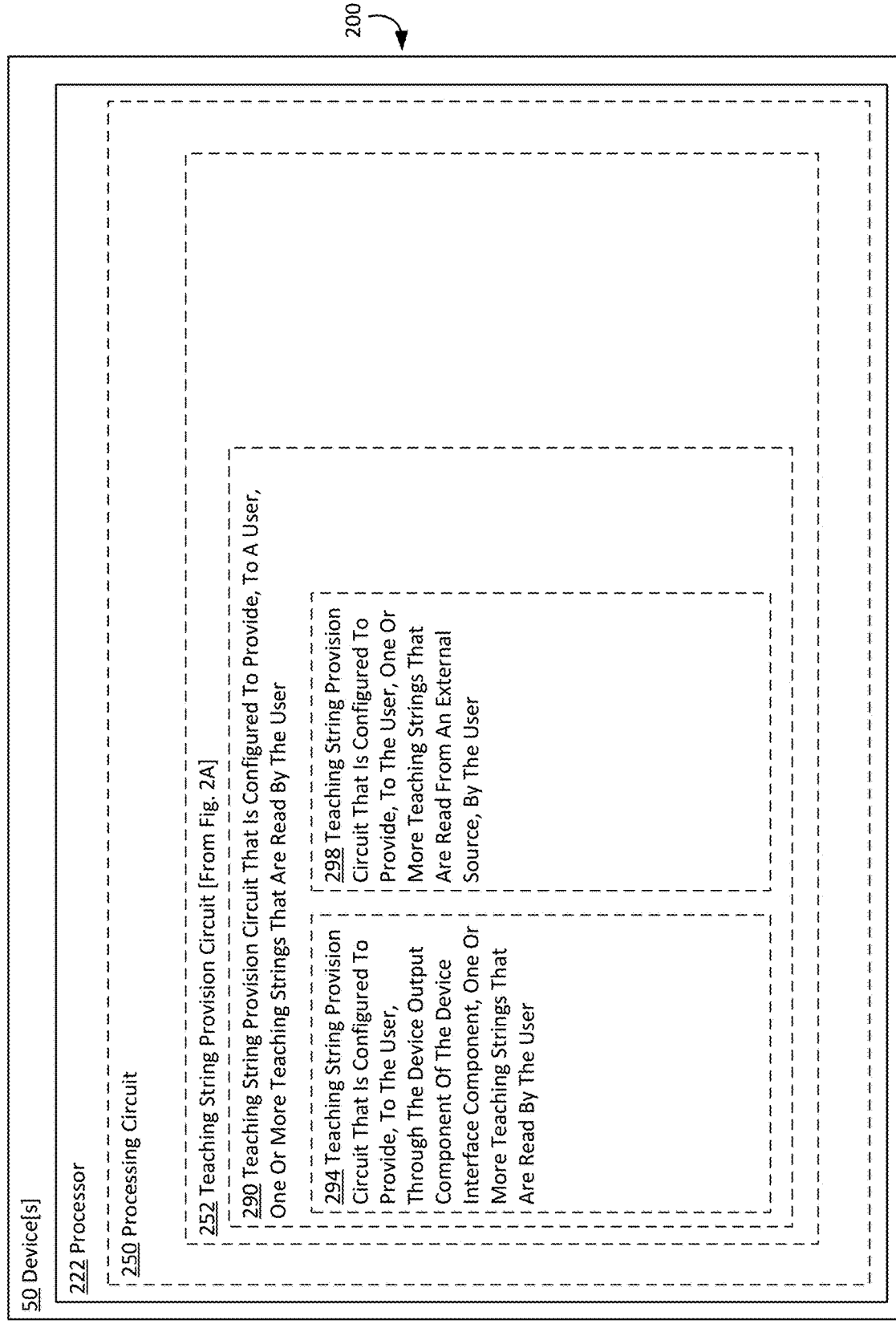

Referring now to FIG. 2E, in an implementation, teaching string audio sample data reception circuit 254 of processing circuit 250 may include a teaching string microphone data reception circuit 286 that is configured to receive the teaching string audio sample data, that is the audio data of the user speaking the teaching string. In an implementation, teaching string microphone data reception circuit 286 may trigger recording from the microphone automatically. In another implementation, e.g., as shown in FIG. 9, the user may interact with some portion of the presentation to trigger the beginning of the recording, by the microphone, of the teaching string audio sample data.

As mentioned above, individual language component analysis circuit 256 may include a speech evaluation engine 310 which was previously discussed in the context of individual language component analysis circuit 256 and processor 250. FIG. 3, which will be discussed in detail immediately following, describes the specifics of the speech evaluation engine, according to one or more implementations. It is noted that there does not need to be a specific component called the speech evaluation engine, that is, in various implementations, individual language component analysis circuit 256 may handle all of the functions of speech evaluation engine 310, without being referred to or acting as speech evaluation engine 310.

Referring now to FIG. 2F, as noted above, the teaching string that is configured to be read by the user may or may not be shown to the user through the device output. In an implementation, teaching string provision circuit 252 of processing circuit 250 may include a teaching string provision circuit 290 that is configured to provide, to a user, one or more teaching strings that are read by the user. For example, in an implementation, a user may read the teaching string from a display of the device, may read the teaching string from the display of a different device (e.g., a separate screen, which may or may not be connected with and/or in communication with device 50), or may read the teaching string from a pre-set sheet of teaching strings. In another embodiment, the user may repeat the teaching string after it is pronounced or otherwise signaled by an instructor, tutor, evaluator, or other third party (e.g., parent, other student, or other related party, whether trained to assist in the speech evaluation or not).

Referring again to FIG. 2F, teaching string provision circuit 290 may include a teaching string provision circuit 294 that is configured to provide, to the user, through the device output component 220B of the device interface component 220, one or more teaching strings that are read by the user. It is noted that, in an implementation, one training string may be shown or displayed at a time. In other implementations, however, multiple training strings may be shown or displayed at a single time, or at various sequential times.

Referring again to FIG. 2F, teaching string provision circuit 290 may include a teaching string provision circuit 298 that is configured to provide, to the user, one or more teaching strings that are read from an external source, such as a display of a different device, a sheet of paper (e.g., a worksheet), or from the initial speaking by an instructor or other third party. It is noted that, in an implementation, one training string may be shown or displayed at a time. In other implementations, however, multiple training strings may be shown or displayed at a single time, or at various sequential times.

Speech Evaluation Engine

Figure 3A:
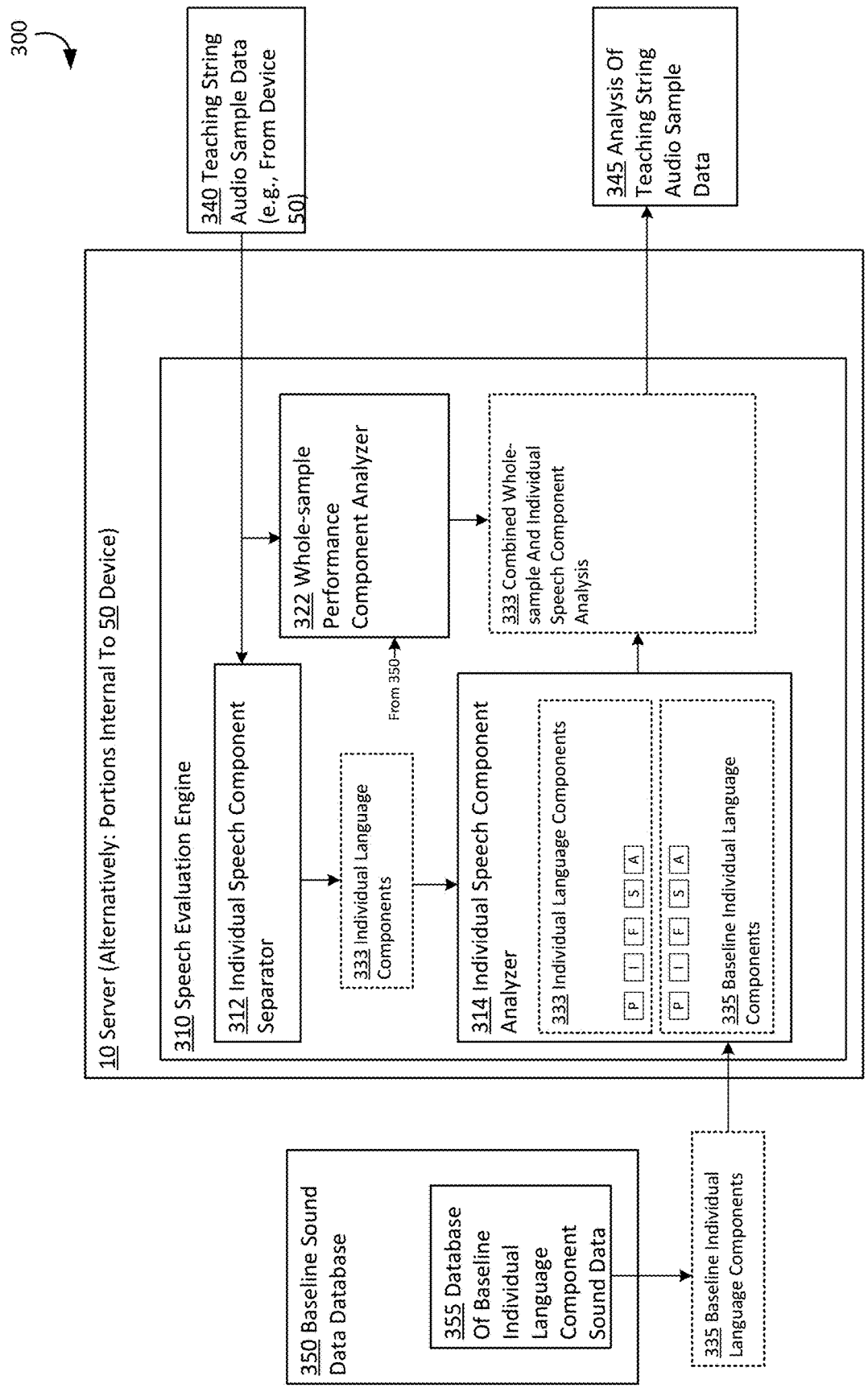
FIGS. 3A and 3B, shows an exemplary implementation of speech evaluation engine 310, according to various embodiments of the invention.
Figure 3B:
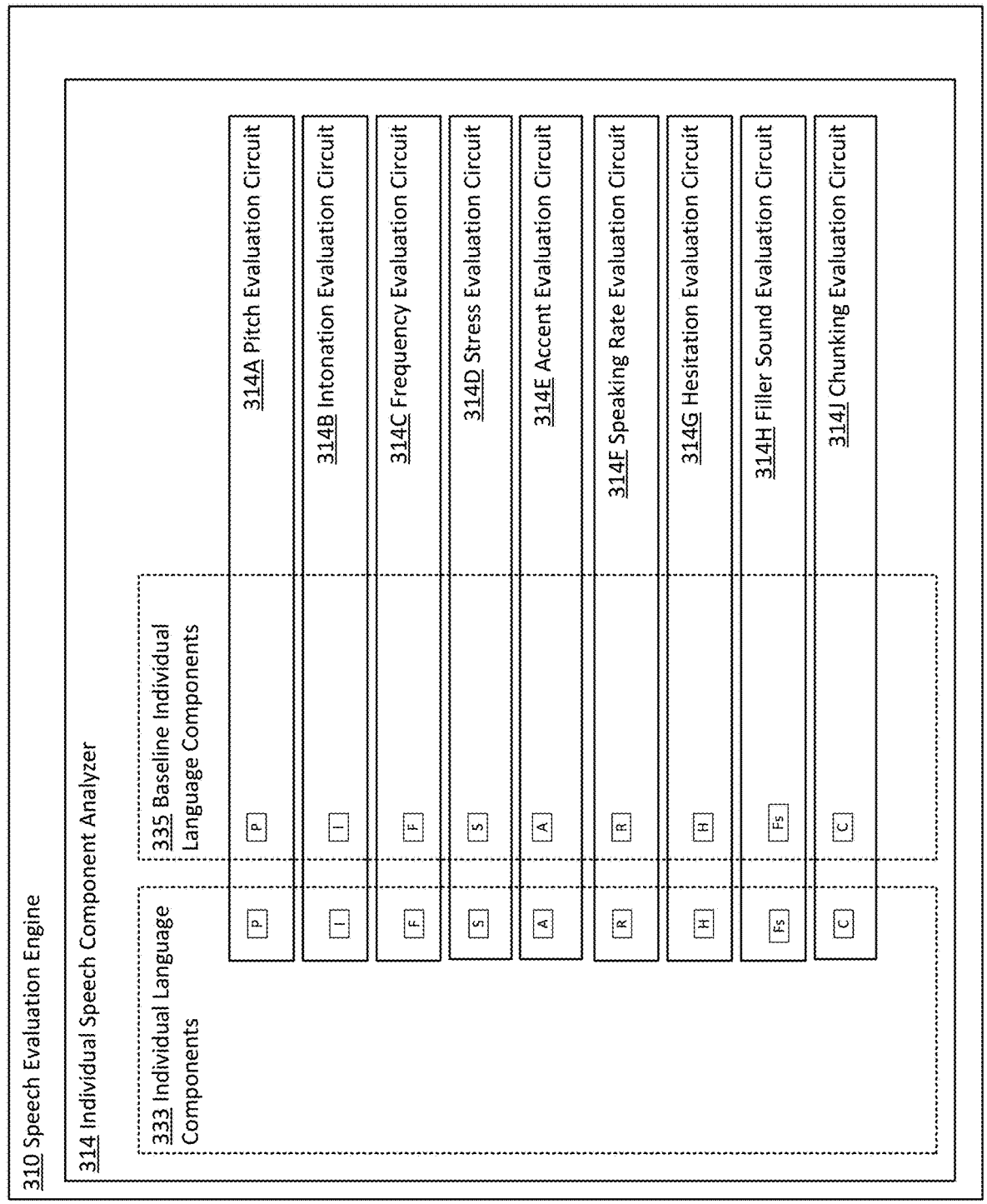

Referring now to FIG. 3, e.g., FIGS. 3A and 3B, FIG. 3 shows various implementations of a speech evaluation engine, e.g., speech evaluation engine 310 and some of the components associated with operation of the speech evaluation engine 310. As mentioned above, many systems exist for mere recognition of speech. These systems largely are designed for broad use cases, e.g., recognition across many accents, speech patterns, vocabularies, and levels of speech impairment for the user. Many of these systems use a speech recognition engine that recognizes a user's speech that compensates for the poor or variant speech of a user. In contrast, the systems, methods, and devices described throughout this application do not use a speech recognition engine, but a speech evaluation engine. Specifically, the speech evaluation engine does not compensate for poor or variant speech, but points it out. Thus, this engine has substantially greater nuance than a speech recognition engine. In contrast to a speech recognition engine, which discards much of the data regarding accent, intonation, pitch, frequency, and stress, in an attempt to normalize a user's speech so that it can perform pattern matching, the speech evaluation engine considers all of those factors when evaluating the quality of the speech, not what the speech actually says. In various implementations, the speech evaluation engine is not concerned with recognition of the words that the user is speaking, because the system may already know the words that the user is speaking, in part of its database. For example, the speech evaluation engine may receive the user's speech data, e.g., the teaching string audio sample data, and already has cataloged the speech that the user is attempting to speak, e.g., the teaching string. In this manner, the speech evaluation engine may focus on finely evaluating subtle nuances in the manner of speech of the user, nuances that would be discarded or intentionally smoothed and minimized by almost any speech recognition engine that focuses on determining which words the user speaks.

Thus, in various implementations, the speech evaluation engine is language and definition agnostic. The speech evaluation engine may be less concerned with the meanings of words, and more concerned with how close to "ideal" the pronunciation of the word is. The specific function of the speech evaluation engine, then, raises the question of how "ideal" pronunciations of words and sentences in a given language, e.g., English, are determined. In various implementations, the speech evaluation engine is "trained" on known training data sets of a large number, e.g., thousands or hundreds of thousands, generating pronunciations. It is noted here, as a matter of general convention, that "trained" or "training" refers to machine learning, e.g., Intelligence Amplification (IA), or, in some implementations, Artificial Intelligence (AI). In contrast, "teaching" is generally used to denote the effect of the various implementations of the invention on a user, e.g., "teaching" a new language, or "teaching" how to speak properly. These conventions hold generally true throughout this application unless context dictates otherwise. Thus, in various implementations, a training set is analyzed and modified, through use of various analysis techniques, including machine learning and intelligence amplification techniques, which will be discussed in more detail herein.

Referring now to FIG. 3A, FIG. 3A shows one exemplary implementation of the speech evaluation engine, e.g., speech evaluation engine 310 operating in an environment 300. It is important to note that the layout of speech evaluation engine 310 is merely for illustrative purposes and should not be limited to that specific layout, which was chosen merely for convenience and ease of illustration. In various implementations, parts of speech evaluation engine 310 may be in different places, or may be omitted altogether. In other implementations, speech evaluation engine 310 itself may be omitted or scattered across various parts of one or more of server 10 and/or device 50. As it would be nearly impossible to sketch all of the permutations of speech evaluation engine 310 contemplated by the invention herein, it is merely left as a reminder that the illustrated implementation is exemplary only, and the full scope of the claimed invention is limited only by the claims.

Additionally, although previously noted above generally, the arrows in FIG. 3A show "typical data flow," not process flow, as they are not parts of a method but exemplary components of a speech evaluation engine 310. As with all components of FIG. 3A, however, these arrows should not be taken as the only way that data may flow in speech evaluation engine 310. Data flows that are not helpful in comprehension are not shown, and in various other contemplated implementations, data may flow in different directions or in different manners or ways.

Specifically referring to FIG. 3A, the speech evaluation engine 310 may be part of the server 10, as illustrated in FIG. 3A, however, in other implementations, speech evaluation engine 310 may be integrated into device 50 as part of the circuitry of the device (e.g., whether a specific, single use device, or a multipurpose device coded to arrange its circuitry as described herein). In various implementations, the speech evaluation engine 310 may be split across server 10 and device 50, with server 10 having some of the circuitry and components and executing some of the functions of speech evaluation engine 310, and with device 50 having other circuitry, components, and execution of functions of speech evaluation engine 310. In various implementations, the roles of server 10 and device 50 are fixed with respect to implementation of speech evaluation engine 310, and, in other implementations, the roles of server 10 and device 50 in the implementation of speech evaluation engine 310 may dynamically change based on one or more factors, e.g., network conditions of communications network 105, or a type of device 50. For example, in an implementation, device 50 may not have the computational resources to run all of the components and circuitry of speech evaluation engine 310, either because the computational resources of device 50 are tied up in performance of other tasks, or because device 50 does not have the physical attributes to have sufficient computational resources. In such scenarios, some of the load of speech evaluation engine 310 may be shifted to server 10.

Referring again to FIG. 3A, FIG. 3A shows speech evaluation engine 310 according to one or more implementations. In an implementation, speech evaluation engine 310 may receive the teaching string audio sample data 340 from device 50. If speech evaluation engine 310 is internal to device 50, this reception may occur internally to device 50, e.g., across a bus or other internal pathway. If speech evaluation engine 310 is external to device 50, e.g., within server 10, the reception of teaching string audio sample data 340 may occur via communications network 105 or similar. Upon receipt of teaching string audio sample data 340 by speech evaluation engine 310, the speech evaluation engine 310, specifically individual speech component separator 312, may break down the teaching string audio sample data 340 into one or more individual language components 333. As will be discussed in more detail herein, individual language components 333 may be phonemes, e.g., units of a phonetic system of a language that correspond to a speech sound and which are perceived as a single distinctive sound in the language by the human ear. In other embodiments, individual language components 333 may be syllables, diphthongs, digraphs, any other phonetic unit, words, clauses, sentences, paragraphs, or sets of paragraphs or groups of text.

Referring again to FIG. 3A, in some implementations, after individual speech component separator 312 of speech evaluation engine 310 has broken down the teaching string audio sample data 340 into one or more individual language components 333, the one or more individual language components 333 are then compared to their corresponding baseline individual language components 335. As described briefly above, baseline individual language components 335 may be retrieved from an internal or external source, e.g., baseline sound data database 350, as shown in FIG. 3A. In various implementations, baseline sound data database 350 may be part of device 50, server 10, or may be a separate component, e.g., a different server at a different location. In various implementations, the baseline sound data database 350 may include the training data that determines the characteristics of the baseline individual language components 335. Baseline sound data database 350 may be a standard training set, e.g., "WSJCAMO," a British English speech corpus derived from a spoken Wall Street Journal text corpus, and the "Santa Barbara Corpus of Spoken American English," as two examples, although implementations described herein may use other corpora or a custom corpus or set of corpora. Moreover, baseline sound data database may be a modified corpus or set of corpora, through use of computer recognition, profiling, and other machine learning/intelligence amplification techniques to create baseline level values for features of various phonemes and utterances in the corpora.

Referring again to FIG. 3, e.g., FIG. 3A, in various implementations, the baseline sound data database 350 may deliver one or more baseline individual language components 335 to an individual speech component analyzer 314 of the speech evaluation engine 310. As shown in FIG. 3A, individual speech component analyzer 314 may receive the individual language components 333 and the baseline individual language components 335. Once the individual speech component analyzer 314 has received this data, it can then perform a comparison of the received individual language components against the baseline individual language components, checking for various pronunciation characteristics. In various implementations, pronunciation characteristics may include such features as pitch, intonation, frequency, stress, and accent (represented in FIG. 3A as boxes containing the letters P, I, F, S, A).

In an implementation, each feature is given a numerical score that describes how closely that individual language component matches the corresponding baseline individual language component. For example, for the sound "th," the comparison may bring up an 80% match in pitch, a 60% match in intonation, a 75% match in frequency, a 20% match in stress, and a 44% match in accent. This information will be captured and used in the evaluation of the speech as a whole, and can be tracked for use in determining more accurate feedback to help the user correct issues (e.g., if an issue with stress continues to occur on the same sounds, that sound in words with varying levels of stress can be emphasized in future lessons).

In another implementation, each feature is given a binary score that determines whether that specific individual language component matches the corresponding baseline individual language component, for example "yes" if the match is sufficiently close, or "no" if the match is insufficiently close. In still another implementation, each feature is assessed one or more of a discrete set of values, e.g., 1 to 5, with 5 being the closest match and 1 being the furthest match. In an implementation, each discrete value of the set of discrete values may represent a range of closeness between a pronunciation characteristic of one of the individual language components 333 and one of the baseline individual language components 335. In an implementation, these thresholded values may be displayed as color coded values, e.g., red for 1, lighter red for 2, yellow for 3, light green for 4, bright green for 5. Other implementations may use other known methods of scoring and determination of closeness between pronunciation characteristics of one of the individual language components 333 and one of the baseline individual language components 335.

In addition, in another implementation, the various individual language components 333 may be assigned an overall score, e.g., numeric, binary, thresholded, or other, which may combine one or more pronunciation characteristics for each of the individual language components 333. The combination may be merely additive or it may involve weighted averages, e.g., as an example, pitch and intonation may be more weighted than accent and timing, in various implementations. In an implementation, this may result in an overall score assigned to each of the individual language components 333. Similarly, in an implementation, the various pronunciation characteristics may be assigned an overall score, e.g., numeric, binary, thresholded, or other, which may combine a specific pronunciation characteristic across each of the individual language components 333. As above, the individual language components 333 may be averaged or added, or some of the individual language components 333 may be weighted differently.

In an implementation, various combinations of scores for individual language components 333 and the pronunciation characteristics maybe combined to arrive at a whole-sample performance score. In such implementations, the whole-sample performance component analyzer 322 (described in the next paragraph herein) may be eliminated or not used.

Referring to the whole-sample performance component analyzer 322, we refer again to FIG. 3A, which shows that teaching string audio sample data 340 also may be delivered to whole-sample performance component analyzer 322, which in FIG. 3A, is shown separately from other components of speech evaluation engine 310, but this is merely exemplary and shown for ease of illustration. In various implementations, whole-sample performance component analyzer 322 may be combined with other portions of speech evaluation engine 310, may appear in a different place than shown in FIG. 3A, or may be eliminated completely, e.g., as described above. It is important to note that the layout of speech evaluation engine 310 is merely for illustrative purposes and should not be limited to that specific layout, which was chosen merely for convenience and ease of illustration.

Referring again to FIG. 3A, the various analyses performed on the teaching string audio sample data 340 may be combined and returned as analysis of teaching string audio sample data 345. In an implementation, analysis of teaching string audio sample data 345 may include the analysis as described above, as well as other analyses known in the art but not mentioned here. In an implementation in which speech evaluation engine 310 is part of device 50, there may be no "moving" of data except in the memory 245 of device 50, or the data may move along an internal connection, e.g., through a bus or other connection of device 50. In an implementation where speech evaluation engine 310 is implemented partially or wholly at server 10 and/or additional servers, analysis of teaching string audio sample data 345 may be transmitted via communications network 105.

Referring now to FIG. 3B, in an implementation, individual speech component analyzer 314 may include, for example, a pitch evaluation circuit 314A that compares the "pitch" pronunciation characteristic of the individual language components 333 and the baseline individual language components 335. A pitch pronunciation characteristic includes, but is not limited to, a characteristic that represents the perceptual property of a sound characteristic (e.g., frequency) that is applied to a phoneme for distinguishing or perceptual purposes. In an implementation, individual speech component analyzer 314 may include, for example, an intonation evaluation circuit 314B that compares the "intonation" pronunciation characteristic of the individual language components 333 and the baseline individual language components 335. The intonation pronunciation characteristic includes, but is not limited to, variations of spoken pitch that may be used to vary meanings, attitudes, and emotions, of the speaker, e.g., to differentiate between questions and statements. In an implementation, individual speech component analyzer 314 may include, for example, a frequency evaluation circuit 314C that compares the "frequency" pronunciation characteristic of the individual language components 333 and the baseline individual language components 335. The frequency pronunciation characteristic includes, but is not limited to, a measurement of the frequency of the sound made when speaking the individual language component, e.g., in Hertz. In an implementation, individual speech component analyzer 314 may include, for example, a stress evaluation circuit 314D that compares the "stress" pronunciation characteristic of the individual language components 333 and the baseline individual language components 335. In an implementation, the stress pronunciation characteristic includes, but is not limited to, relative emphasis given to a certain phoneme, syllable, word, or phrase, or other lexical unit that is part of a larger set of lexical units, which can be caused by such properties as increased loudness, length of phoneme, changes in pitch, and other factors. In an implementation, individual speech component analyzer 314 may include, for example, an accent evaluation circuit 314E that compares the "accent" pronunciation characteristic of the individual language components 333 and the baseline individual language components 335. In an implementation, the accent pronunciation characteristic includes, but is not limited to, an altered or adjusted manner of speech, speaking, or dialect that is specific to a person, group, location, or any other set of single or multiple persons or entities.

In an implementation, individual speech component analyzer 314 may include, for example, a speaking rate evaluation circuit 314F that compares the "speaking rate" pronunciation characteristic of the individual language components 333 and the baseline individual language components 335. In an implementation, the speaking rate pronunciation characteristic includes, but is not limited to, a rate at which phonemes are spoken, either individually, or as a group, which may optionally include spacing and pausing between phonemes and/or other lexical units. In an implementation, individual speech component analyzer 314 may include, for example, a hesitation evaluation circuit 314G that compares the "hesitation" pronunciation characteristic of the individual language components 333 and the baseline individual language components 335. In an implementation, the hesitation pronunciation characteristic includes, but is not limited to, analysis of an amount of hesitation before, during, or after the pronunciation of a particular individual language component. In an implementation, individual speech component analyzer 314 may include, for example, a filler sound evaluation circuit 314H that compares the "filler sound" pronunciation characteristic of the individual language components 333 and the baseline individual language components 335. In an implementation, the filler sound pronunciation characteristic includes, but is not limited to, evaluation of placeholders, filler sounds, and/or filler words, that is, for example, sounds or words spoken in conversation as a signal that a pause is taking place but that the speaker is not finished speaking, such as "um," "like," ah," "you know," and "er." In an implementation, individual speech component analyzer 314 may include, for example, a chunking evaluation circuit 314J that compares the "chunking" pronunciation characteristic of the individual language components 333 and the baseline individual language components 335. In an implementation, the chunking pronunciation characteristic includes, but is not limited to, an extended pausing between words or sentences to add emphasis. It is important to note that other pronunciation characteristics are contemplated here; the nine shown in FIG. 3B are for illustrative purposes only. Additionally, in various implementations, some or all of the illustrated pronunciation characteristics may be omitted, weighted differently, or de-emphasized.

Referring now to FIG. 5 and beyond, following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5-8 as well as the other operations to be described herein may be performed by at least one of a machine, an article of manufacture, or a composition of matter.

Referring now to FIG. 5, FIG. 5 shows operation 500, which may include operation 502 depicting providing at least one teaching string configured to be read by a user. For example, FIG. 2, e.g., FIG. 2A, shows teaching string provision circuit 252, which in various implementations may be configured to provide at least one teaching string configured to be read by a user. Operation 500 may further include operation 504 depicting receiving teaching string audio sample data that corresponds to the user's speaking of the teaching string. For example, FIG. 2, e.g., FIG. 2A, shows teaching string audio sample data reception circuit 254, which in various implementations may be configured to teaching string audio sample data that corresponds to the user's speaking of the teaching string. Operation 500 may further include operation 506 depicting analyzing one or more individual language components of the teaching string audio sample data, wherein (506a) said analyzing includes measurement of one or more pronunciation characteristics of at least one individual language component against a corresponding one or more pronunciation characteristics of baseline individual language component sound data. For example, FIG. 2, e.g., FIG. 2A, shows individual language component analysis circuit 256, which in various implementations may be configured to analyze one or more individual language components of the teaching string audio sample data. Operation 500 may still further include operation 508 depicting providing an evaluation presentation to the user, wherein (508a) the evaluation presentation includes presentation, to the user, of an evaluation of the teaching string audio sample data that is based on the analyzed one or more pronunciation characteristics of the one or more individual language components. For example, FIG. 2, e.g., FIG. 2A, shows evaluation presentation provision circuit 258, which in various implementations may be configured to present an evaluation of the teaching string audio sample data that is based on the analyzed one or more pronunciation characteristics of the one or more individual language components, to the user. These operations have previously been discussed in more detail with respect to FIG. 2, however further implementations will be discussed in more detail herein with respect to the additional flowcharts and figures.

Figure 5A:
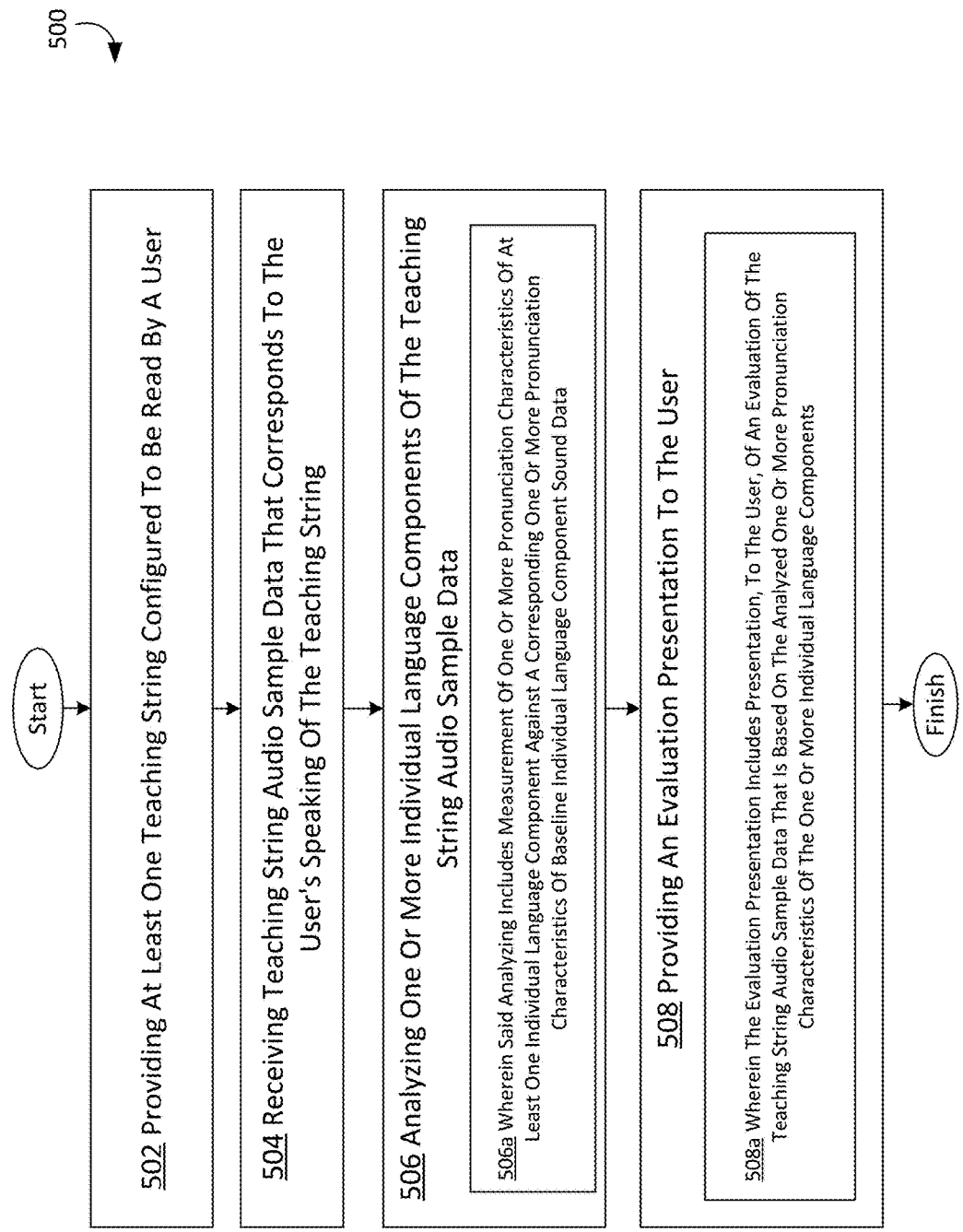
FIGS. 5A-5F, is a high-level logic flowchart of a process, e.g., operational flow 500, according to various embodiments of the invention.
Figure 5B:
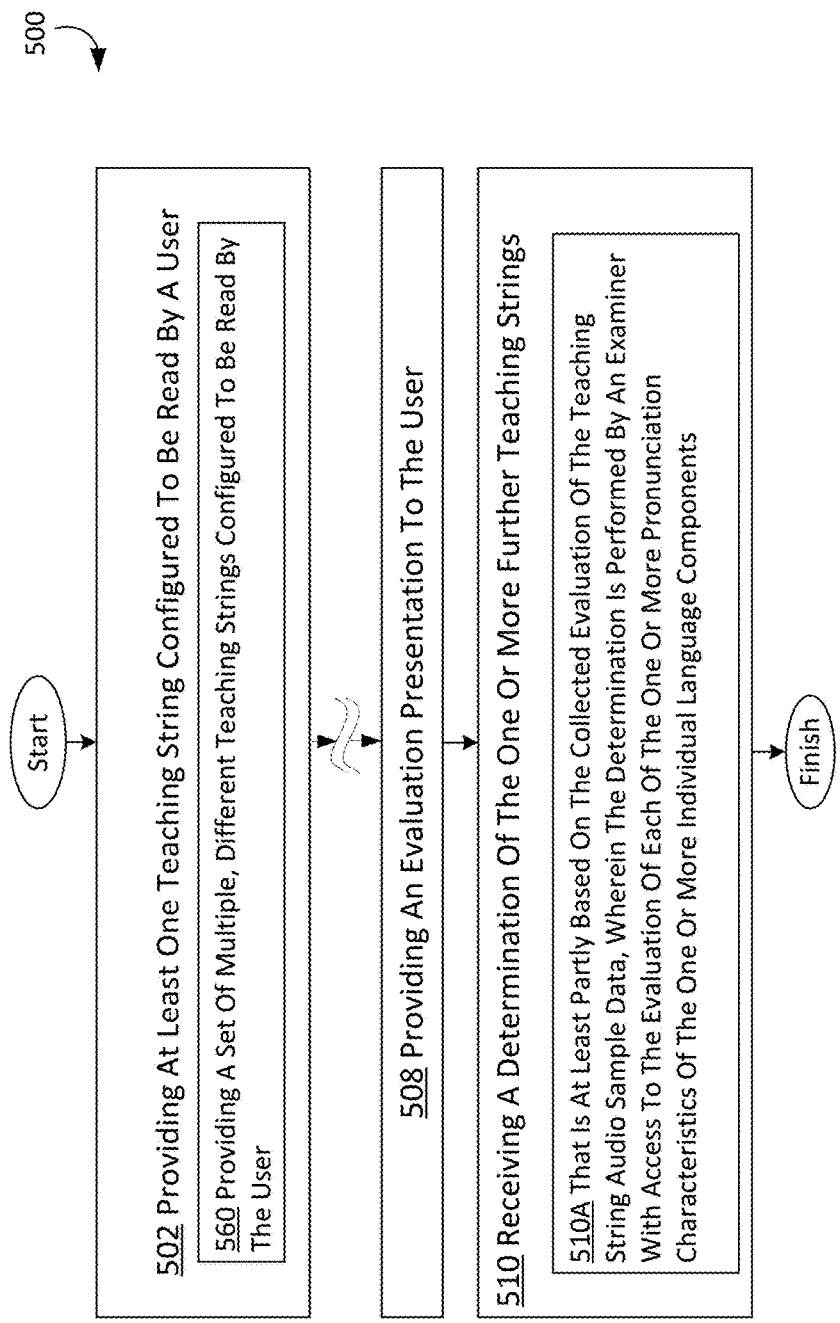

Referring now to FIG. 5B, it is noted that the at least one teaching string may include multiple teaching strings that are part of the same set of processing, e.g., to which the steps and circuits previously described may apply. For example, in an implementation, all teaching strings relevant to a particular lesson may be displayed at a time on a screen, and may be processed at a time. In another implementation, multiple teaching strings that are not necessarily related may be grouped together, and processed together, serially, in parallel, or in other formation. Thus, throughout this document, unless otherwise indicated directly or in context, a "teaching string" should be understood to include the possibility of multiple teaching strings. Referring to FIG. 5B, operation 502 may include operation 560 depicting providing a set of multiple, different teaching strings configured to be read by the user.

Referring again to FIG. 5B, FIG. 5B shows one or more additional operations that may be part of operation 500, according to one or more implementations. For example, in an implementation, operation 500 may include operation 510 depicting receiving a determination of the one or more further teaching strings. For example, referring to FIG. 2B, in an implementation, further teaching string reception circuit 266 may be configured to receive a determination of the one or more further teaching strings. In an implementation, the one or more further teaching strings are determined by an external entity, which in some implementations is another human, and in some implementations is machinery, circuitry, software, or some combination thereof. The one or more further teaching strings may be (510A) at least partly based on the collected evaluation of the teaching string audio sample data. In an implementation, the determination is performed by an examiner with access to the evaluation of each of the one or more pronunciation characteristics of the one or more individual language components.

Although not explicitly depicted, examiners have a wide range of access to the data generated by operation 500. For the purposes of this application, an examiner is defined as "an entity that has access to a user's evaluations and teaching string audio sample data, but is not necessarily themselves a user," and may be human or computationally-based. An examiner may be a teacher, a tutor, a therapist (e.g., a speech therapist), a parent, a friend of the user, a computer that monitors the user, a part of the device 50, a part of the server 10, a separate computer from those depicted in FIG. 1, or any other human or computational entity capable of processing the evaluations of the user's pronunciations of teaching strings. In various embodiments, an examiner may have multiple users under their tutelage. In such embodiments, the examiner may have access to various identifying information of users, including names, pictures, e-mail addresses, medical history, previous levels of experience with the language, and the like. In various implementations, the examiner may be able to view, for each user, an audio or visual representation of a number of lessons completed by the user (e.g., lesson in this context means "a set of training strings with a common theme"), an amount of the curriculum completed by the user (e.g., the total number of training strings the user has completed), an absolute performance of each user, a high-low performance of each user, a weighted average performance of each user, an unweighted performance of each user, a curved performance of each user relative to the other users under the tutelage of the examiner, a curved performance of each user relative to a larger demographic group, and the like.

Figure 5C:
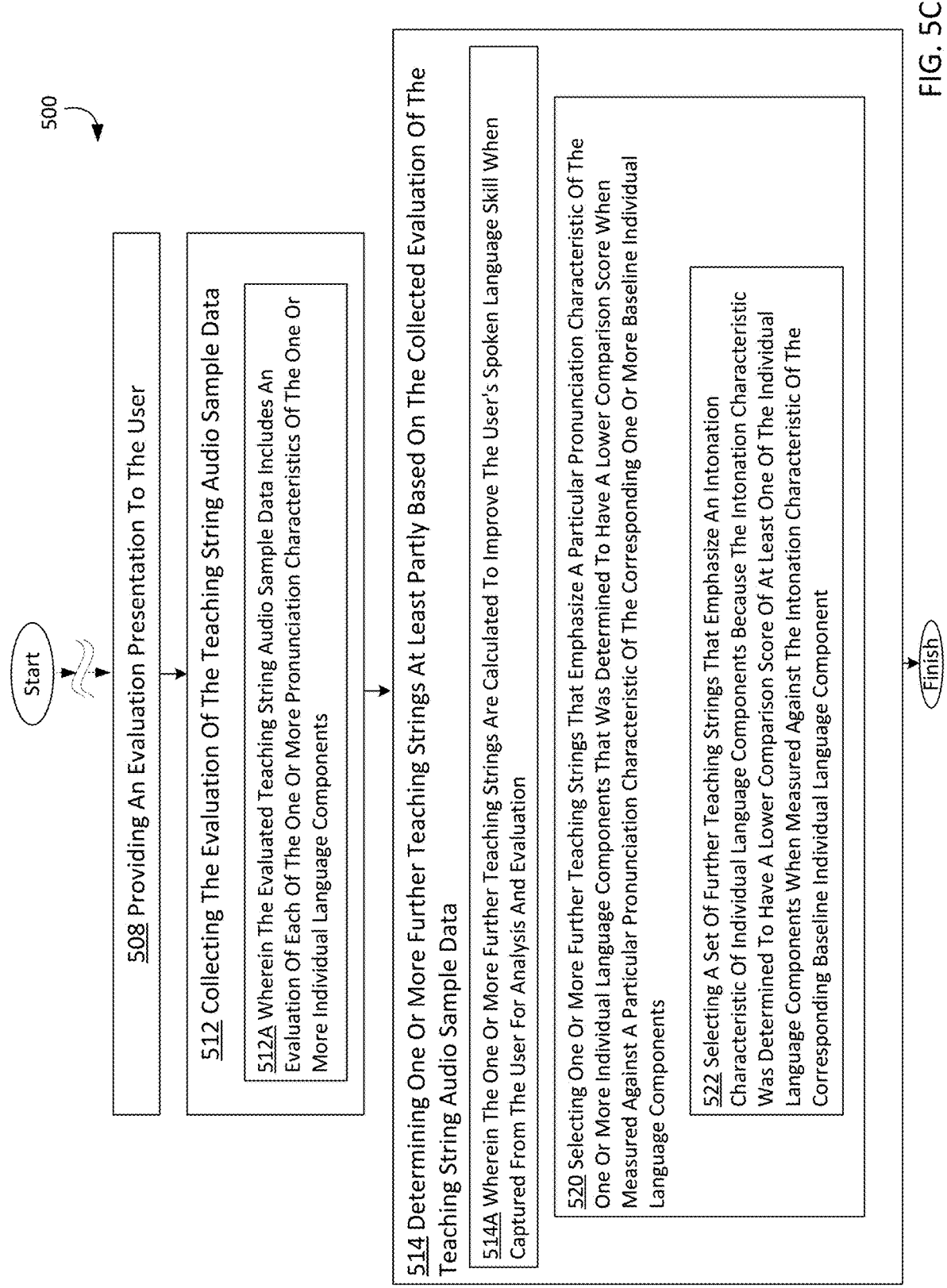

Referring now to FIG. 5C, FIG. 5C shows one or more additional operations that may be part of operation 500, according to one or more implementations. For example, as shown in FIG. 5C, operation 500 may depict operation 512 of collecting the evaluation of the teaching string audio sample data (512A), wherein the evaluated teaching string audio sample data includes an evaluation of each of the one or more pronunciation characteristics of the one or more individual language components and/or operation 514 determining one or more further teaching strings at least partly based on the collected evaluation of the teaching string audio sample data, wherein, as shown in sub-operation 514A, the one or more further teaching strings are calculated to improve the user's spoken language skill when captured from the user for analysis and evaluation. For example, in an implementation, referring to FIG. 2B, teaching string audio sample data evaluation collection circuit 262 may be configured to carry out operation 512, e.g., collecting the evaluation of the teaching string audio sample data, and operation 514, e.g., determining one or more further teaching strings at least partly based on the collected evaluation of the teaching string audio sample data. As described above, operation 512 collects the evaluations, which allows the user to go back and review their precise mistakes, allowing the user to see, without undue difficulty, the portions with which the user has trouble. Second, it allows the previously mentioned examiner, who is assisting the user in learning or improving their language skills, to see exactly where the user is weak and strong in their language skills. This may result in more targeted lessons for the user, such that a user's weak and strong points can be identified more quickly, and targeted in further iterations of teaching strings, thus reducing the overall time required for the user to achieve the desired level of fluency in the target language.

Referring again to FIG. 5C, operation 514 may include operation 520 depicting selecting one or more further teaching strings that emphasize a particular pronunciation characteristic of the one or more individual language components that was determined to have a lower comparison score when measured against a particular pronunciation characteristic of the corresponding one or more baseline individual language components. For example, the one or more further teaching strings that emphasize a particular pronunciation characteristic (e.g., "accent") may be selected when the accent pronunciation characteristic is determined to have a lower comparison score when measured against the accent pronunciation characteristic of corresponding individual language components. In another implementation, operation 520 may include operation 522 depicting selecting a set of further teaching strings that emphasize an intonation characteristic of individual language components because the intonation characteristic was determined to have a lower comparison score of at least one of the individual language components when measured against the intonation characteristic of the corresponding baseline individual language component, as shown in FIG. 5C.

Figure 5D:
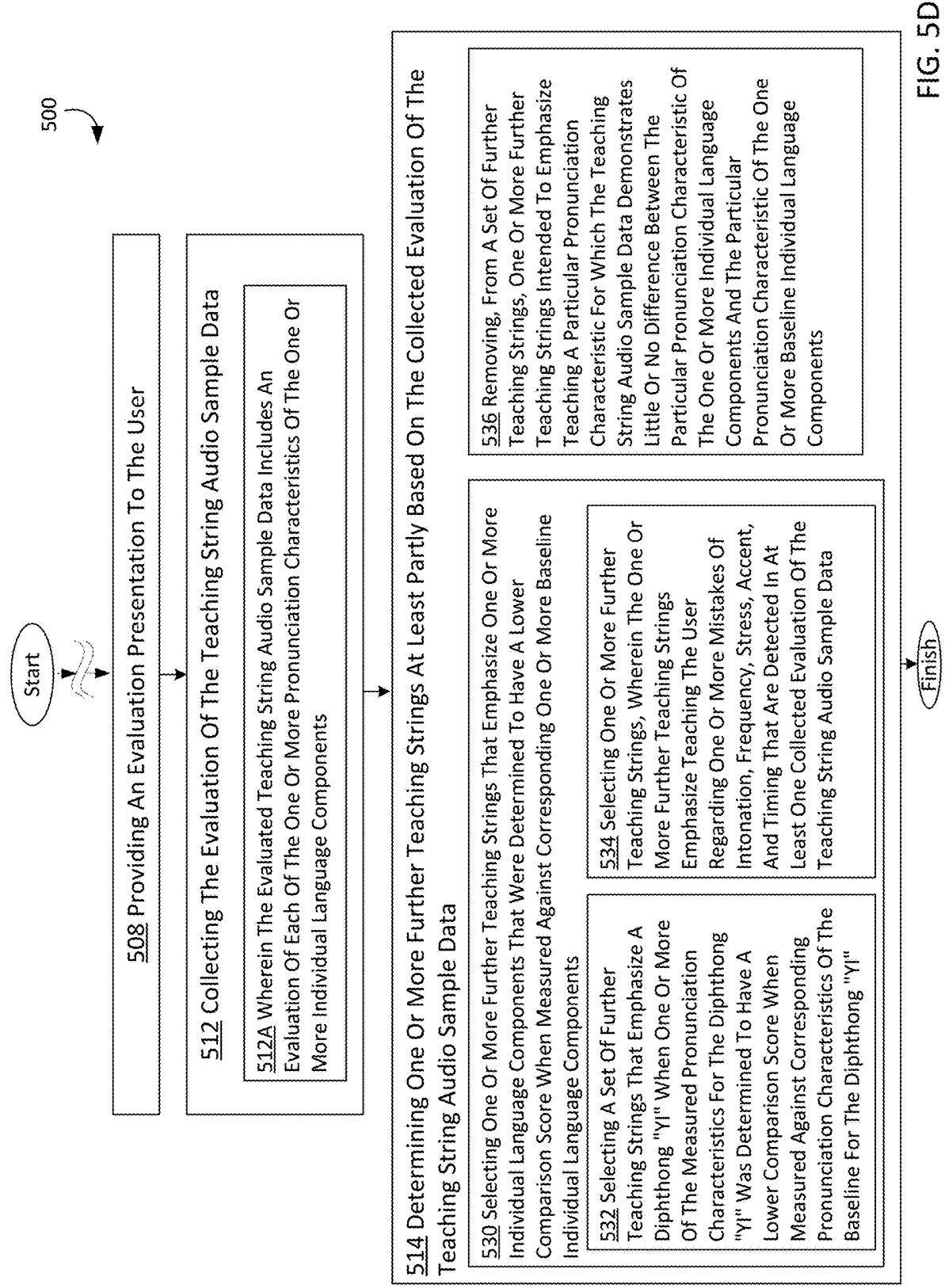

Referring now to FIG. 5D, in an implementation, operation 514 may include operation 530 depicting selecting one or more further teaching strings that emphasize one or more individual language components that were determined to have a lower comparison score when measured against corresponding one or more baseline individual language components. For example, a user may be having trouble with some specific individual language components, e.g., the "k" sound, and this may be detected across different pronunciation characteristics. In such an example, the further teaching strings are selected to provide the user with a wider variety of situations that involve that individual language component, so that the user does not waste time going back over concepts that the user has already understood or mastered, and can spend more time on those areas where the user is weaker.

In an implementation, operation 530 may further include operation 532 depicting selecting a set of further teaching strings that emphasize a diphthong "YI" when one or more of the measured pronunciation characteristics for the diphthong "YI" was determined to have a lower comparison score when measured against corresponding pronunciation characteristics of the baseline for the diphthong "YI." In a different implementation, operation 530 may further include operation 534 depicting selecting one or more further teaching strings, wherein the one or more further teaching strings emphasize teaching the user regarding one or more mistakes of intonation, frequency, stress, accent, and timing that are detected in at least one collected evaluation of the teaching string audio sample data. In an implementation, operation 514 may include operation 536 depicting removing, from a set of further teaching strings, one or more further teaching strings intended to emphasize teaching a particular pronunciation characteristic for which the teaching string audio sample data demonstrates little or no difference between the particular pronunciation characteristic of the one or more individual language components and the particular pronunciation characteristic of the one or more baseline individual language components. For example, in an implementation, if the hesitation evaluation pronunciation characteristic of one or more of the individual language components of the teaching string audio sample data is determined to be within 95% of the hesitation evaluation pronunciation characteristic of the corresponding baseline individual language components, then specific teaching strings that emphasize training of the hesitation evaluation pronunciation characteristic may be removed from sets of further teaching strings that the user will see.

Figure 5E:
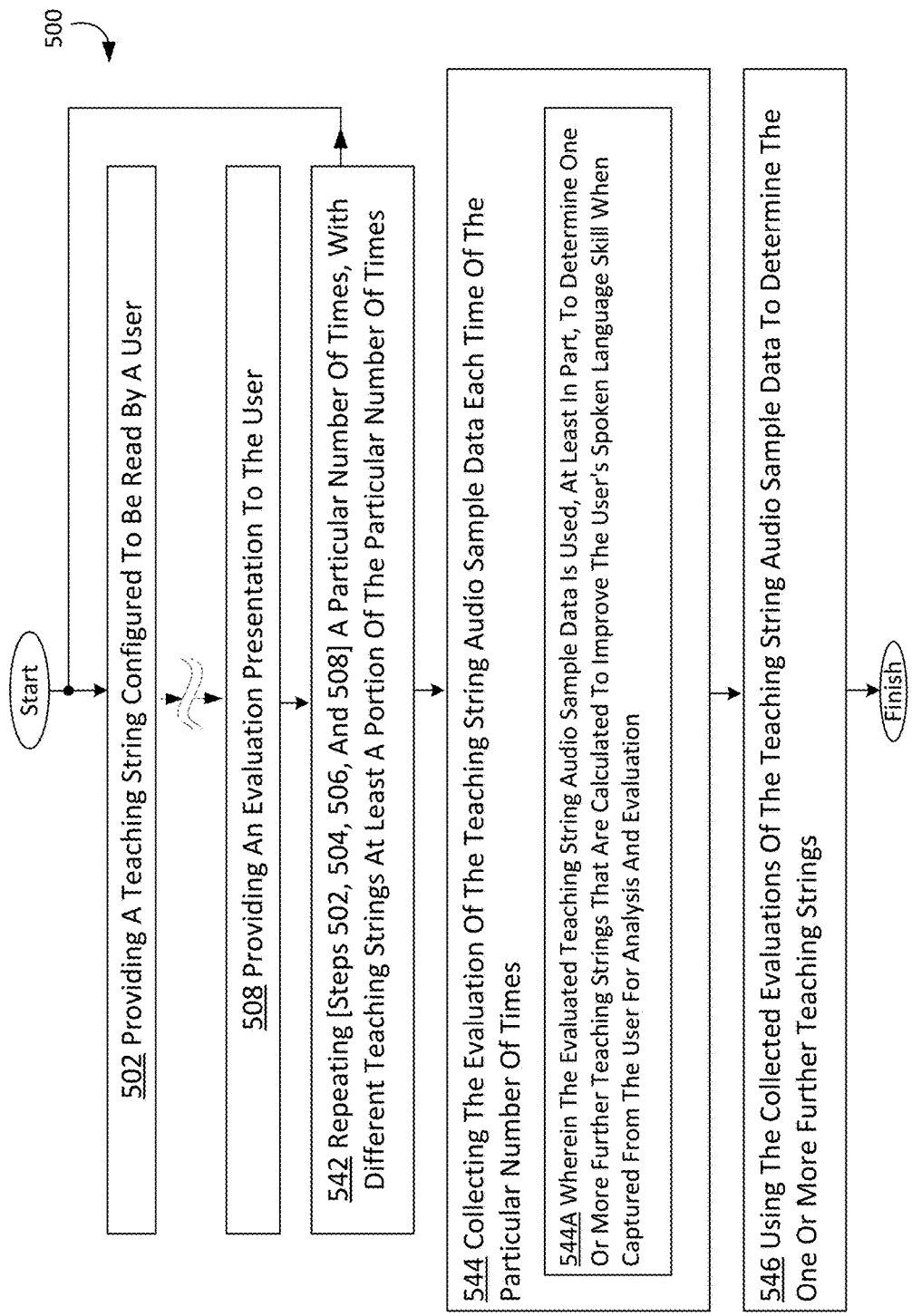

Referring now to FIG. 5E, in an implementation, operation 500 may further include operation 542, which is an operation to repeat operations 502 (providing a teaching string configured to be read by a user), 504 (receiving teaching string audio sample data that corresponds to the user's speaking of the teaching string), 506 (analyzing one or more individual language components of the teaching string audio sample data), and 508 (providing an evaluation presentation to the user), for different teaching strings, for a particular number of times. For example, in an implementation, repeating these operations sixteen different times, for example, with different, but related teaching strings, would constitute a lesson. The number sixteen is meant to be merely exemplary, however, as any reasonable number of lessons greater than one are contemplated. Moreover, although the teaching strings may be related, this also is not required. In an embodiment, the teaching strings are related as described above with respect to operations 530, 532, and 534, wherein detection of weakness in a particular individual language component or pronunciation characteristic is detected in the user, and a set of teaching strings are built around that particular individual language component or pronunciation characteristic.

Referring again to FIG. 5E, in an implementation, operation 500, which may include operation 542, previously described, also may include operation 544 depicting collecting the evaluation of the teaching string audio sample data each time of the particular number of times, (544A) wherein the evaluated teaching string audio sample data is used, at least in part, to determine one or more further teaching strings that are calculated to improve the user's spoken language skill when captured from the user. The further teaching strings that are captured are used for analysis, e.g., in operation 506, and evaluation presentation, e.g., in operation 508.

Referring again to FIG. 5E, in an implementation, operation 500, which may include operations 542 and 544, previously described, also may include operation 546 depicting using the collected evaluations of the teaching string audio sample data to determine the one or more further teaching strings. As described above, the process may be effective as an iterative process, where a set of teaching strings are analyzed, as described above, and weaknesses and strengths of the user are selected, either by a human examiner, or by an analysis algorithm, and a further set of teaching strings are presented to the user, and the process iterates and continues. This iterative process, coupled with the fine tuning available through use of the pronunciation characteristics of the individual language components, allow for more rapid progress with the user, with less time wastage and slippage.

Figure 5F:
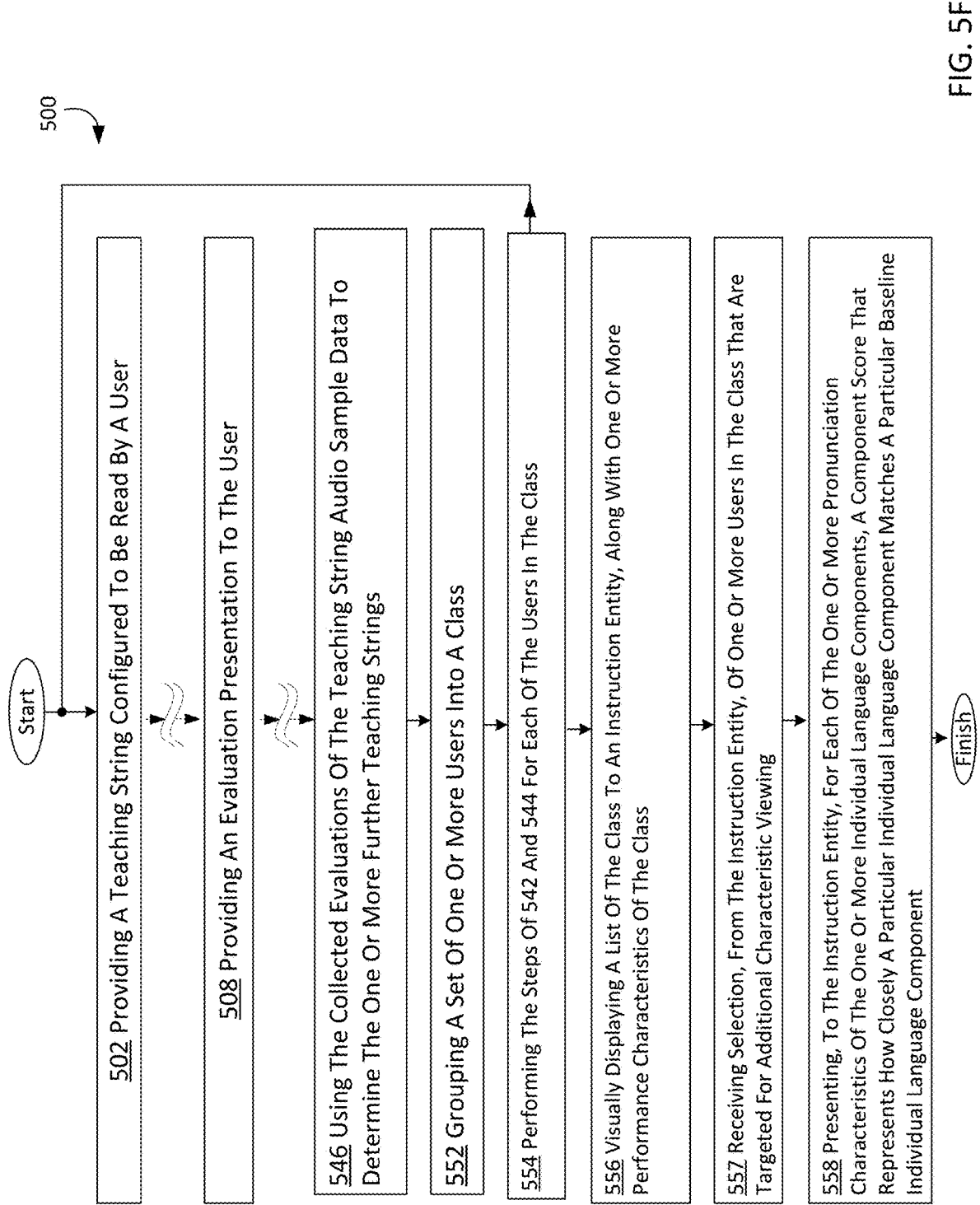

Referring now to FIG. 5F, in an implementation, operation 500, which may include operations 542, 544, and 546, as previously described, may also include operation 552 for grouping a set of one or more users into a class. In this context, a class means any size group of students, whether or not under the tutelage of an examiner, or under the tutelage of the same examiner. In an implementation, operation 500 also includes operation 554, which depicts performing the steps of 542 (repeating the process for a particular number of strings) and 544 (collecting each result of the process for each string) for each of the users in the class. In an implementation, this operation is how an examiner may receive detailed data regarding how their students are doing. In an implementation, operation 500 also includes operation 556 depicting visually displaying a list of the class to an instruction entity, e.g., an examiner, along with one or more performance characteristics of the class. For example, as previously described, the instruction entity may be able to view, for each user, an audio or visual representation of a number of lessons completed by the user (e.g., lesson in this context means "a set of training strings with a common theme), an amount of the curriculum completed by the user (e.g., the total number of teaching strings the user has completed), an absolute performance of each user, a high-low performance of each user, a weighted average performance of each user, an unweighted performance of each user, a curved performance of each user relative to the other users under the tutelage of the instruction entity, and a curved performance of each user relative to a larger demographic group.

Referring again to FIG. 5F, in an implementation, operation 500, which may include operations 542, 544, 546, 552, 554, and 556, also may include operation 557 in which a selection is received from the instruction entity of one or more users in the class, that the instruction entity wants to see more characteristics of, e.g., pronunciation characteristics, or performances in specific individual language components. The instruction entity may make this selection based on the visual display described in step 556, for instruction entities that are human or otherwise eye-based. In an implementation, after selection of one or more users from the class, operation 500 may include operation 558 depicting presenting, to the instruction entity, for each of the one or more pronunciation characteristics of the one or more individual language components, a component score that represents how closely a particular individual language component matches a particular baseline individual language component.

Figure 6:
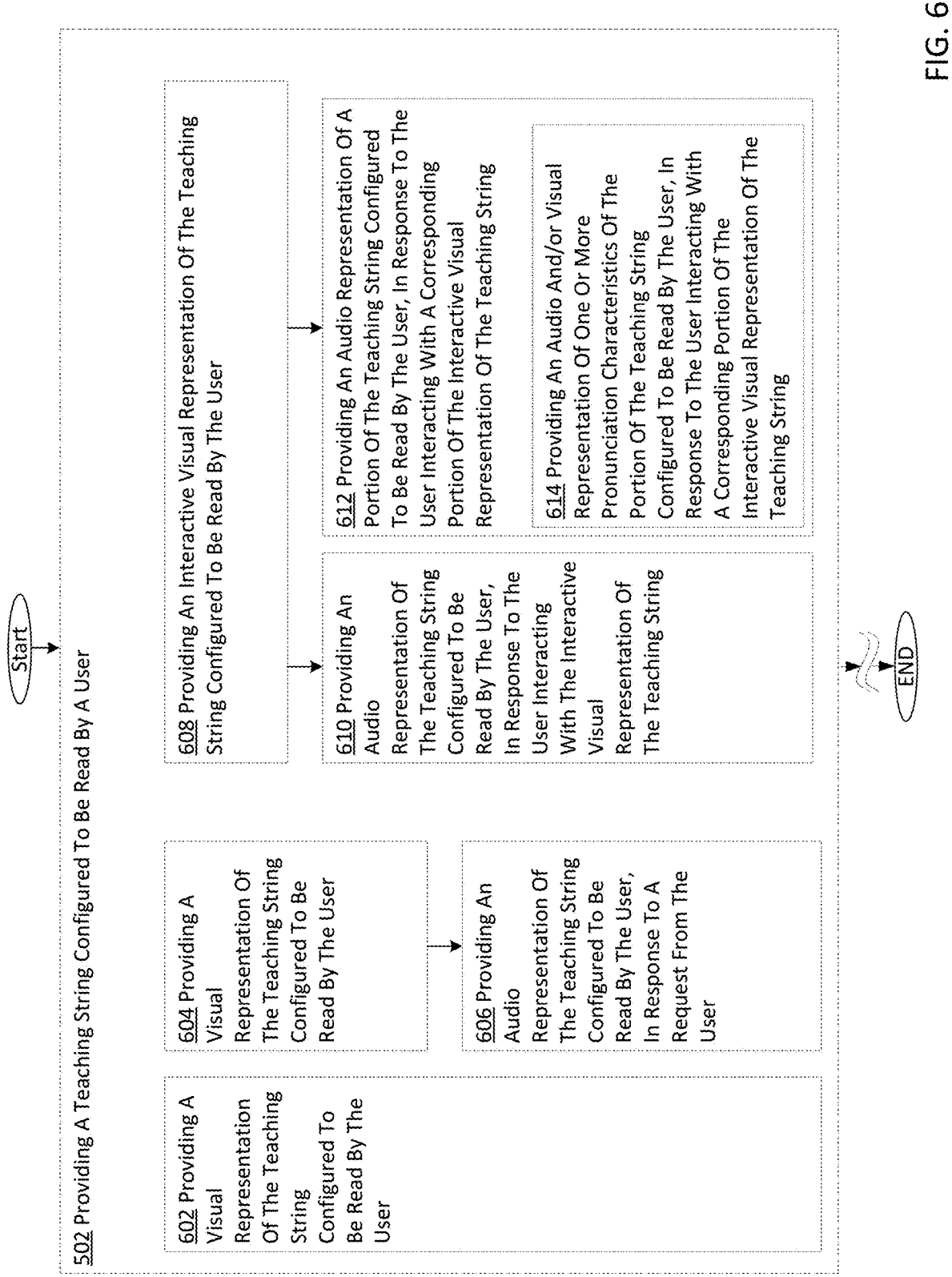
FIG. 6 is a high-level logic flowchart of providing a teaching string operation 502, according to embodiments of the invention.

Referring now to FIG. 6, FIG. 6 shows various alternate implementations of operation 502. For example, as shown in FIG. 6, operation 502 may include operation 602 depicting providing a visual representation of the teaching string configured to be read by the user. In an implementation, referring to FIG. 2C, teaching string visual provision circuit 272 may be configured to provide the visual representation of the teaching string configured to be read by the user. The visual representation may be, for example, displayed on a monitor or touchscreen, e.g., as shown in FIG. 9.

Referring again to FIG. 6, in an implementation, operation 502 may include operation 604 depicting providing a visual representation of the teaching string configured to be read by the user, and operation 606 depicting providing an audio representation of the teaching string configured to be read by the user, in response to a request from the user. In an implementation, referring to FIG. 2C, teaching string visual provision circuit 272 may be configured to provide a visual representation of the teaching string configured to be read by the user, and teaching string audio provision circuit 274 may be configured to provide an audio representation of the teaching string configured to be read by the user, in response to a request from the user. As shown in FIG. 9, the request from the user may come in the form of interaction with a portion of the visual provision of the teaching string, e.g., pressing a button below the visual representation of the teaching string.

Referring again to FIG. 6, in an implementation, operation 502 may include operation 608 depicting providing an interactive visual representation of the teaching string configured to be read by the user, and one of operation 610 depicting providing an audio representation of the teaching string configured to be read by the user, in response to the user interacting with the interactive visual representation of the teaching string and operation 612 depicting providing an audio representation of a portion of the teaching string configured to be read by the user, in response to the user interacting with a corresponding portion of the interactive visual representation of the teaching string. In an implementation, referring to FIG. 2C, teaching string interactive visual provision circuit 273 may be configured to provide an interactive visual representation of the teaching string configured to be read by the user, teaching string responsive audio provision circuit 275 may be configured to provide an audio representation of the teaching string configured to be read by the user, in response to the user interacting with the interactive visual representation of the teaching string, and teaching string responsive audio provision circuit 277 may be configured to provide an audio representation of a portion of the teaching string configured to be read by the user, in response to the user interacting with a corresponding portion of the interactive visual representation of the teaching string, as previously described with respect to FIG. 2C.

In an implementation, a user's interaction with a particular portion of the visual representation of the teaching string may trigger provision of an audio representation of that part of the teaching string, or another sub-part of that part of the teaching string, e.g., one or more of the individual language components that make up that portion of the teaching string. Referring again to FIG. 6, in an implementation, operation 612 may further include operation 614 depicting providing an audio and/or visual representation of one or more pronunciation characteristics of the portion of the teaching string configured to be read by the user, in response to the user interacting with a corresponding portion of the interactive visual representation of the teaching string. For example, in an implementation, clicking on a portion of the teaching string that is part of the visual representation may bring up a box, e.g., with visual or audio representation of how the individual language components of that portion of the teaching string are to be pronounced.

Figure 7A:
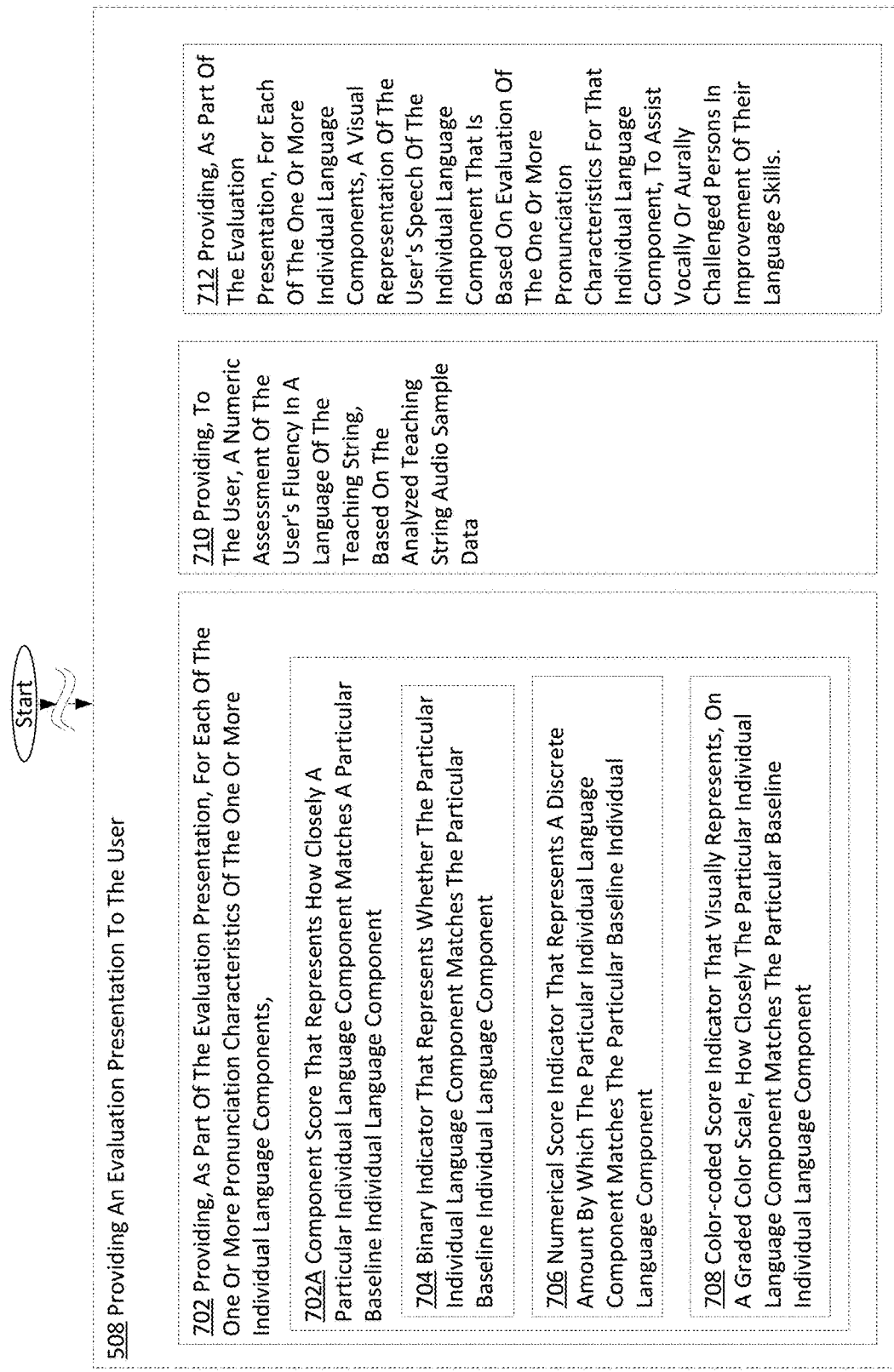
FIGS. 7A-7D, is a high-level logic flowchart of providing an evaluation presentation operation 508, according to embodiments of the invention.

Referring now to FIG. 7A, in an implementation, operation 508 may include operation 702 depicting providing, as part of the evaluation presentation, for each of the one or more pronunciation characteristics of the one or more individual language components, a (702A) component score that represents how closely a particular individual language component matches a particular baseline individual language component. For example, the component score may take into account the various pronunciation characteristics, and each of their individual deltas between the individual language component and the particular baseline individual language component. In various implementations, each pronunciation characteristic may have an independent weight, which may be changed or optimized based on the user's previous results (e.g., some users may need more work on the accent pronunciation characteristic, and so that pronunciation characteristic gets a higher weight so that the user cannot "cheat" by getting other pronunciation characteristics close to correct, but missing on the accent). In an implementation, the component score 702A may include a binary indicator 704, wherein the binary indicator represents whether the particular individual language component matches the particular baseline individual language component. In another implementation, the component score 702A may include a numerical score indicator 706, wherein the numerical score indicator represents a discrete, finely-grained amount by which the particular individual language component matches the particular baseline individual language component. In still another implementation, the component score 702A may include a color-coded score indicator 708 that visually represents, on a graded color scale, how closely the particular individual language component matches the particular baseline individual language component. For example, as shown in FIG. 10, "red" may indicate a miss, and "green" may indicate a closer match, and, in various implementations, the shades of red and green may get darker or lighter depending on how far away or close the match was.

Referring again to FIG. 7A, in an implementation, operation 508 may include operation 710 depicting providing, to the user, a numeric assessment of the user's fluency in a language of the teaching string, based on the analyzed teaching string audio sample data. As can be seen from FIG. 10, after the teaching string has been analyzed, with each individual language component assigned a score, a cumulative score may be tallied, which may serve as an assessment of the user's fluency in the language of the teaching string. In some implementations, the numeric assessment of the user's fluency in the language of the teaching string is based solely on that particular teaching string, and in other implementations, the numeric assessment of the user's fluency in the language of the teaching string is based on that particular teaching string, as well as one or more previous teaching strings that have been analyzed.

Referring again to FIG. 7A, in an implementation, operation 508 may include operation 712 depicting providing, as part of the evaluation presentation, for each of the one or more individual language components, a visual representation of the user's speech of the individual language component that is based on evaluation of the one or more pronunciation characteristics for that individual language component, to assist vocally or aurally challenged persons in improvement of their language skills. For example, in an implementation, the system may be used to assist mentally, vocally, aurally, or otherwise challenged persons in improvement of their language skills. For example, an aurally challenged individual may not be able to hear and/or process the differences in language between how they are speaking and how the language is intended to sound. By providing a visual representation of pronunciation characteristics for one or more individual language components, a different pathway for learning the pronunciation characteristics may be provided to the aurally challenged individual. This will allow the aurally challenged individual to improve their language skills without relying on learning pathways that the aurally challenged person cannot use.

Figure 7B:
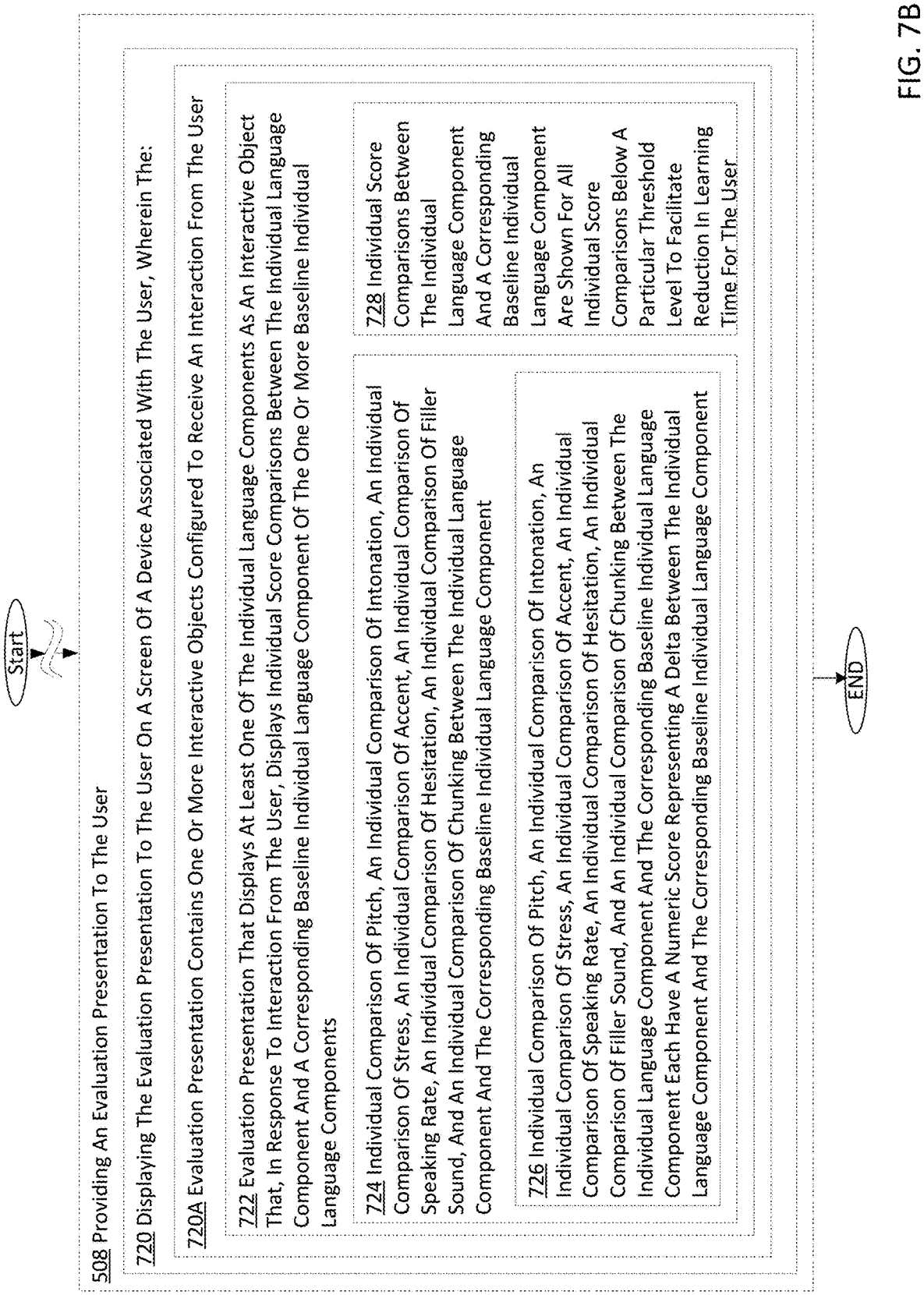

Referring now to FIG. 7B, in an implementation, operation 508 may include operation 720 depicting displaying the evaluation presentation to the user on a screen of a device associated with the user, wherein the (720A) evaluation presentation contains one or more interactive objects configured to receive an interaction from the user. For example, in an implementation, the evaluation presentation may include an interactive object to view each word of the teaching string by its individual language components. Another implementation may include an interactive object to hear the user's pronunciation of a particular individual language component next to the baseline pronunciation of the particular individual language component. Some of these examples are shown in FIG. 10, as previously discussed, including the box 1050 that appears as a pop-up when a particular word of the teaching string is interacted with.

Referring again to FIG. 7B, in an implementation, the evaluation presentation 720A may include an evaluation presentation 722 that displays at least one of the individual language components as an interactive object that, in response to interaction from the user, displays individual score comparisons between the individual language component and a corresponding baseline individual language component of the one or more baseline individual language components. For example, as shown in FIG. 10, when at least one word (e.g., the word "cleaned") is interacted with, the individual score comparisons for the individual language component (e.g., the phonemes for the word "cleaned," e.g., "K," "L," IY," "N," and "D") are displayed, and the individual score comparison (e.g., in FIG. 10, it is a color-coded binary system but other scores are contemplated and mentioned throughout) between the individual language component and the baseline individual language component are displayed. In another implementation, evaluation presentation 722 may include an individual comparison 724 of pitch, an individual comparison of intonation, an individual comparison of stress, and an individual comparison of accent, an individual comparison of speaking rate, and individual comparison of hesitation, and individual comparison of filler sound, and an individual comparison of chunking between the individual language component and the corresponding baseline individual language component. In still another implementation, individual comparison 724 may include individual comparison 726, which depicts an Individual comparison of pitch, an individual comparison of intonation, an individual comparison of stress, an individual comparison of accent, an individual comparison of speaking rate, an individual comparison of hesitation, an individual comparison of filler sound, and an individual comparison of chunking between the individual language component and the corresponding baseline individual language component each have a numeric score representing a delta between the individual language component and the corresponding baseline individual language component.

Referring again to FIG. 7B, in an implementation, operation 722 may include operation 728 depicting that individual score comparisons between the individual language component and a corresponding baseline individual language component are shown for all individual score comparisons below a particular threshold level to facilitate reduction in learning time for the user. In an implementation, the particular threshold level may be dynamically adjusted, e.g., as the user improves, the threshold level for showing an individual score comparison may increase over time, so that a user gets closer and closer to perfection. In another implementation, the particular threshold level is based on the user's demonstrated level of fluency calculated by one or more overall scores of teaching strings, as previously described. In an implementation, this dynamic targeting of a user's "weak points," e.g., places where the user is consistently scoring lower, may decrease the overall amount of time it takes for a user to reach a particular level of fluency in the language, e.g., reasonably fluent, compared with existing techniques for teaching languages to persons.

Figure 7C:
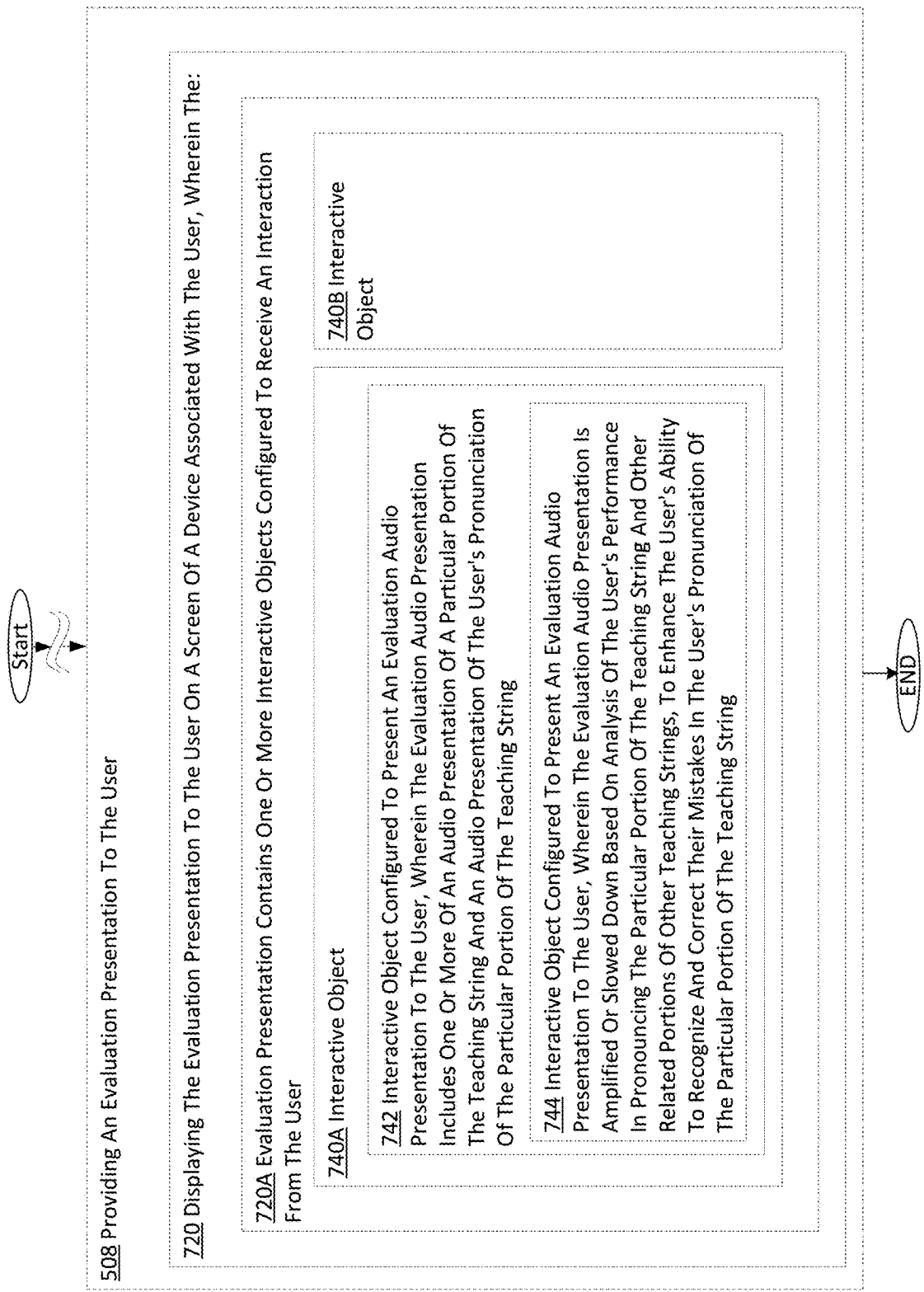

Referring now to FIG. 7C, in an implementation, operation 720A depicting an evaluation presentation that contains one or more interactive objects configured to receive an interaction from the user, may include various interactive objects, e.g., interactive object 740A and interactive object 740B. The interactive objects 740A and 740B may be a same type of interactive object or may be different types of interactive objects on the same presentation. For example, an interactive object may be any object that is presented, e.g., visually, audibly, haptically, or in a VR/AR environment, on any device, e.g., a clickable/touchable interface, or an interface that responds to verbal commands, or an interface that responds to an augmented reality interaction. In an implementation, interactive object 740A may include operation 742 depicting an interactive object configured to present an evaluation audio presentation to the user, wherein the evaluation audio presentation includes one or more of an audio presentation of a particular portion of the teaching string and an audio presentation of the user's pronunciation of the particular portion of the teaching string. For example, in an implementation, interaction with the interactive object may trigger an evaluation audio presentation, e.g., through speakers, headphones, or a display of a device, e.g., device 50. This audio presentation may highlight one or more of a proper pronunciation of the baseline individual language component associated with the interactive object, and a user pronunciation of the individual language component associated with the interactive object. The audio presentation may include a visual component as well, e.g., a chart overlay of one or more characteristics of each of the proper pronunciation of the baseline individual language component associated with the interactive object, and a user pronunciation of the individual language component associated with the interactive object. In an implementation, the audio presentation may be repeated by the user as many times as the user desires, and in any order with this or other individual language components.

Referring again to FIG. 7C, in an implementation, operation 742 may include operation 744 depicting an interactive object configured to present an evaluation audio presentation to the user, wherein the evaluation audio presentation is amplified or slowed down based on analysis of the user's performance in pronouncing the particular portion of the teaching string and other related portions of other teaching strings, to enhance the user's ability to recognize and correct their mistakes in the user's pronunciation of the particular portion of the teaching string. For example, in an implementation, the audio presentation described previously may be adjusted based on one or more factors, for example, the audio presentation may be slowed down, sped up, amplified in part, have parts emphasized or de-emphasized, depending on one or more various factors. The one or more factors may include the user's performance over a set of teaching strings, which may be similar to the teaching string being displayed and evaluated, or may be a set of all teaching strings that the user has spoken, or may be a set of teaching strings in a particular time frame. In another implementation, the system may detect a user's pattern of mistakes and adjust the audio presentation based on the user's pattern of mistakes, for example, if a user responds positively to being shown a slowed-down version of the individual language component that the user is mispronouncing, then future mispronounced individual language components may have their audio slowed down, and vice versa.

Figure 7D:
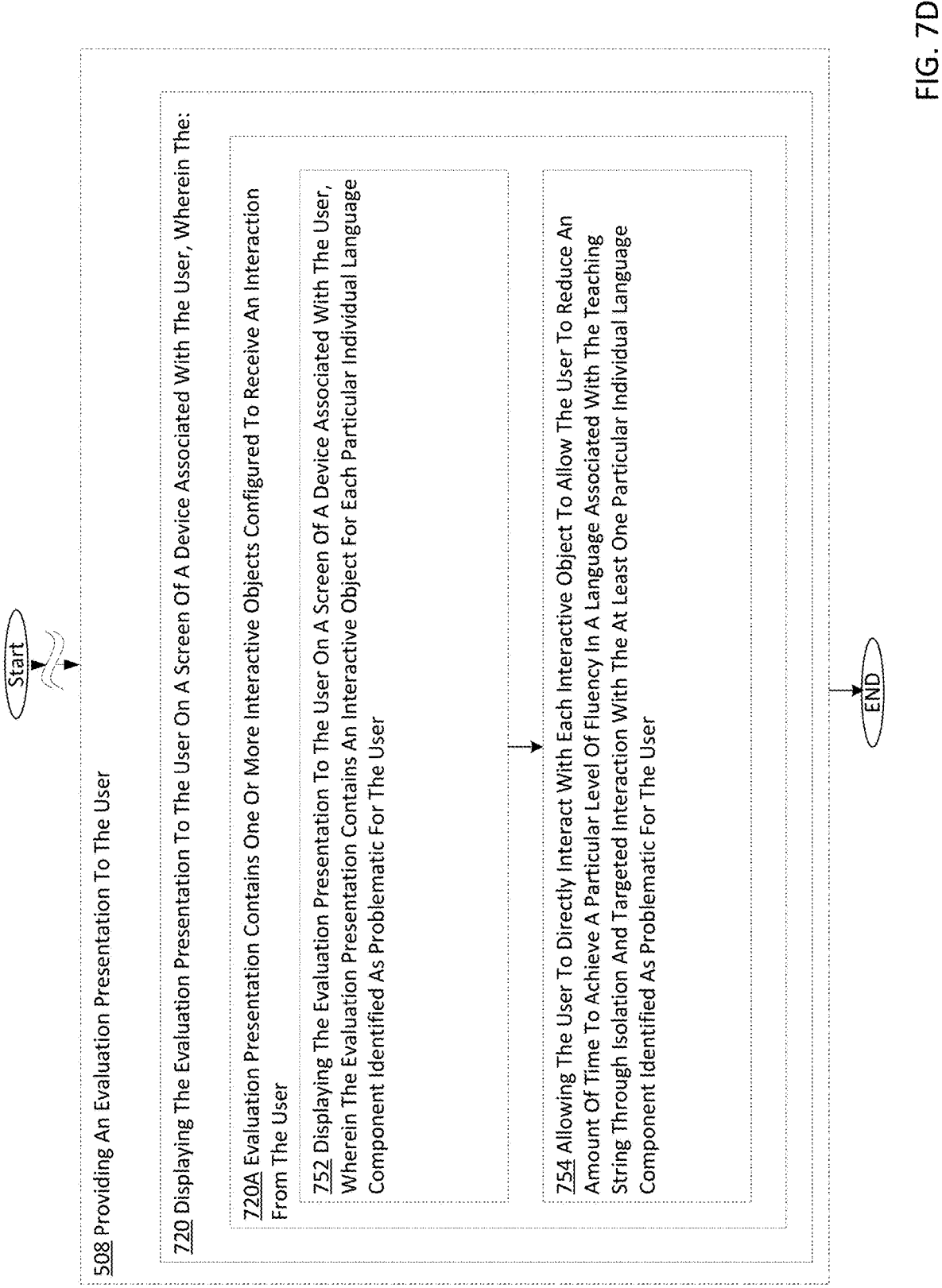

Referring now to FIG. 7D, in an implementation, operation 720A may include operation 752 depicting displaying the evaluation presentation to the user on a screen of a device associated with the user, wherein the evaluation presentation contains an interactive object for each particular individual language component identified as problematic for the user. For example, in an implementation, the evaluation presentation contains an interactive object, e.g., a clickable/touchable interface, or an interface that responds to verbal commands, or an interface that responds to an augmented reality interaction. In an implementation, interaction with one of the interactive objects brings up an interactive demonstration for each particular individual language component identified as problematic for the user. In another implementation, interaction with an interactive object opens up a new set of one or more lessons focused on that particular individual language component and/or the pronunciation characteristics that have been determined to be problematic through analysis of the user's speech. In an implementation, interaction with the interactive object allows the user to receive feedback in a different format, e.g., verbal, audible, color-coded, visual, or via one or more representations, visual or otherwise, of the manner in which the user is mispronouncing the individual language component. In an implementation, interaction with the interactive object allows the user to optionally practice more exercises related to that individual language component. In an implementation, interaction with the interactive object brings up more information, and in one or more media, regarding that individual language component.

Referring again to FIG. 7D, in an implementation in which operation 720A includes operation 752, operation 720A further may include operation 754 depicting allowing the user to directly interact with each interactive object to allow the user to reduce an amount of time to achieve a particular level of fluency in a language associated with the teaching string through isolation and targeted interaction with the at least one particular individual language component identified as problematic for the user. For example, interaction with the interactive object allows particular individual language components, e.g., those language components that the user is struggling with, to be isolated and targeted as described above. In this manner, the user focuses their training on the particular individual language components that the user has not yet fully mastered. Thus, time that is wasted in training individual language components for which the user does not need trained, in order to also train the particular individual language components, is reduced. In various implementations, this may have the effect of allowing the user to reduce the amount of time to develop a particular level of fluency in the language associated with the teaching string.

Figure 8A:
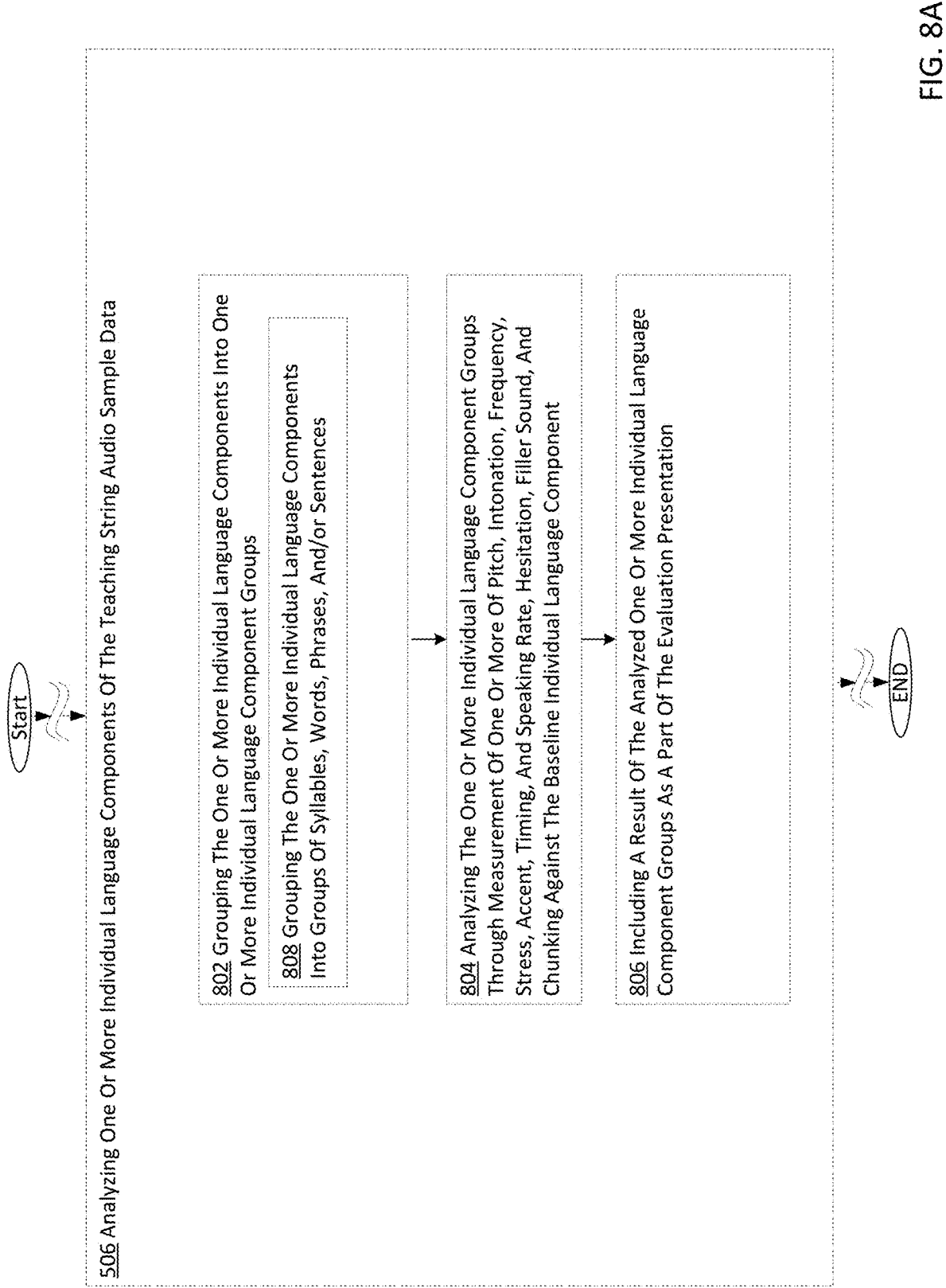
FIGS. 8A-8B, is a high-level logic flowchart of an analyzing operation 506, according to embodiments of the invention.

Referring now to FIG. 8A, in an implementation, operation 506 may include operation 802 depicting grouping the one or more individual language components into one or more individual language component groups. For example, as shown in FIG. 10, in an implementation, the individual language component phonemes are grouped into words. In an alternate implementation, referring again to FIG. 8A, the one or more individual language components 808 may be grouped into groups of syllables, words, phrases, and or sentences. Referring again to FIG. 8A, in an implementation, operation 506, which may include operation 802, also may include operation 804, e.g., depicting analyzing the one or more individual language component groups through measurement of one or more of pitch, intonation, frequency, stress, accent, timing, and speaking rate, hesitation, filler sound, and chunking against the baseline individual language component sound data, and operation 806, e.g., depicting including a result of the analyzed one or more individual language component groups as a part of the evaluation presentation.

Figure 8B:
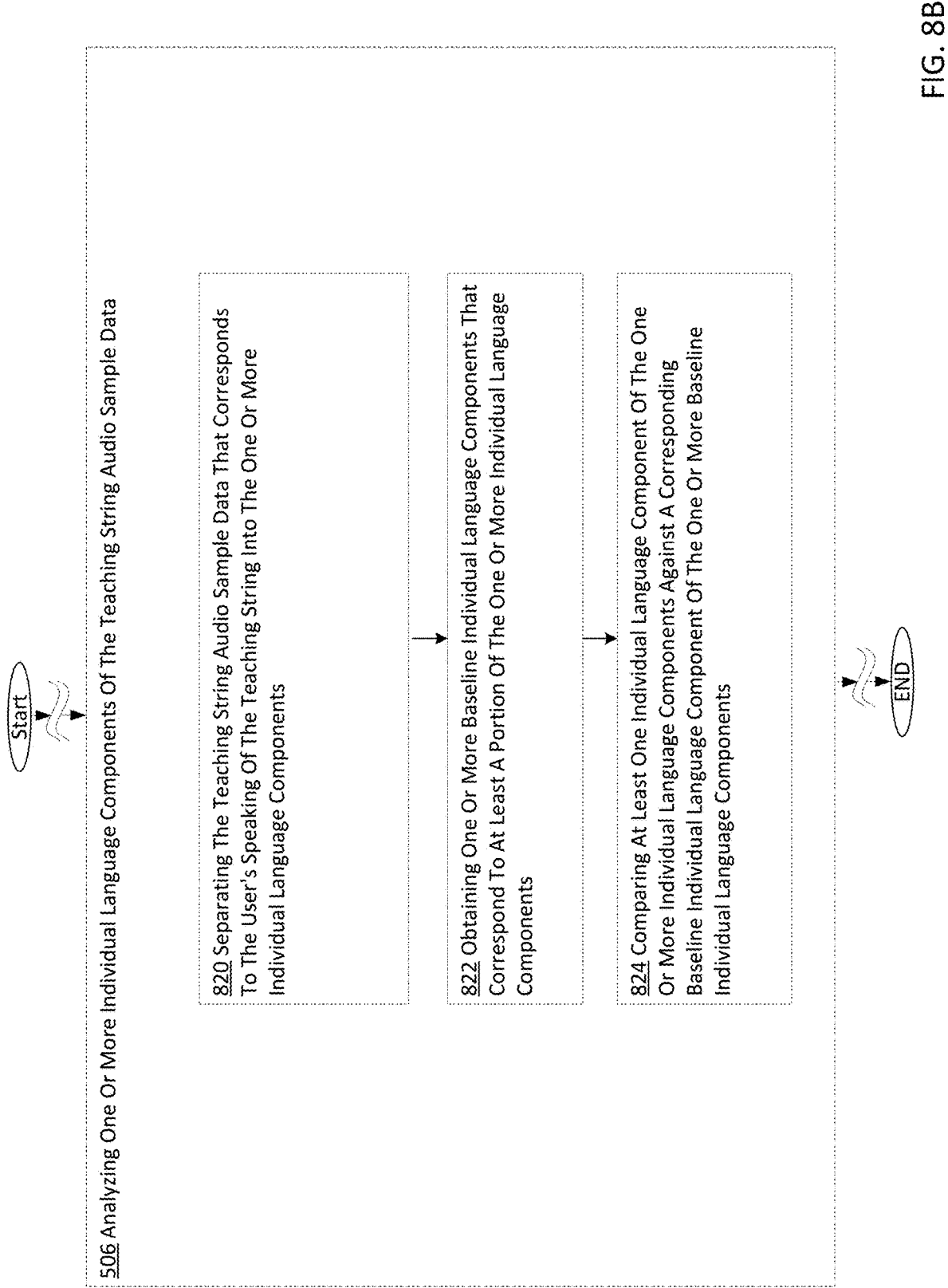

Referring now to FIG. 8B, in an implementation, operation 506 may include operation 820 depicting separating the teaching string audio sample data that corresponds to the user's speaking of the teaching string into the one or more individual language components. In an implementation, this is done by performing pattern matching of the teaching string audio sample data to find known individual language components that are present in the teaching string audio sample data. In other implementations, however, other techniques for separating the teaching string audio sample data into the individual language components may be used. In an implementation, operation 506, which may include operation 820, also may include operation 822 depicting obtaining one or more baseline individual language components that correspond to at least a portion of the one or more individual language components. As previously described, the baseline individual language components may come from any source, corpus, or set of corpora, which may be used as-is or modified with machine learning techniques, or modified to generate "baseline" individual language components by averaging, or weighted averaging, one or more pronunciation characteristics, based on one or more features of the source. In an implementation, operation 506, which may include operations 820 and 822, also may include operation 824 depicting comparing at least one individual language components of the one or more individual language components against a corresponding baseline individual language component of the one or more baseline individual language components, which may be accomplished through use of fine-grained detection of differences in one or more pronunciation characteristics of the individual language components, relative to the corresponding baseline individual language components.

Figure 11:
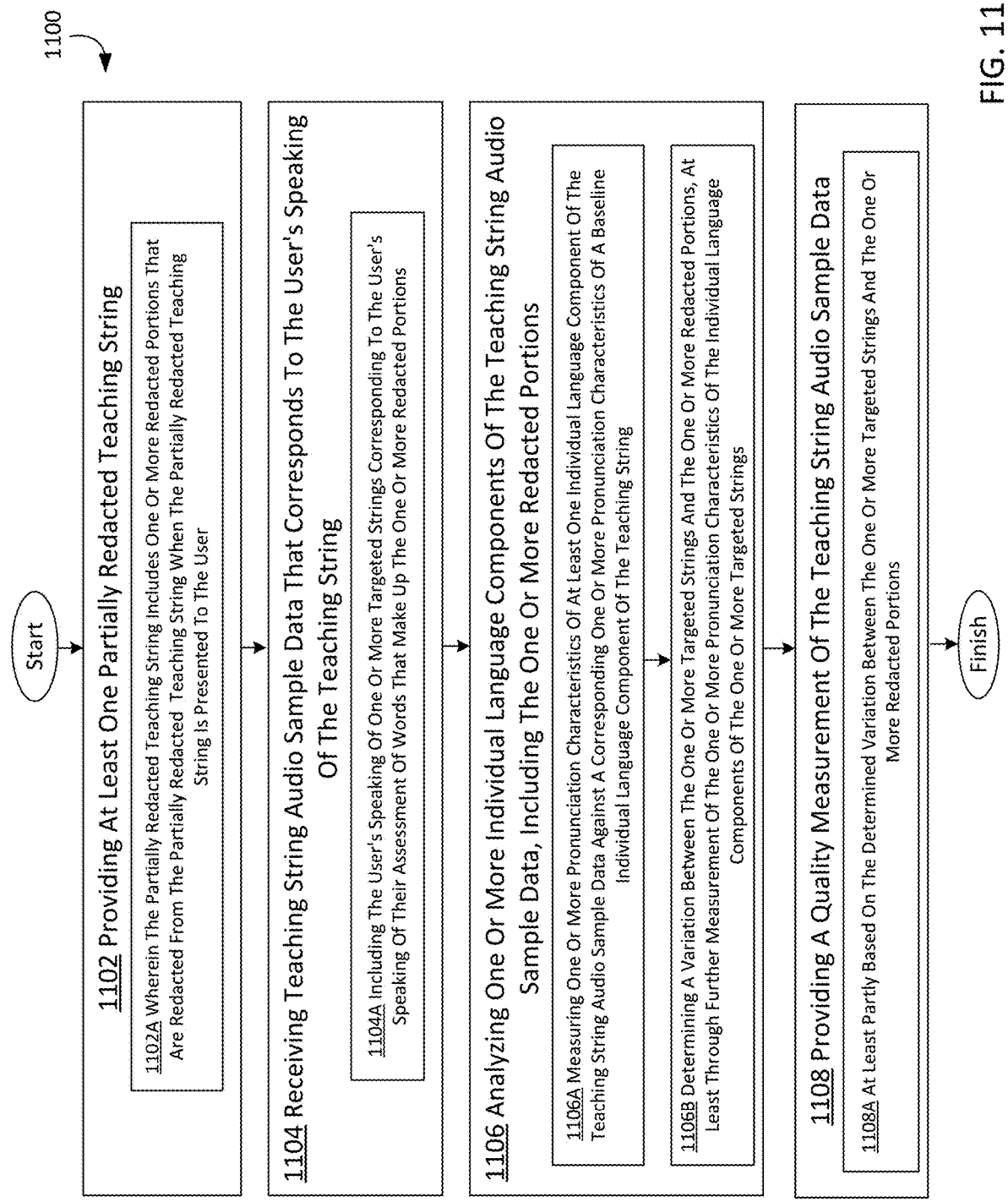
FIG. 11 is a high-level logic flowchart of a process, e.g., operational flow 1100, according to various embodiments of the invention.
Figure 12:
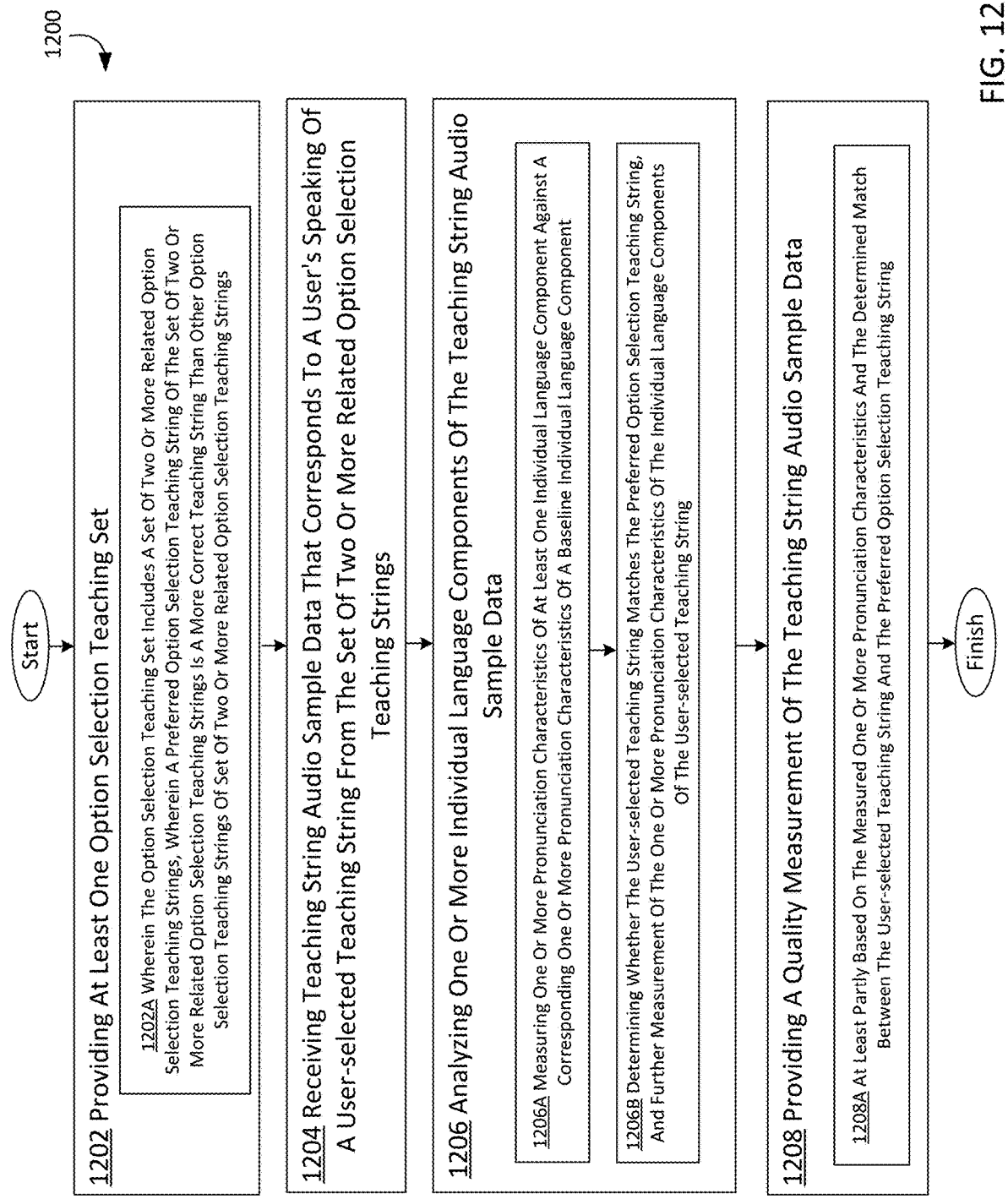
FIG. 12 is a high-level logic flowchart of a process, e.g., operational flow 1200, according to various embodiments of the invention.
Figure 13:
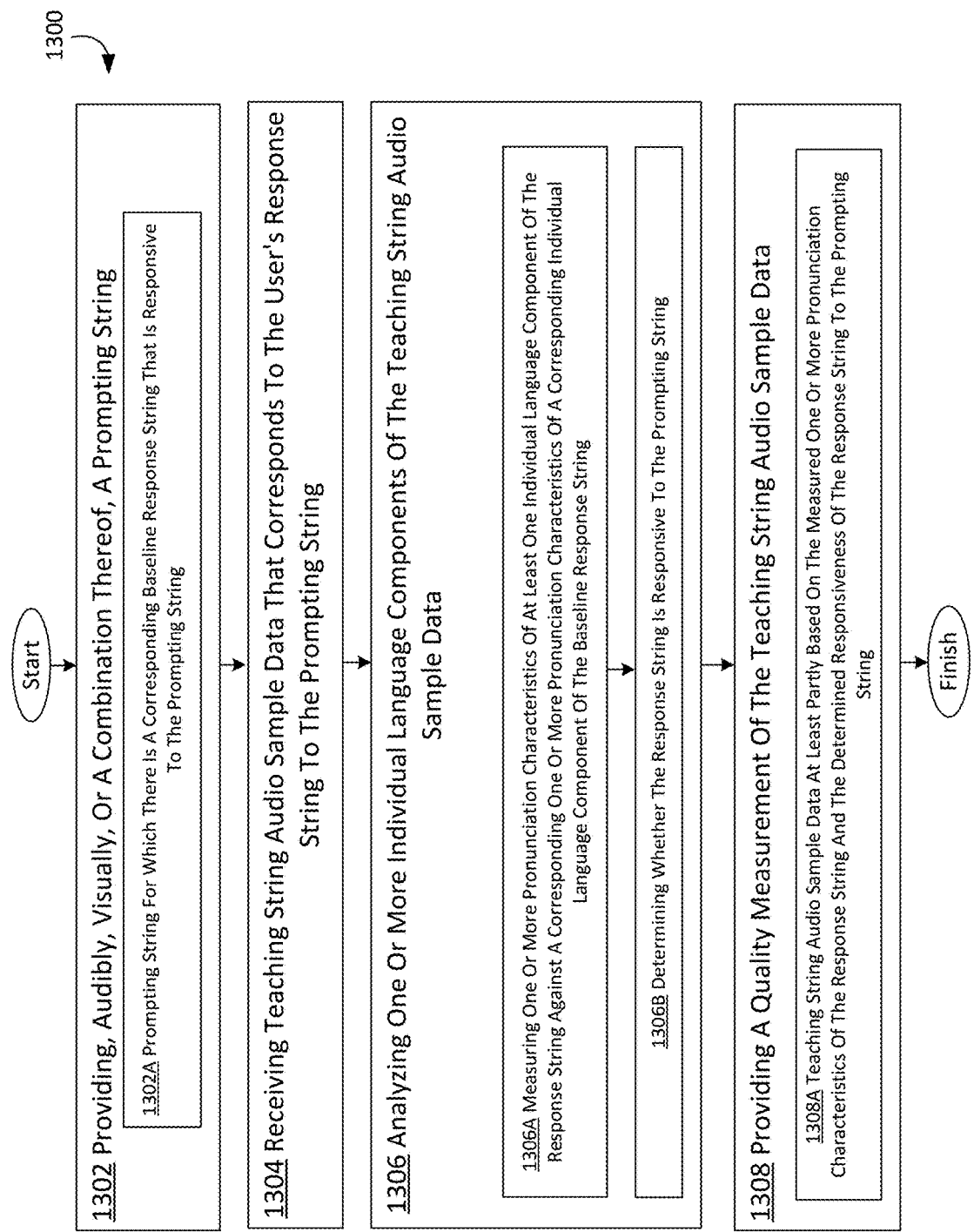
FIG. 13 is a high-level logic flowchart of a process, e.g., operational flow 1300, according to various embodiments of the invention.

FIGS. 11, 12, and 13 describe various implementations of the systems that have been previously described herein. For brevity, some portions of the workings of the system are not repeated, and, except where otherwise specified, specifically delineated, or internally inconsistent, details that are not mentioned with respect to FIGS. 11, 12, and 13 operate in a manner similar to that described with respect to FIG. 5 and other Figures. Referring now to FIG. 11, FIG. 11 shows operation 1100, which may include operation 1102 depicting providing at least one partially redacted teaching string. For example, FIG. 2, e.g., FIG. 2A, shows teaching string provision circuit 252, which in various implementations may be configured to provide at least one partially redacted teaching string. In an implementation, as shown in sub-operation 1102A, the partially redacted teaching string includes one or more redacted portions that are redacted from the partially redacted teaching string when the partially redacted teaching string is presented to the user. For example, this method may be used to have the user fill in the blanks where words are redacted, in order to improve fluency in the language, such as "We all rode in the _____ to the mall." In other implementations, there may be multiple redacted portions, such as, "We all _____ in the _____ to the _____." In other implementations, clues about number of words and/or letters may be given in the redacted portions as well, for example, if the redacted portion is "thank you," the redacted sentence may show two underlined blanks, such as "_____ _____ for the lovely gift." In another example, the number of blanks may show the number of missing letters, for example, "Alana rode the chestnut _____," where the missing word is "horse." In an implementation, one purpose of these exercises is to teach fluency along with correct pronunciation of the language, as well as giving the user flexibility to speak additional words, and also to break up the lessons to keep the overall teaching program interesting.

Referring again to FIG. 11, in an implementation, operation 1100 may include operation 1104 depicting receiving teaching string audio sample data that corresponds to the user's speaking of the teaching string. For example, FIG. 2, e.g., FIG. 2A, shows teaching string audio sample data reception circuit 254, which in various implementations may be configured to receive the teaching string audio sample data that corresponds to the user's speaking of the teaching string. In an implementation, as shown in sub-operation 1104A, the teaching string may include the user's speaking of one or more targeted strings corresponding to the user's speaking of their assessment of words that make up the one or more redacted portions. For example, if the redacted teaching string is "We all rode in the _____ to the mall," as described above, then the user would speak the string "We all rode in the car to the mall," or "we all rode in the wheelbarrow to the mall," or some other similar phrase. The targeted string in the above examples is the text that fills in the redacted portions, e.g., "car" or "wheelbarrow," and can be recognized by the speech evaluation engine as the portion of the string that was supplied by the user.

Referring again to FIG. 11, in an implementation, operation 1100 may include operation 1106 depicting analyzing one or more individual language components of the teaching string audio sample data, including the one or more redacted portions. For example, FIG. 2, e.g., FIG. 2A, shows individual language component analysis circuit 256, which in various implementations may be configured to analyze one or more individual language components of the teaching string audio sample data, including the one or more redacted portions. In an implementation, as shown in sub-operation 1106A, the analyzing may include measuring one or more pronunciation characteristics of at least one individual language component of the teaching string audio sample data against a corresponding one or more pronunciation characteristics of a baseline individual language component of the teaching string, as has been previously described. In other implementations, when sub-operation 1106A is present, operation 1106 also may include sub-operation 1106B depicting determining a variation between the one or more targeted strings and the one or more redacted portions, at least through further measurement of the one or more pronunciation characteristics of the individual language components of the one or more targeted strings. For example, in an implementation, the word "car" from the previous example of "We all rode in the CAR to the mall," where the redacted string is "CAR," the pronunciation of this word by the user may be analyzed as has been previously described. If the user selects a different word, in various implementations, that word will be recognized and then compared to its corresponding baseline word, e.g., if the user said "automobile," or "horse," or "telephone." In an implementation, points may be deducted from the user's score based on the word chosen by the user. For example, in an implementation, in the previous example, words such as "automobile," "van," "truck," and "subway," might still receive full points as the sentence makes sense with those words. Words such as "horse" or "wheelbarrow," may receive a small deduction in points, since those words fit logically but may not be appropriate for the context, and words such as "telephone" would receive a larger deduction in points since those words do not fit logically in the partially redacted teaching string, e.g., "We all rode the telephone to the mall."

Referring again to FIG. 11, in an implementation, operation 1100 may include operation 1108 depicting providing a quality measurement of the teaching string audio sample data. For example, FIG. 2, e.g., FIG. 2A, shows an evaluation presentation provision circuit 258, which in various implementations may be configured to provide a quality measurement of the teaching string audio sample data. In an implementation, as shown in sub-operation 1108A, the quality measurement of the teaching string audio sample data may be at least partly based on the determined variation between the one or more targeted strings and the one or more redacted portions, as previously described. In various embodiments, a balance between selecting the right word, or a logical word, may be weighted against a correct pronunciation of that word with various weights in order to arrive at a user score that is useful for user feedback. The weightings of the various factors may change in response to such factors as the experience of the user, the fluency in the language, the user's performance in previous teaching strings, and the emphasis of the particular lesson being imparted to the user. In an implementation, an instructor may manually assign the weightings of the various factors in accordance with the lesson goals of the instructor for the user.

Referring now to FIG. 12, FIG. 12 shows operation 1200, which may include operation 1202 depicting providing at least one option selection teaching set 1202. For example, FIG. 2, e.g., FIG. 2A, shows teaching string provision circuit 252, which in various implementations may be configured to provide at least an option selection teaching set, which itself may include various teaching strings as will be discussed more herein. In an implementation, as shown in sub-operation 1202A, the option selection teaching set includes a set of two or more related option selection teaching strings, wherein a preferred option selection teaching string of the set of two or more related option selection teaching strings is a more correct teaching string than other option selection teaching strings of set of two or more related option selection teaching strings. For example, this method may be used to improve fluency in the language for the user at the same time that pronunciation and language skills are taught. In various implementations, the option selection teaching set may have various numbers of option selection teaching strings, and those strings may be closely related or distantly related based on a challenge level at which the particular user is operating. For example, in an implementation, if a user is operating at a more challenging level, the option selection teaching set may have more option selection teaching strings that may be selected by the user. In another implementation, if the user is operating at a more challenging level, the option selection teaching set may have option selection teaching strings that are closely related, e.g., off by only a few words, or having similar meaning, or having subtle grammatical or logical errors. In other implementations, all of the option selection teaching strings may be "correct," and the user may have to pick the "most correct" option. The option selection teaching set may be shown in many different ways, and is not necessarily required to be shown by the device. In an implementation, all of the option selection teaching strings of the option selection teaching set are shown at once. In another implementation, one option selection teaching string at a time is shown to the user, and other implementations may show varying numbers of option selection teaching strings at a time, and may allow the user to toggle back and forth between members of the option selection teaching set.

Referring again to FIG. 12, in an implementation, operation 1200 may include operation 1204 depicting receiving teaching string audio sample data that corresponds to a user's speaking of a user-selected teaching string from the set of two or more related option selection teaching strings. For example, FIG. 2, e.g., FIG. 2A, shows teaching string audio sample data reception circuit 254, which in various implementations may be configured to receive the teaching string audio sample data that corresponds to a user's speaking of a user-selected teaching string from the set of two or more related option selection teaching strings. In an implementation, the user speaks only the selected option selection teaching string, but in other implementations, the user may speak more of the option selection teaching strings.

Referring again to FIG. 12, in an implementation, operation 1200 may include operation 1206 depicting analyzing one or more individual language components of the teaching string audio sample data. For example, FIG. 2, e.g., FIG. 2A, shows individual language component analysis circuit 256, which in various implementations may be configured to analyze one or more individual language components of the teaching string audio sample data. In an implementation, as shown in sub-operation 1206A, the analyzing may include measuring one or more pronunciation characteristics of at least one individual language component against a corresponding one or more pronunciation characteristics of a baseline individual language component of the teaching string, as has been previously described. In other implementations, when sub-operation 1206A is present, operation 1206 also may include sub-operation 1206B depicting determining whether the user-selected teaching string matches the preferred option selection teaching string, and further measurement of the one or more pronunciation characteristics of the individual language components of the user-selected teaching string. For example, in an implementation, it is determined whether the user-selected teaching string is the correct string, or the "most correct" string. In various implementations, point scores may be assigned based on whether the user-selected teaching string is the correct one, and, if not, whether it is the second-best answer, the third-best answer, and so on. In an implementation, only the correct answer is worth points under the scoring system used. In another implementation, some points are awarded for some of the other answers in the option selection teaching set, depending on the complexity of the question, the difficulty of selecting the right answer, and the skill level/goals of the user.

Referring again to FIG. 12, in an implementation, operation 1200 may include operation 1208 depicting providing a quality measurement of the teaching string audio sample data. For example, FIG. 2, e.g., FIG. 2A, shows an evaluation presentation provision circuit 258, which in various implementations may be configured to provide a quality measurement of the teaching string audio sample data. In an implementation, as shown in sub-operation 1208A, the quality measurement of the teaching string audio sample data may be at least partly based on the measured one or more pronunciation characteristics and the determined match between the user-selected teaching string and the preferred option selection teaching string. In various implementations, a balance between selecting the correct option, or one of the better options, may be weighted against a correct pronunciation of that option with various weights in order to arrive at a user score that is useful for user feedback. The weightings of the various factors may change in response to such factors as the experience of the user, the fluency in the language, the user's performance in previous teaching strings, and the emphasis of the particular lesson being imparted to the user. In an implementation, an instructor may manually assign the weightings of the various factors in accordance with the lesson goals of the instructor for the user. In an implementation, if the user picks an incorrect option, the user repeats the exercise with the same option selection teaching set, and in various implementations, all of the options may be the same, or the selected incorrect option may be swapped out with a different teaching string.

Referring now to FIG. 13, FIG. 13 shows operation 1300, which may include operation 1302 depicting providing, audibly, visually, or a combination thereof, a prompting string. Although in all instances throughout this application, as mentioned above, the term "providing" is intended to encompass all manner of sensory provision, e.g., audible, visual, haptic, or other sensory engagement, audible and visual provision is specifically called out in FIG. 13. This is for exemplary purposes only and should not be considered as limiting other instantiations of the term providing that do not specifically call out the a particular sensory stimulus that acts as the medium for providing. Rather, the terms are explicitly added here for ease of understanding and convenience to the reader. Referring back to operation 1302, for example, FIG. 2, e.g., FIG. 2A, shows teaching string provision circuit 252, which in various implementations may be configured to provide, audibly, visually, or a combination thereof, a prompting string. In an implementation, as shown in sub-operation 1302A, the prompting string may have associated with it a corresponding baseline response string that is responsive to the prompting string. In various implementations, there may be multiple corresponding baseline response strings. For example, in an implementation, if the prompting string is "Where do you take someone who has just fallen and broken their leg," then the only corresponding baseline response string may be "hospital," or may be two response strings, e.g., "hospital," and "emergency room." In another implementation, if the prompting string is "how many sunflower seeds can you eat in one sitting," then there may be a number of corresponding baseline response strings that include various numbers. In an implementation, the prompting string may be repeated to the user as many times as necessary. In another implementation, the prompting string may be presented first audibly, then visually, or vice versa, or at the same time, or any combination thereof.

Referring again to FIG. 13, in an implementation, operation 1300 may include operation 1304 depicting receiving teaching string audio sample data that corresponds to the user's response string to the prompting string. For example, FIG. 2, e.g., FIG. 2A, shows teaching string audio sample data reception circuit 254, which in various implementations may be configured to receive the teaching string audio sample data that corresponds to the user's response string to the prompting string. In an implementation, the user may first repeat the prompting string, and then respond with the response string, or the user may speak only the response string. In an implementation, the user may ask, through speech or other input entry (e.g., keyboard or touchscreen), follow up questions regarding the prompting string. In other implementations, the prompting string may be an open-ended question without a specific answer, e.g., "what is the nature of free will and is it possible to determine if such a thing exists," in which implementations it is the speech rather than the specific response that will be scored.

Referring again to FIG. 13, in an implementation, operation 1300 may include operation 1306 depicting analyzing one or more individual language components of the teaching string audio sample data. For example, FIG. 2, e.g., FIG. 2A, shows individual language component analysis circuit 256, which in various implementations may be configured to analyze one or more individual language components of the teaching string audio sample data. In an implementation, as shown in sub-operation 1306A, the analyzing may include measuring one or more pronunciation characteristics of at least one individual language component of the response string against a corresponding one or more pronunciation characteristics of a corresponding individual language component of the baseline response string, as has been previously described. In other implementations, when sub-operation 1306A is present, operation 1306 also may include sub-operation 1306B depicting determining whether the response string is responsive to the prompting string. For example, in an implementation, it is determined whether the user-selected response string is responsive to the prompting string, which may, in various implementations, be a two-part test, e.g., is the response string responsive to the prompting string, and is the response string the correct answer, e.g., if the prompting string is "what color is the sky," then "green" would be a syntactically correct answer but not logically correct, and so may be scored accordingly. In other implementations this distinction may not be made, and a logically incorrect answer may be scored the same as a syntactically incorrect answer. In other implementations, there may not be a "correct" answer, or there may be a set of correct answers, e.g., "name a prime number less than one hundred."

Referring again to FIG. 13, in an implementation, operation 1300 may include operation 1308 depicting providing a quality measurement of the teaching string audio sample data. For example, FIG. 2, e.g., FIG. 2A, shows an evaluation presentation provision circuit 258, which in various implementations may be configured to provide a quality measurement of the teaching string audio sample data. In an implementation, as shown in sub-operation 1308A, the quality measurement of the teaching string audio sample data may be at least partly based on the measured one or more pronunciation characteristics of the response string and the determined responsiveness of the response string to the prompting string. In various implementations, a balance between providing a logically and/or syntactically correct responsive string may be weighted against a correct pronunciation of the response string, in order to arrive at a user score that is useful for user feedback. The weightings of the various factors may change in response to such factors as the experience of the user, the fluency in the language, the user's performance in previous teaching strings, and the emphasis of the particular lesson being imparted to the user. In an implementation, an instructor may manually assign the weightings of the various factors in accordance with the lesson goals of the instructor for the user.

The foregoing examples are meant to be illustrative only, and omission of an example here should not be construed as intentional or intentionally disavowing subject matter. The scope of the invention set forth herein is defined solely by the following claims at the end of this application.

V. Various Alternate Implementations and Non-Limiting Language

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scalable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although one or more users maybe shown and/or described herein, e.g., in FIG. 1, and other places, as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

VI. Preface to the Claimed Subject Matter

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," 'in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Throughout this application, the terms "in an implementation," 'in one implementation," "in some implementations," "in several implementations," "in at least one implementation," "in various implementations," and the like, may be used. Each of these terms, and all such similar terms should be construed as "in at least one implementation, and possibly but not necessarily all implementations," unless explicitly stated otherwise. Specifically, unless explicitly stated otherwise, the intent of phrases like these is to provide non-exclusive and non-limiting examples of implementations of the invention. The mere statement that one, some, or may implementations include one or more things or have one or more features, does not imply that all implementations include one or more things or have one or more features, but also does not imply that such implementations must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A device configured to teach and/or assess one or more spoken language skills, said device comprising:
    a device interface component that includes one or more of a device input component and a device output component;
    a memory; and
    a processor operably coupled to the memory and configured to provide data to and from the device interface component, the processor including one or more circuits configured to include:
    a teaching string provision circuit that is configured to implement one or more teaching strings that are read by a user;
    a teaching string audio sample data reception circuit that is configured to receive, from the user, through the device input component, teaching string audio sample data that corresponds to the user's speech of the teaching string;
    an individual language component analysis circuit that is configured to:
        separate the teaching string audio sample data into at least one individual language component, wherein the at least one individual language component includes one or more of a phoneme, syllable, diphthong, digraph, or other phonetic unit;
        measure one or more pronunciation characteristics of the at least one individual component, wherein the one or more pronunciation characteristics include one or more of pitch, intonation, frequency, stress, and accent; and
        analyze the teaching string audio sample data through comparison of the measured one or more pronunciation characteristics of each individual language component against a corresponding one or more pronunciation characteristics of baseline individual language components to generate quality scores for each individual language component; and
    an evaluation presentation provision circuit that is configured to provide an evaluation presentation on the device output component to the user, wherein the evaluation presentation includes an evaluation of how accurately the one or more teaching strings were pronounced by the user, based on the analyzed one or more individual language components of the teaching string audio sample data, for each of the one or more individual language components.

2. The device of claim 1, wherein said teaching string provision circuit comprises:
    a teaching string provision circuit that is configured to provide, to a user, one or more teaching strings that are read by the user.

3. The device of claim 2, wherein said teaching string provision circuit comprises:
    a teaching string provision circuit that is configured to provide, to the user, through the device output component of the device interface component, one or more teaching strings that are read by the user.

4. The device of claim 2, wherein said teaching string provision circuit comprises:
    a teaching string provision circuit that is configured to provide, to the user, one or more teaching strings that are read from an external source, by the user.

5. The device of claim 1, further comprising:
    a teaching string audio sample data evaluation collection circuit that is configured to collect the evaluation of the teaching string audio sample data that includes an evaluation of each of the one or more pronunciation characteristics of the one or more individual language components.

6. The device of claim 5, further comprising:
    a further teaching string determination circuit that is configured to determine one or more further teaching strings at least partly based on the collected evaluation of the teaching string audio sample data, wherein the one or more further teaching strings are calculated to improve the user's spoken language skill when captured from the user for analysis and evaluation by the device.

7. The device of claim 5, further comprising:
    a further teaching string reception circuit that is configured to receive one or more further teaching strings that were determined, at a remote server, and at least partly based on the collected evaluation of the teaching string audio sample data, to be calculated to improve the user's spoken language skill when captured from the user for analysis and evaluation.

8. The device of claim 5, wherein said teaching string audio sample data evaluation collection circuit includes:
    a teaching string audio sample data evaluation collection and storage circuit that is configured to collect the evaluation of the teaching string audio sample data and store, at least temporarily, the collected evaluation of the teaching string audio sample data in the memory of the device.

9. The device of claim 3, wherein said teaching string provision circuit comprises:
    a teaching string visual provision circuit configured to provide, to the user, through the device output component, a visual representation of the teaching string that is to be read by the user.

10. The device of claim 3, wherein said teaching string provision circuit comprises:
    a teaching string visual provision circuit configured to provide, to the user, through the device output component, a visual representation of the teaching string that is to be read by the user; and
    a teaching string audio provision circuit configured to provide, to the user, through the device output component, an audio representation of the teaching string that is to be read by the user.

11. The device of claim 3, wherein said teaching string provision circuit comprises:
    a teaching string interactive visual provision circuit configured to provide, to the user, through the device output component, an interactive visual representation of the teaching string that is to be read by the user that is configured to be interacted with by the user through the device input component.

12. The device of claim 11, further comprising:
a teaching string responsive audio provision circuit configured to provide, to the user, through the device output component, an audio representation of the teaching string that is to be read by the user, in response to user interaction with the interactive visual representation of the teaching string.

13. The device of claim 11, further comprising:
a teaching string responsive audio provision circuit configured to provide, to the user, through the device output component, an audio representation of a portion of the teaching string that is to be read by the user, in response to user interaction with a corresponding portion of the interactive visual representation of the teaching string.

14. The device of claim 1, wherein the evaluation presentation includes presentation of an overall score that represents an accuracy of the user's speech of the teaching string based on the quality scores for each individual language component.

15. The device of claim 1, wherein said device is a single-purpose device configured to teach and/or assess the one or more spoken language skills.

16. The device of claim 1, wherein said device is a multipurpose device whose circuitry has been arranged in a manner to teach and/or assess the one or more spoken language skills.

17. The multipurpose device of claim 16, wherein said multipurpose device is one or more of a server, a desktop computer, a laptop computer, a cellular phone, a network phone, a smartphone, a tablet, a music player, a walkie-talkie, a radio, an augmented reality device, wearable electronics, earphones, headphones, audio/visual equipment, a media player, a television, a projection screen, a flat screen monitor, a clock, an appliance, a navigation system, a medical alert device, a remote control, a peripheral, a video camera, a personal video recorder, a personal audio recorder, and a terminal device.

18. The device of claim 1, wherein said device input component is one or more of a keyboard, keypad, gamepad, touchscreen, microphone, headset, gesture tracker, optical tracker, camera, and webcam.

19. The device of claim 1, wherein said device output component is one or more of a display, a touchscreen, a projector, an augmented reality projection, a virtual reality projection, a speaker, a set of headphones, and a haptic feedback.

20. The device of claim 1, wherein said device output component includes a display and a speaker, and the evaluation presentation provision circuit further includes:
a visual presentation provision circuit that presents, on the display, visual feedback to the user of the user's speech of each of the one or more individual language components, analyzed against a corresponding one or more baseline individual language components; and
an audible presentation provision circuit that presents, in response to an interaction with a particular individual language component, audible feedback through the speaker of one or more of the user's speech of the particular individual language component.

21. The device of claim 1, wherein said teaching string audio sample data reception circuit that is configured to receive, from the user, through the device input component, teaching string audio sample data that corresponds to the user's speech of the teaching string comprises:
a teaching string microphone data reception circuit, that is configured to receive, from the user, through a microphone of the device, audio data of the user speaking the teaching string.

22. A method of teaching and/or assessment of one or more spoken language skills, comprising:
providing at least one teaching string configured to be read by a user;
receiving teaching string audio sample data that corresponds to the user's speaking of the teaching string;
analyzing one or more individual language components of the teaching string audio sample data, wherein said analyzing comprises:
separating the teaching string audio data into at least one individual language component, wherein the at least one individual language component includes one or more of a phoneme, syllable, diphthong, digraph, or other phonetic unit;
measuring one or more pronunciation characteristics of the at least one individual component, wherein the one or more pronunciation characteristics include one or more of pitch, intonation, frequency, stress, and accent; and
comparing the measured one or more pronunciation characteristics of each individual language component with a corresponding one or more pronunciation characteristics of a baseline individual language component to generate quality scores for each individual language component; and
providing an evaluation presentation to the user, wherein the evaluation presentation includes presentation, to the user, of an evaluation of how accurately the one or more teaching strings were pronounced by the user, based on the analyzed one or more pronunciation characteristics of the one or more individual language components.

23. The method of claim 22, wherein the at least one teaching string comprises a set of multiple, different teaching strings.

24. The method of claim 22, further comprising:
receiving a determination of one or more further teaching strings of the one or more teaching strings that is at least partly based on collected evaluation of the teaching string audio sample data, wherein the determination is performed by an examiner with access to the evaluation of each of the one or more pronunciation characteristics of the one or more individual language components.

25. The method of claim 22, further comprising:
collecting the evaluation of the teaching string audio sample data, wherein the evaluated teaching string audio sample data includes an evaluation of each of the one or more pronunciation characteristics of the one or more individual language components, wherein the one or more pronunciation characteristics includes one or more of a pitch pronunciation characteristic, an intonation pronunciation characteristic, a frequency pronunciation characteristic, a stress pronunciation characteristic, an accent pronunciation characteristic, a speaking rate pronunciation characteristic, a hesitation pronunciation characteristic, a filler sound pronunciation characteristic, and a chunking pronunciation characteristic.

26. The method of claim 25, further comprising:
determining one or more further teaching strings at least partly based on the collected evaluation of the teaching string audio sample data, wherein the one or more further teaching strings are calculated to improve the user's spoken language skill when captured from the user for analysis and evaluation, by targeting one or more pronunciation characteristics, including one or more of the pitch pronunciation characteristic, the intonation pronunciation characteristic, the frequency pronunciation characteristic, the stress pronunciation characteristic, the accent pronunciation characteristic, the speaking rate pronunciation characteristic, the hesitation pronunciation characteristic, the filler sound pronunciation characteristic, and the chunking pronunciation characteristic.

27. The method of claim 26, wherein said determining one or more further teaching strings comprises:
selecting one or more further teaching strings that emphasize a particular pronunciation characteristic of the one or more individual language components that was determined to have a lower comparison score when measured against a particular pronunciation characteristic of the corresponding one or more baseline individual language components.

28. The method of claim 27, wherein said particular pronunciation characteristic of the one or more individual language components comprises:
one or more of the pitch pronunciation characteristic of the one or more individual language components, the intonation pronunciation characteristic of the one or more individual language components, the frequency pronunciation characteristic of the one or more individual language components, the stress pronunciation characteristic of the one or more individual language components, the accent pronunciation characteristic of the one or more individual language components, the speaking rate pronunciation characteristic of the one or more individual language components, the hesitation pronunciation characteristic of the one or more individual language components, the filler sound pronunciation characteristic of the one or more individual language components, and the chunking pronunciation characteristic of the one or more individual language components.

29. The method of claim 27, wherein said selecting one or more further teaching strings comprises:
selecting a set of further teaching strings that emphasize an intonation characteristic of individual language components because the intonation characteristic was determined to have a lower comparison score of at least one of the individual language components when measured against the intonation characteristic of the corresponding baseline individual language component.

30. The method of claim 26, wherein said determining one or more further teaching strings comprises:
selecting one or more further teaching strings that emphasize one or more individual language components that were determined to have a lower comparison score when measured against corresponding one or more baseline individual language components.

31. The method of claim 30, wherein said selecting one or more further teaching strings that emphasize one or more individual language components comprises:
selecting a set of further teaching strings that emphasize a diphthong "YI" when one or more of the measured pronunciation characteristics for the diphthong "YI" was determined to have a lower comparison score when measured against corresponding pronunciation characteristics of the baseline for the diphthong "YI".

32. The method of claim 30, wherein the selecting one or more further teaching strings that emphasize one or more individual language components comprises:
selecting one or more further teaching strings, wherein the one or more further teaching strings emphasize teaching the user regarding one or more mistakes of intonation, frequency, stress, accent, timing, speaking rate, hesitation, filler sound, and chunking that are detected in at least one collected evaluation of the teaching string audio sample data.

33. The method of claim 26, wherein said determining one or more further teaching strings comprises:
removing, from a set of further teaching strings, one or more further teaching strings intended to emphasize teaching a particular pronunciation characteristic for which the teaching string audio sample data demonstrates little or no difference between the particular pronunciation characteristic of the one or more individual language components and the particular pronunciation characteristic of the one or more baseline individual language components.

34. The method of claim 26, wherein said particular pronunciation characteristic comprises:
one or more of the pitch pronunciation characteristic, the intonation pronunciation characteristic, the frequency pronunciation characteristic, the stress pronunciation characteristic, the accent pronunciation characteristic, the speaking rate pronunciation characteristic, the hesitation pronunciation characteristic, the filler sound pronunciation characteristic, and the chunking pronunciation characteristic.

35. The method of claim 22, further comprising:
repeating the providing at least one teaching string configured to be read by a user, receiving teaching string audio sample data that corresponds to the user's speaking of the teaching string, analyzing one or more individual language components of the teaching string audio sample data, and providing an evaluation presentation to the user, a particular number of times, with different teaching strings at least a portion of the particular number of times;
collecting the evaluation of the teaching string audio sample data each time of the particular number of times, wherein the evaluated teaching string audio sample data is used, at least in part, to determine one or more further teaching strings that are calculated to improve the user's spoken language skill when captured from the user for analysis and evaluation; and
using the collected evaluations of the teaching string audio sample data to determine the one or more further teaching strings.

36. The method of claim 35, further comprising:
grouping a set of one or more users into a class; and
performing the step of repeating and the step of collecting the evaluation of the teaching string audio sample data for each of the users in the class.

37. The method of claim 36, further comprising:
visually displaying a list of the class to an instruction entity, along with one or more performance characteristics of the class;
receiving selection, from the instruction entity, of one or more users in the class that are targeted for additional characteristic viewing; and
presenting, to the instruction entity, for each of the one or more pronunciation characteristics of the one or more individual language components, a component score that represents how closely a particular individual language component matches a particular baseline individual language component.

38. The method of claim 22, wherein the one or more pronunciation characteristics include one or more of pitch, intonation, frequency, stress, accent, timing, and speaking rate.

39. The method of claim 22, wherein the evaluation presentation further includes:
an overall score for the user's speaking of the teaching string.

40. The method of claim 22, wherein said step of providing at least one teaching string configured to be read by a user comprises:
providing a visual representation of the teaching string configured to be read by the user.

41. The method of claim 22, wherein said step of providing at least one teaching string configured to be read by a user comprises:
providing a visual representation of the teaching string configured to be read by the user; and
providing an audio representation of the teaching string configured to be read by the user, in response to a request from the user.

42. The method of claim 22, wherein said step of providing at least one teaching string configured to be read by a user comprises:
providing an interactive visual representation of the teaching string configured to be read by the user.

43. The method of claim 42, further comprising:
providing an audio representation of the teaching string configured to be read by the user, in response to the user interacting with the interactive visual representation of the teaching string.

44. The method of claim 42, further comprising:
providing an audio representation of a portion of the teaching string configured to be read by the user, in response to the user interacting with a corresponding portion of the interactive visual representation of the teaching string.

45. The method of claim 44, wherein said step of providing an audio representation of a portion of the teaching string configured to be read by the user further comprises:
providing an audio and/or visual representation of one or more pronunciation characteristics of the portion of the teaching string configured to be read by the user, in response to the user interacting with a corresponding portion of the interactive visual representation of the teaching string.

46. The method of claim 22, wherein said step of providing an evaluation presentation to the user further comprises:
providing, as part of the evaluation presentation, for each of the one or more pronunciation characteristics of the one or more individual language components, a component score that represents how closely a particular individual language component matches a particular baseline individual language component.

47. The method of claim 22, wherein said step of providing an evaluation presentation to the user further comprises:
providing, as part of the evaluation presentation, for each of the one or more individual language components, a visual representation of the user's speech of the individual language component that is based on evaluation of the one or more pronunciation characteristics for that individual language component, to assist vocally or aurally challenged persons in improvement of their language skills.

48. The method of claim 46, wherein said component score that represents how closely a particular individual language component matches a particular baseline individual language component further comprises:
a binary indicator that represents whether the particular individual language component matches the particular baseline individual language component.

49. The method of claim 46, wherein said component score that represents how closely a particular individual language component matches a particular baseline individual language component further comprises:
a numerical score indicator that represents a discrete amount by which the particular individual language component matches the particular baseline individual language component.

50. The method of claim 46, wherein said component score that represents how closely a particular individual language component matches a particular baseline individual language component further comprises:
a color-coded score indicator that visually represents, on a graded color scale, how closely the particular individual language component matches the particular baseline individual language component.

51. The method of claim 22, wherein said providing an evaluation presentation to the user comprises:
providing, to the user, a numeric assessment of the user's fluency in a language of the teaching string, based on the analyzed teaching string audio sample data.

52. The method of claim 22, wherein said providing an evaluation presentation to the user comprises:
displaying the evaluation presentation to the user on a screen of a device associated with the user, wherein the evaluation presentation contains one or more interactive objects configured to receive an interaction from the user.

53. The method of claim 52, wherein said evaluation presentation contains one or more interactive objects configured to receive an interaction from the user comprises:
displaying the evaluation presentation to the user on a screen of a device associated with the user, wherein the evaluation presentation contains an interactive object for each particular individual language component identified as problematic for the user; and
allowing the user to directly interact with each interactive object to allow the user to reduce an amount of time to achieve a particular level of fluency in a language associated with the teaching string through isolation and targeted interaction with the at least one particular individual language component identified as problematic for the user.

54. The method of claim 52, wherein said evaluation presentation contains one or more interactive objects configured to receive an interaction from the user comprises:
an evaluation presentation that displays at least one of the individual language components as an interactive object that, in response to interaction from the user, displays individual score comparisons between the individual language component and a corresponding baseline individual language component of the one or more baseline individual language components.

55. The method of claim 54, wherein said individual score comparisons between the individual language component and a corresponding baseline individual language component are shown for all individual score comparisons below a particular threshold level to facilitate reduction in learning time for the user.

56. The method of claim 54, wherein said individual score comparisons between the individual language component and a corresponding baseline individual language component comprises:
an individual comparison of pitch, an individual comparison of intonation, an individual comparison of stress, an individual comparison of accent, an individual comparison of speaking rate, an individual comparison of hesitation, an individual comparison of filler sound, and an individual comparison of chunking between the individual language component and the corresponding baseline individual language component.

57. The method of claim 56, wherein said individual comparison of pitch, individual comparison of intonation, individual comparison of stress, an individual comparison of accent, an individual comparison of speaking rate, an individual comparison of hesitation, an individual comparison of filler sound, and an individual comparison of chunking, each have a numeric score representing a delta between the individual language component and the corresponding baseline individual language component.

58. The method of claim 52, wherein said evaluation presentation contains one or more interactive objects configured to receive an interaction from the user comprises:
an interactive object configured to present an evaluation audio presentation to the user, wherein the evaluation audio presentation includes one or more of an audio presentation of a particular portion of the teaching string and an audio presentation of the user's pronunciation of the particular portion of the teaching string.

59. The method of claim 58, wherein at least a portion of said evaluation audio presentation is amplified or slowed down based on analysis of the user's performance in pronouncing the particular portion of the teaching string and other related portions of other teaching strings, to enhance the user's ability to recognize and correct their mistakes in the user's pronunciation of the particular portion of the teaching string.

60. The method of claim 22, wherein said analyzing one or more individual language components of the teaching string audio sample data comprises:
grouping the one or more individual language components into one or more individual language component groups;
analyzing the one or more individual language component groups through measurement of one or more of pitch, intonation, frequency, stress, accent, timing, speaking rate, hesitation, filler sound, and chunking against the baseline individual language component; and
including a result of the analyzed one or more individual language component groups as a part of the evaluation presentation.

61. The method of claim 60, wherein said grouping the one or more individual language components into one or more individual language component groups comprises:
grouping the one or more individual language components into groups of syllables, words, phrases, and/or sentences.

62. The method of claim 22, wherein said analyzing one or more individual language components of the teaching string audio sample data comprises:
separating the teaching string audio sample data that corresponds to the user's speaking of the teaching string into the one or more individual language components;
obtaining one or more baseline individual language components that correspond to at least a portion of the one or more individual language components; and
comparing at least one individual language component of the one or more individual language components against a corresponding baseline individual language component of the one or more baseline individual language components.

63. The method of claim 22, wherein the teaching string is one or more of a syllable, word, sentence, paragraph, or set of paragraphs.

64. The method of claim 22, wherein the individual language component is a phoneme or other perceptually distinct unit of sound.

65. A method of improving a user's language fluency, comprising:
providing at least one partially redacted teaching string, wherein the partially redacted teaching string includes one or more redacted portions that are redacted from the partially redacted teaching string when the partially redacted teaching string is presented to the user;
receiving teaching string audio sample data that corresponds to the user's speaking of the teaching string, including the user's speaking of one or more targeted strings corresponding to the user's speaking of their assessment of words that make up the one or more redacted portions;
analyzing one or more individual language components of the teaching string audio sample data, including the one or more redacted portions, wherein said analyzing includes:
separating the teaching string audio sample data into at least one individual language component, wherein the at least one individual language component includes one or more of a phoneme, syllable, diphthong, digraph, or other phonetic unit;
measuring one or more pronunciation characteristics of the at least one individual language component, wherein the one or more pronunciation characteristics include one or more of pitch, intonation, frequency, stress, and accent; and
analyzing the teaching string audio sample data through comparison of the measured one or more pronunciation characteristics against a corresponding one or more pronunciation characteristics of a baseline individual language component of the teaching string, to generate quality scores for each individual language component; and
determining a variation between the one or more targeted strings and the one or more redacted portions with respect to accuracy of pronunciation by the user, at least through further measurement of the one or more pronunciation characteristics of the individual language components of the one or more targeted strings; and
providing a quality measurement of the teaching string audio sample data at least partly based on the determined variation between the one or more targeted strings and the one or more redacted portions.

66. A method of improving a user's language fluency, comprising:
providing at least one option selection teaching set, wherein the option selection teaching set includes a set of two or more related option selection teaching strings, wherein a preferred option selection teaching string of the set of two or more related option selection teaching strings is a more correct teaching string than other option selection teaching strings of set of two or more related option selection teaching strings;

receiving teaching string audio sample data that corresponds to a user's speaking of a user-selected teaching string from the set of two or more related option selection teaching strings;

analyzing one or more individual language components of the teaching string audio sample data, wherein said analyzing includes:

measuring one or more pronunciation characteristics of at least one individual language component against a corresponding one or more pronunciation characteristics of a baseline individual language component; and determining whether the user-selected teaching string matches the preferred option selection teaching string, and further measurement of the one or more pronunciation characteristics of the individual language components of the user-selected teaching string; and providing a quality measurement of the teaching string audio sample data at least partly based on the measured one or more pronunciation characteristics and the determined match between the user-selected teaching string and the preferred option selection teaching string, wherein the quality measurement indicates how accurately the user pronounced the teaching string audio sample data.

67. A method of improving a user's language fluency, comprising:

providing, audibly, visually, or a combination thereof, a prompting string for which there is a corresponding baseline response string that is responsive to the prompting string;

receiving teaching string audio sample data that corresponds to the user's response string to the prompting string;

analyzing one or more individual language components of the teaching string audio sample data, wherein said analyzing includes:

separating the teaching string audio data into at least one individual language component, wherein the at least one individual language component includes one or more of a phoneme, syllable, diphthong, digraph, or other phonetic unit;

measuring one or more pronunciation characteristics of the at least one individual component, wherein the one or more pronunciation characteristics include one or more of pitch, intonation, frequency, stress, and accent; and comparing the measured one or more pronunciation characteristics of at least one individual language component of the response string with a corresponding one or more pronunciation characteristics of a corresponding individual language component of the baseline response string, wherein the baseline response string is determined from aggregated data from more sources than the user; and determining whether the response string is responsive to the prompting string; and providing a quality measurement of the teaching string audio sample data at least partly based on the measured one or more pronunciation characteristics of the response string and the determined responsiveness of the response string to the prompting string.

68. The device of claim 1, wherein the individual language component analysis circuit is further configured to:

analyze the teaching string audio sample data through comparison of the measured one or more pronunciation characteristics of each individual language component against a corresponding one or more pronunciation characteristics of baseline individual language components to generate quality scores for each individual language component, wherein the baseline individual language components are collected from multiple sources other than the user.

* * * * *